United States Patent

[11] 3,567,914

[72] Inventors Jerry L. Neese
St. Paul;
Harold J. Lindee, Minneapolis; Edward F. Melin, St. Paul, John H. Pemberton, St. Paul, Clarence C. Pittenger, St. Paul Park, and William M. Swenson, St. Paul, Minn.

[21] Appl. No. 422,682
[22] Filed Dec. 31, 1964
[45] Patented Mar. 2, 1971
[73] Assignee Sperry Rand Corporation
New York, N.Y.

[54] AUTOMATED MANUFACTURING SYSTEM
12 Claims, 53 Drawing Figs.

[52] U.S. Cl. 235/151.1, 96/27, 340/172.5
[51] Int. Cl. G06f 15/46, G05b 19/18
[50] Field of Search 235/151, 151.1; 340/172.5, (Inquired); 96/27, (Inquired)

[56] References Cited
UNITED STATES PATENTS

| | | | |
|---|---|---|---|
| 3,124,784 | 3/1964 | Schaaf et al. | 340/173 |
| 3,286,083 | 11/1966 | Nielsen | 235/61.11 |
| 3,308,438 | 3/1967 | Spergel et al. | 340/172.5 |
| 3,325,786 | 6/1967 | Shashoua et al. | 340/172.5 |
| 3,124,784 | 3/1964 | Schaaf et al. | 340/173 |
| 3,286,083 | 11/1966 | Nielsen | 235/61.11 |
| 3,308,438 | 3/1967 | Spergel et al. | 340/172.5 |
| 3,325,786 | 6/1967 | Shashoua et al. | 340/172.5 |

*Primary Examiner*—Eugene G. Botz
*Attorneys*—Thomas J. Nikolai and John P. Dority

ABSTRACT: The method of fabricating printed circuit terminal interconnection assemblies including the steps of (a.) reading manifestations from a recond medium indicative of predetermined terminal interconnections to be formed between designated terminals in a coordinate array; (b.) providing signals ordered according to a predetermined system indicative of ordered terminal interconnections in response to the manifestation so read and staring said signals; (c.) reading the stroed signals and generating terminal interconnection numericalcontrol parameters defining nonintersecting printed circuit paths to be formed on a predetermined coordinate terminal array; and (d.) recordin g the numerical control parameters on a record medium for use in the control of the operation of a numerically controlled reproduction apparatus.

INVENTORS
JERRY L. NEESE
HAROLD J. LINDEE
EDWARD F. MELIN
JOHN H. PEMBERTON
CLARENCE C. PITTENGER
WILLIAM M. SWENSON
BY Charles A. Johnson
ATTORNEY

IMAGE WORD = $T_V(164)^3 + T_{VR}(164)^2 + T_H(164) + T_{HR}$

EXECUTIVE CONTROL ROUTINE (001)

(010)

(100)

(421)

(412)

(241)

SEE LEGEND ON NEXT SHEET (214)

(142)

(124)

LEGEND:

QAD = QUADRANT, ANGLE, DISTANCE
000 = NO SORT
001 = BEND POINT DISTANCE TO CENTER
010 = ANGLE FROM VERTICAL OF ORIGIN TO DESTINATION
100 = QUADRANT OF ORIGIN AND DESTINATION
421 = QUADRANT AND ANGLE
412 = QUADRANT AND DISTANCE
241 = ANGLE AND QUADRANT
214 = DISTANCE AND QUADRANT
142 = ANGLE AND DISTANCE
124 = DISTANCE AND ANGLE

PATENTED MAR 2 1971 3,567,914

MAGNETIC TAPE FILE FORMAT

LEGEND:

TTTTT = PACKED TERMINAL
D = DIRECTION
AAAAA = ADDRESS OF LINE STARTING POINT IN IMAGE
LLL = LENGTH OF LINE IN CHANNEL INTERSECTION

FUNCTION CODES:

1 = LAYER NUMBER
2 = TAB WORD
3 = LAST WORD IN ROUTE
0 = ROUTE WORD

AUTOMATED MANUFACTURING SYSTEM

This invention relates to an automated manufacturing system for preparing printed circuit layout drawings for use in the preparation of multilayered printed circuit panels. Terminal wiring data for assemblies which are to be connected with printed circuit paths are prepared and sent to input-output equipment of a general purpose computer. The computer is programmed to layout the most advantageous printed circuit wiring path for each interterminal connection and to assign each path to one of a large number of possible wiring layers. The computer provides an output consisting of wire routing data in the form of signals suitable for use by numerical control apparatus. For example, these control signals can be set to an X–Y plotter for preparing the desired wiring paths for each printed circuit layer.

In the computer, and other related electronic industries, advances are continually made in manufacturing techniques which tend to increase production rates, increase product reliability, reduce unit costs and decrease the time required to "debug " (i.e., remove wiring or logic errors) the wired unit prior to its being put in operation. One such advance has been in the field of modularizing and integrating the packaging of electronic circuits. This has led to the so-called building-block approach to equipment design wherein logic circuits for a particular type of equipment are standardized as to function, and fabricated as a small class of compatible circuit types. These circuit types are then fabricated, or integrated, as individual units, i.e., modules, to facilitate the equipment assembly and maintenance. A common mode of providing interconnections between various integrated circuit modules is to arrange them in coordinate arrays on multiplanar electronic assemblies (to be described in detail below). These assemblies are equipped with connection terminals which may be physically electrically connected one to another via printed-circuit conductors. By utilizing these integrated circuit modules, a logic designer can assemble them into whatever functional relationship he may desire, to attain the desired electronic results. It is necessary to appropriately connect various terminals associated with these modules to accomplish the circuit interconnections, and by so doing, the simple building-block integrated circuit modules may be fashioned into a complex decision making computer.

It has been found that a major problem in packaging design to reduce overall volume is that of attaining three-dimensional flexibility. The prior art systems of utilizing printed circuit interconnection arrays coupled together by wires soldered, or otherwise coupled, between individual arrays, is not generally suitable for automatic assembly, in systems where signal frequencies are high, and when space is at a premium. This problem has been partially alleviated by employing stacks of printed circuit assemblies, and making connections between levels by means of conductor pins passed through the levels of the stack.

The processes of plating copper conductor strips or depositing copper foil on various types of laminate, or base material, is well known in the art and need not be discussed here in detail. It is necessary only to point out that it is uniformly necessary to prepare a master drawing or layout of the desired configuration of conductor paths. It is this master drawing or layout which is photographed in the first stage of fabrication of the etched pattern. The layouts just mentioned are generated by using self-adhesive tapes, opaque in nature, to lay out the lines which will form the printed circuit paths. Either drawing or taping takes considerable time and manual effort.

Prior to making the master layout for each of the printed circuit assemblies, it is necessary to determine where the conductors must run. In the past this has most often been done by hand, with a designer being forced to consider every connection necessary and the paths that are available to make the conductor runs. Various aids are used, and often cutouts of components or integrated circuit modules are made and arranged as they would be desired in the finished equipment. The designer then makes sketches of the interconnections, and finally the master layout for each printed circuit interconnection assembly. Various criteria are established for all layouts and must be kept in mind by the designer during this layout process. The prime criteria, of course, is that lines may not cross. This is followed up by limitations on allowable conductor length, the number of connections that can be strung in series, the allowable length of parallel runs of interconnections, and others that will be dictated by the signal frequencies, the circuit limitations of the modules being interconnected, and so forth. Even limited to two-dimensional wiring arrays, it can be seen that the resultant layout will seldom be close to an optimum layout. This follows from the degree of difficulty of change once the layout has been started, and the fact that the intuition and experience of the designer is so heavily relied on. When the third dimension, that of making connections through the printed circuit assemblies by conductor pins, is added, it can be seen that the manual process becomes at best a cumbersome, tedious, and error-filled system for generating the integrated circuit module interconnection paths.

OBJECTS

Consider first the situation where a large number of electrical circuit connection points are formed in an array and selected ones of said terminals are to be coupled together by printed circuit conductors. In such a situation it is necessary to lay out the conductor paths and to provide a master layout drawing which can be photographed as a first step in the conventional printed-circuit process. Hand methods of layout for such large arrays of terminals is cumbersome and tends toward an excessive number of erroneous wiring paths. It is desirable to provide automatic drawing of such layouts.

Accordingly, a primary object of this invention is to provide apparatus for controlling an improved manufacturing process.

Another primary object of this invention is to provide apparatus for controlling numerically controlled drawing apparatus.

Yet another object of this invention is to provide an improved apparatus and method for generating numerical control commands to guide the automated drawing of printed circuit wiring path layouts.

When printed circuit wiring is utilized to make the interterminal connections, conductor crossovers are prohibited. Next consider that the situation exists that the terminal array requires a density of printed circuit terminal coupling paths that cannot be placed on a single printed circuit layer assembly. In such a situation, it is necessary to provide a multilayered arrangement of printed circuit assemblies, and to provide a means for coupling the layers together. Under these circumstances it is desirable to provide a system for assigning wire connections to be made on terminal-to-terminal routed basis. It follows that the routes must be specified in some manner. As a hand process, such routing is tedious at best. Further, hand routing does not lend itself to a consideration of multiplanar wiring, nor does it lend itself to evaluation of the various routed wires as they affect each other electrically.

Therefore, another object is to provide an improved apparatus and method of generating wire-routing paths for individual terminal-to-terminal connections.

Yet another object is to provide a method for generating wire-routing paths for three-dimensional wiring in a multiplanar printed circuit assembly.

Still another object is to provide a method for generating printed circuit wire-routing paths which will minimize the undesired electrical interaction of noise coupling between wire segments, while minimizing the number of printed circuit layers required for the multiplanar assembly.

Finally, consider the situation where a numerically controlled drawing apparatus is to be utilized to prepare the final layout drawing for each of the printed circuit interconnection planes after the wiring paths have been determined and defined and evaluated. Under these circumstances it is desirable to convert the routing designations into numerical control signals which can be interpreted by the drawing to apparatus to control its operation.

Therefore, it is another object of this invention to provide apparatus and method for providing numerical control signals to a drawing apparatus for controlling the preparation of the final layout drawings for each of the printed circuit interconnection planes.

Still another object of this invention is to provide the option of preparing the final layout drawings as the printed circuit paths are generated or to provide apparatus for storing the numerical control signals with the final drawing preparation being delayed until a later time.

These and other more detailed and specific objects will be disclosed in the course of the following specification, reference being had to the accompanying drawings, their subject matter being described in the following section.

FIGURES

Figure 3A:
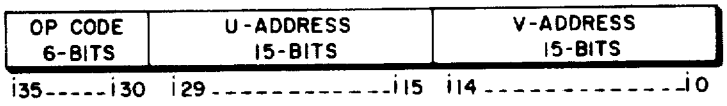
Figure 3B:
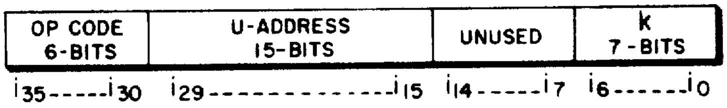
Figure 3C:
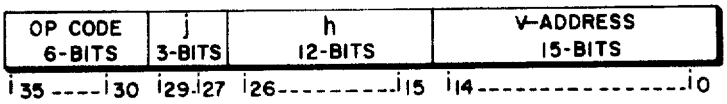
Figure 2:
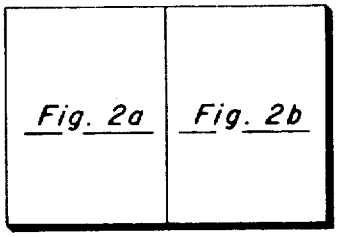
FIG. 2 illustrates the interrelationship of FIG. 2*a* and FIG. 2*b;*
Figure 2A:
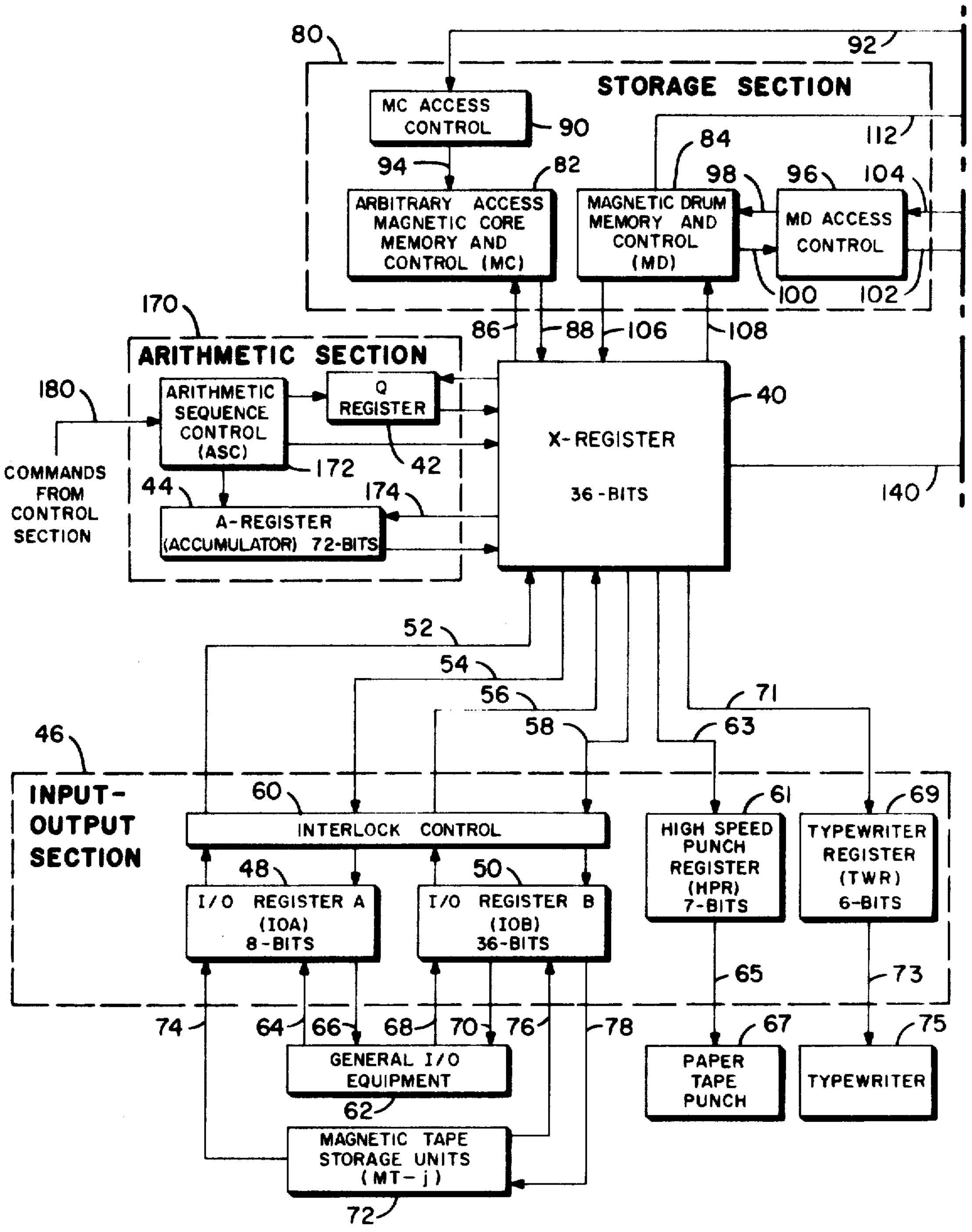
Figure 2B:
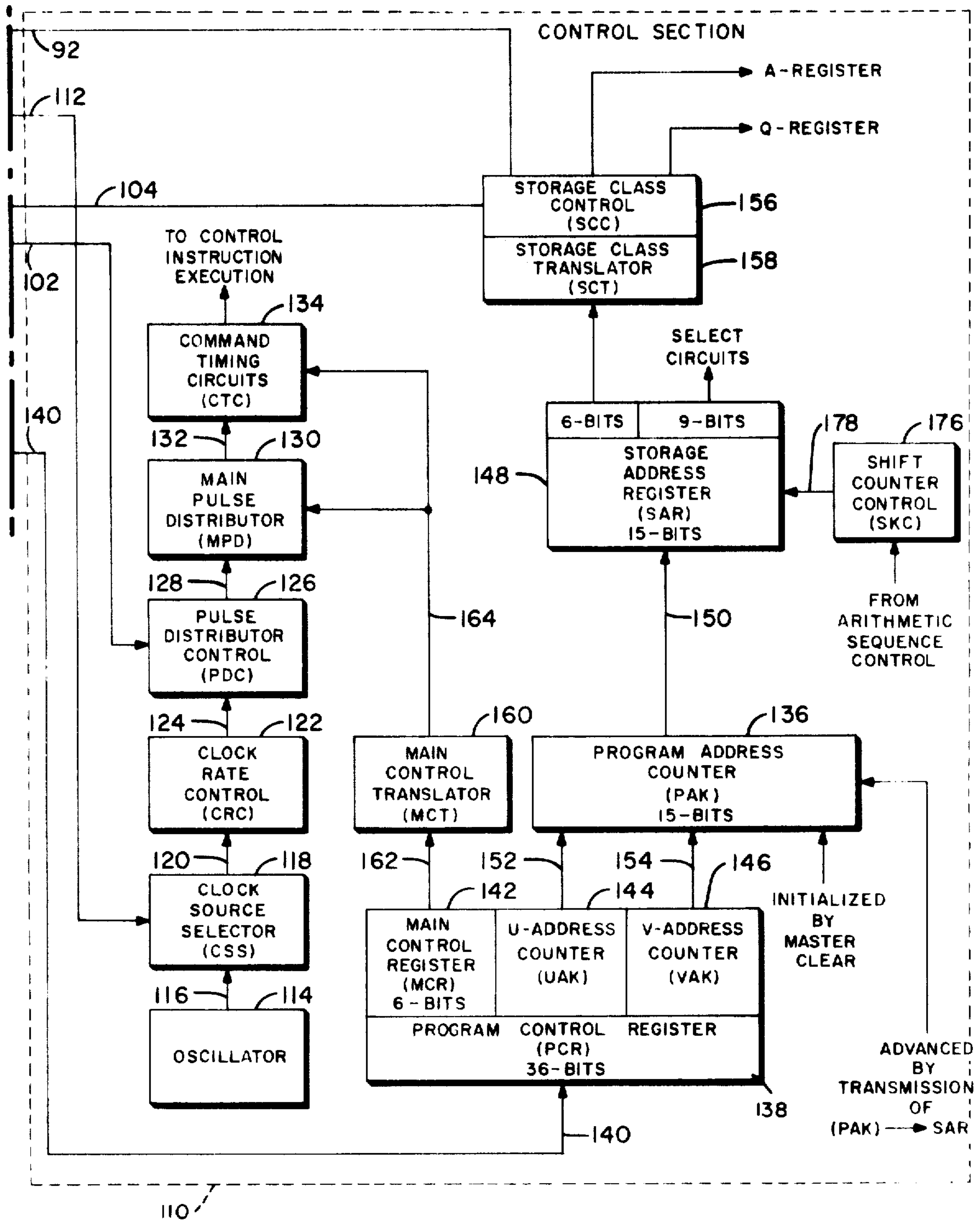
Figure 5:
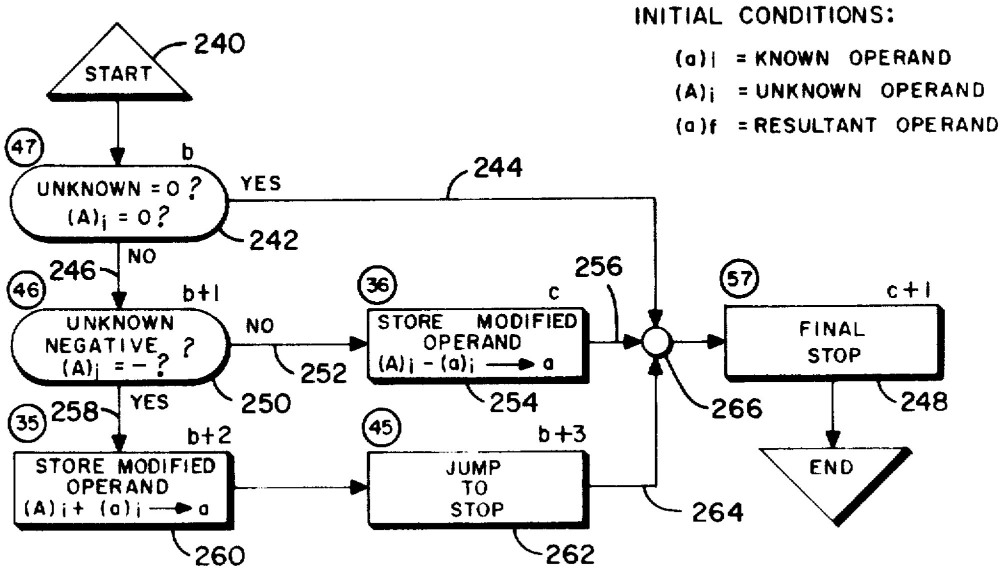
Figure 6A:
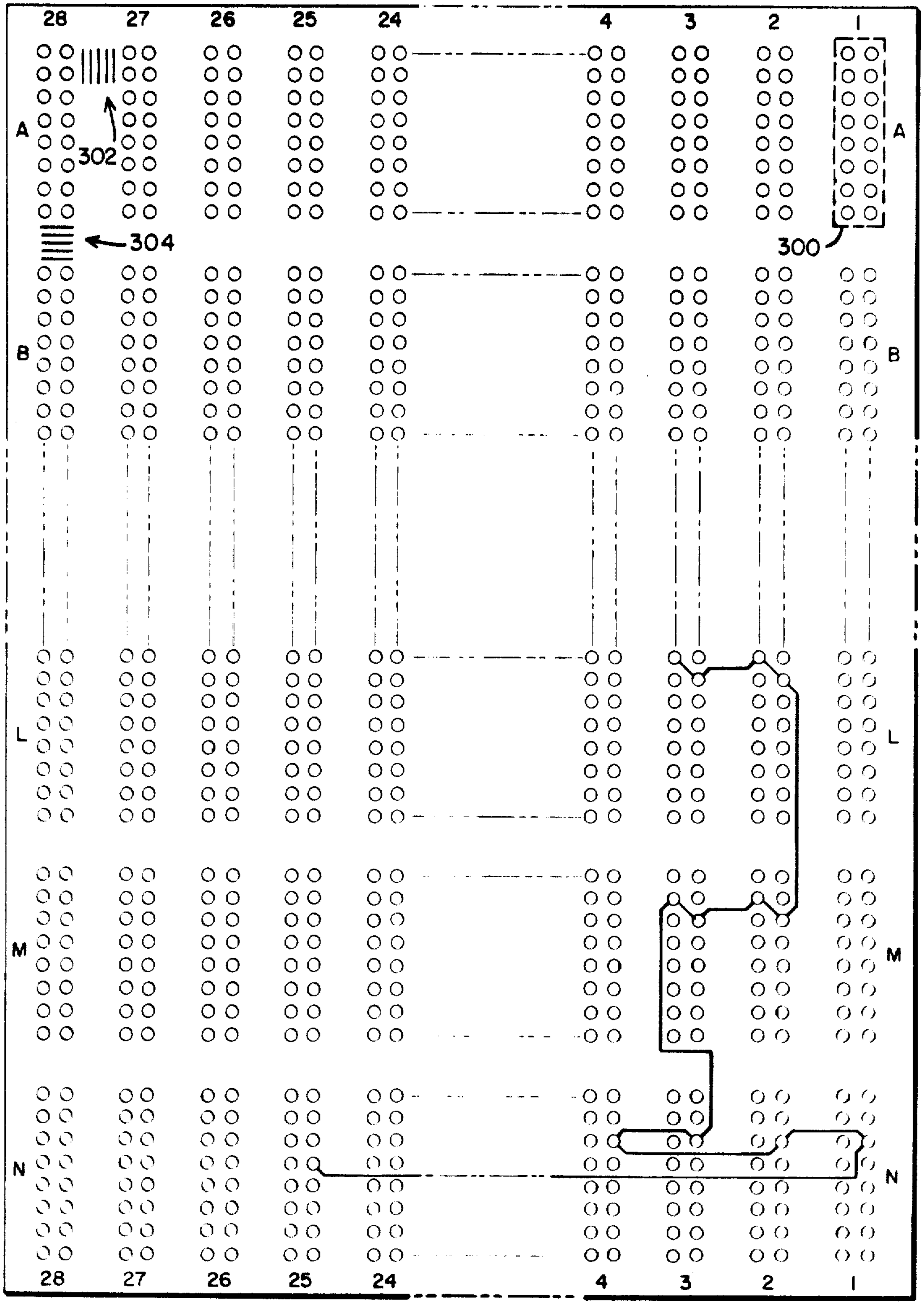
Figure 6B:
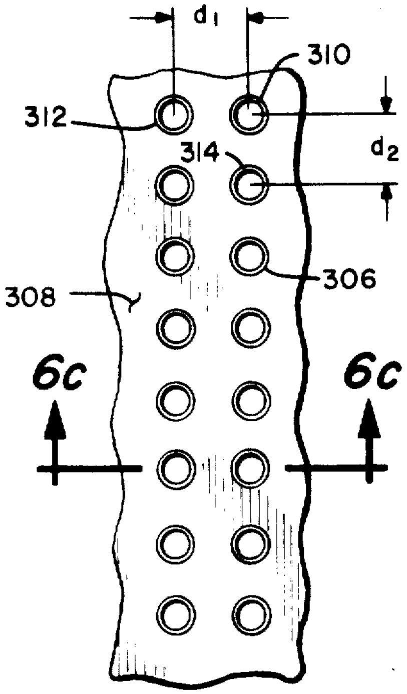
Figure 7:
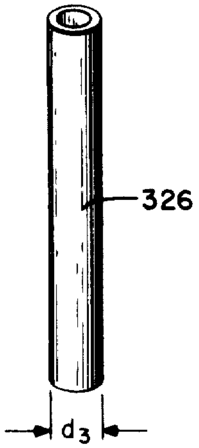
Figures 6C, 8:
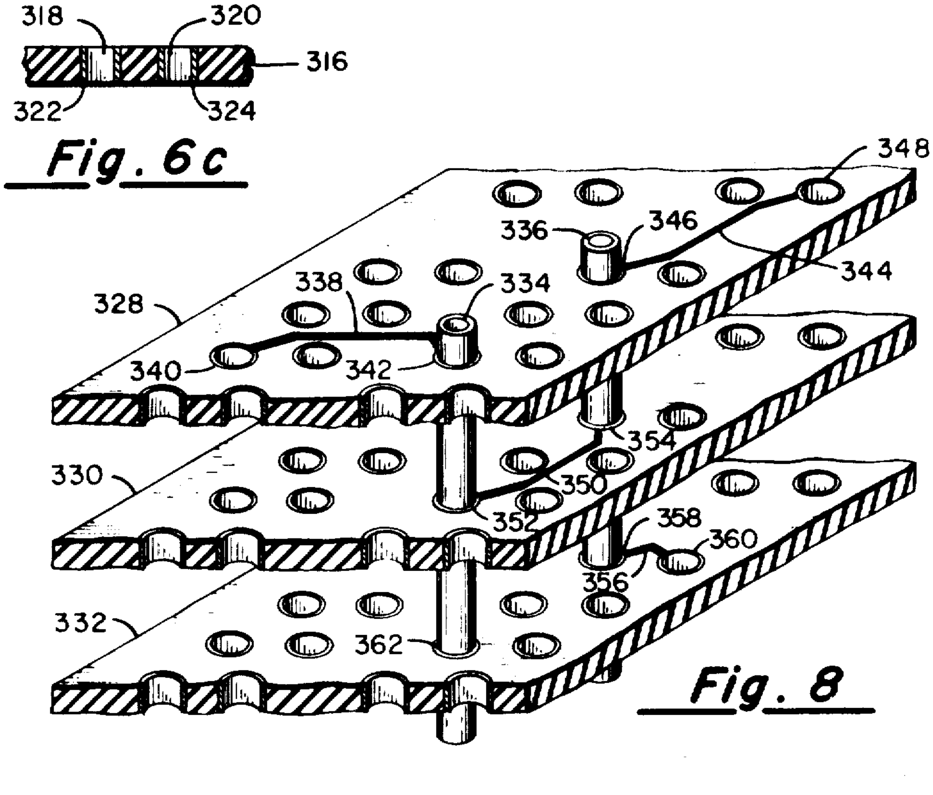
Figure 10:
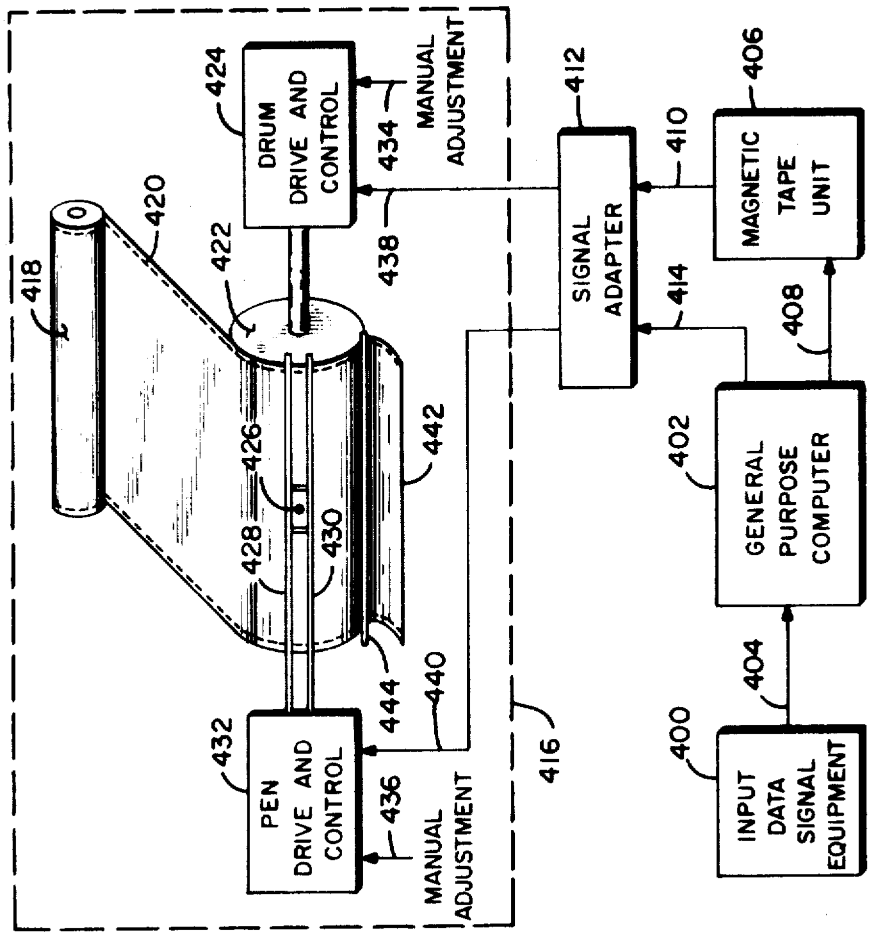
Figure 9:
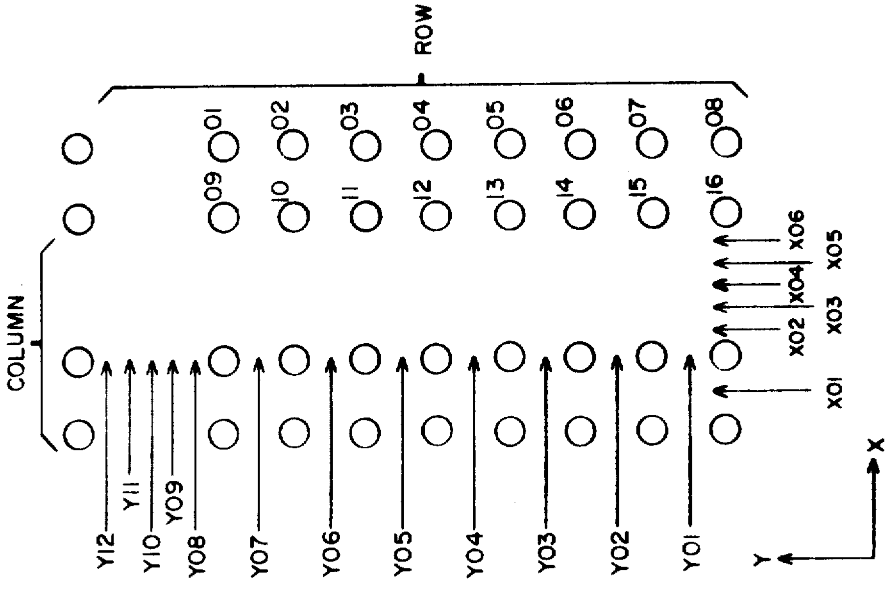
Figure 11:
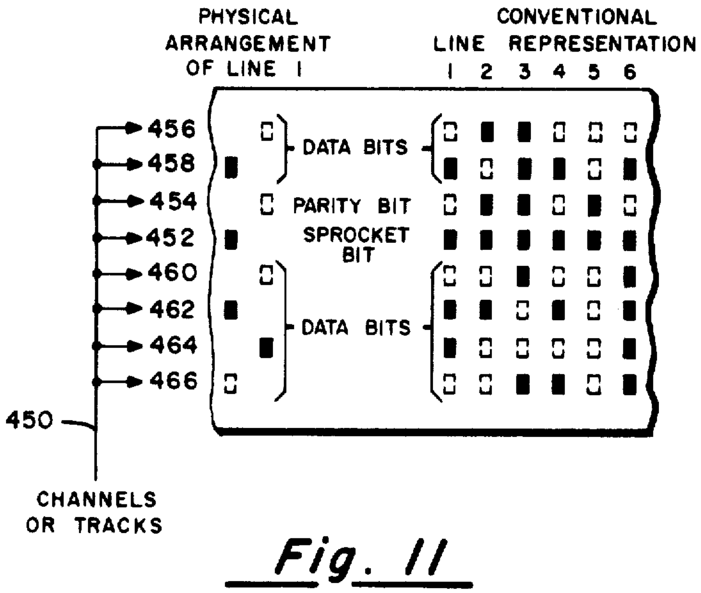
Figure 12:
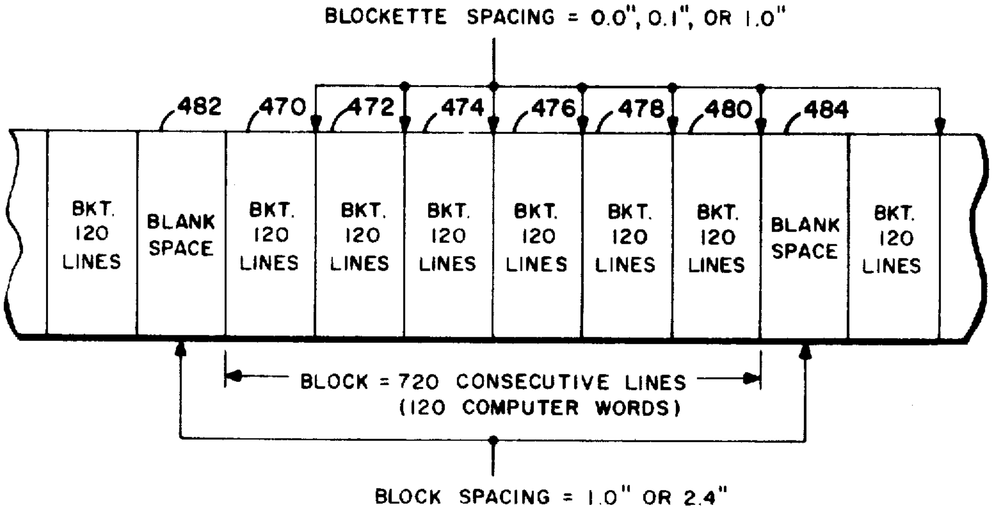
Figure 13:
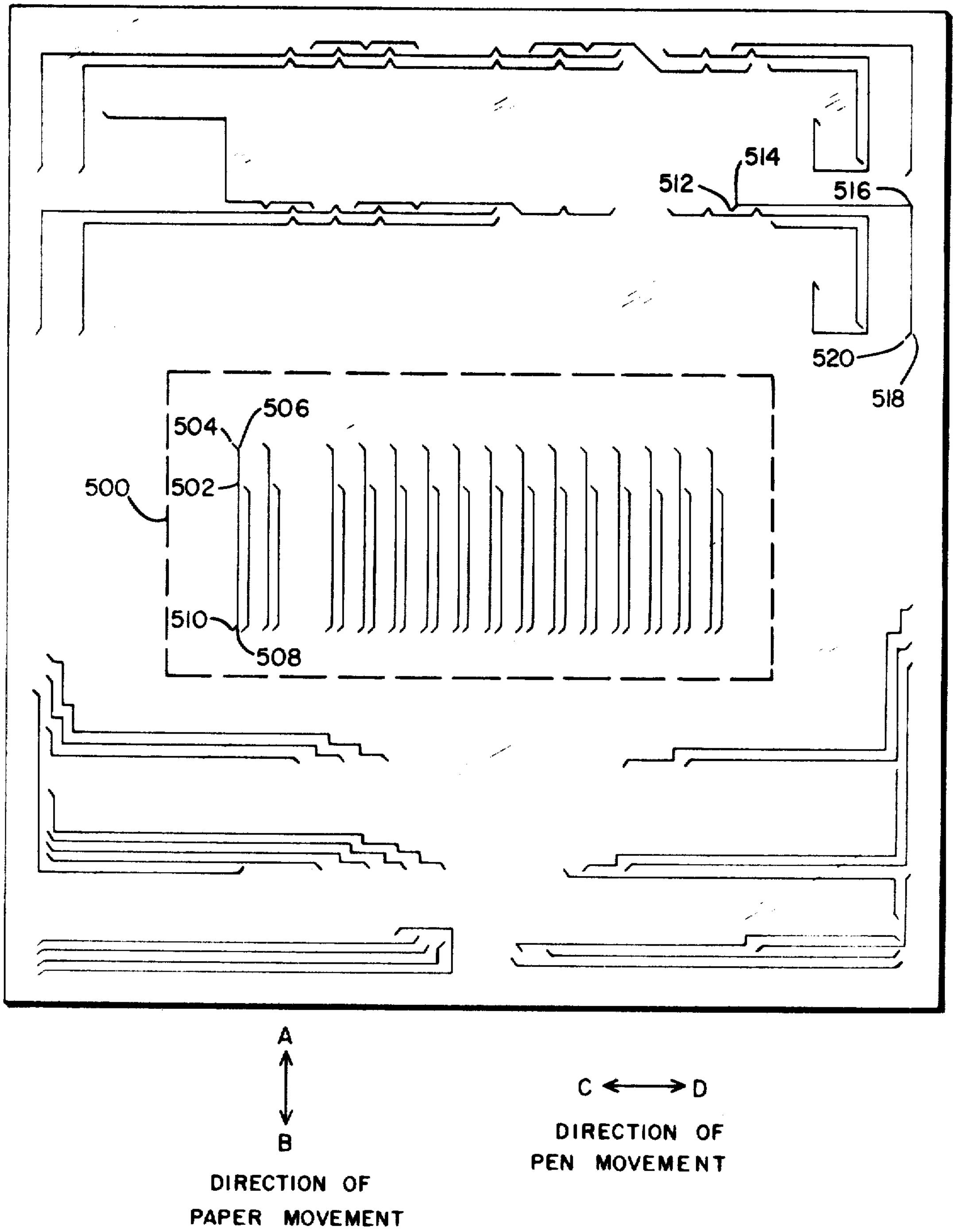
Figure 14:
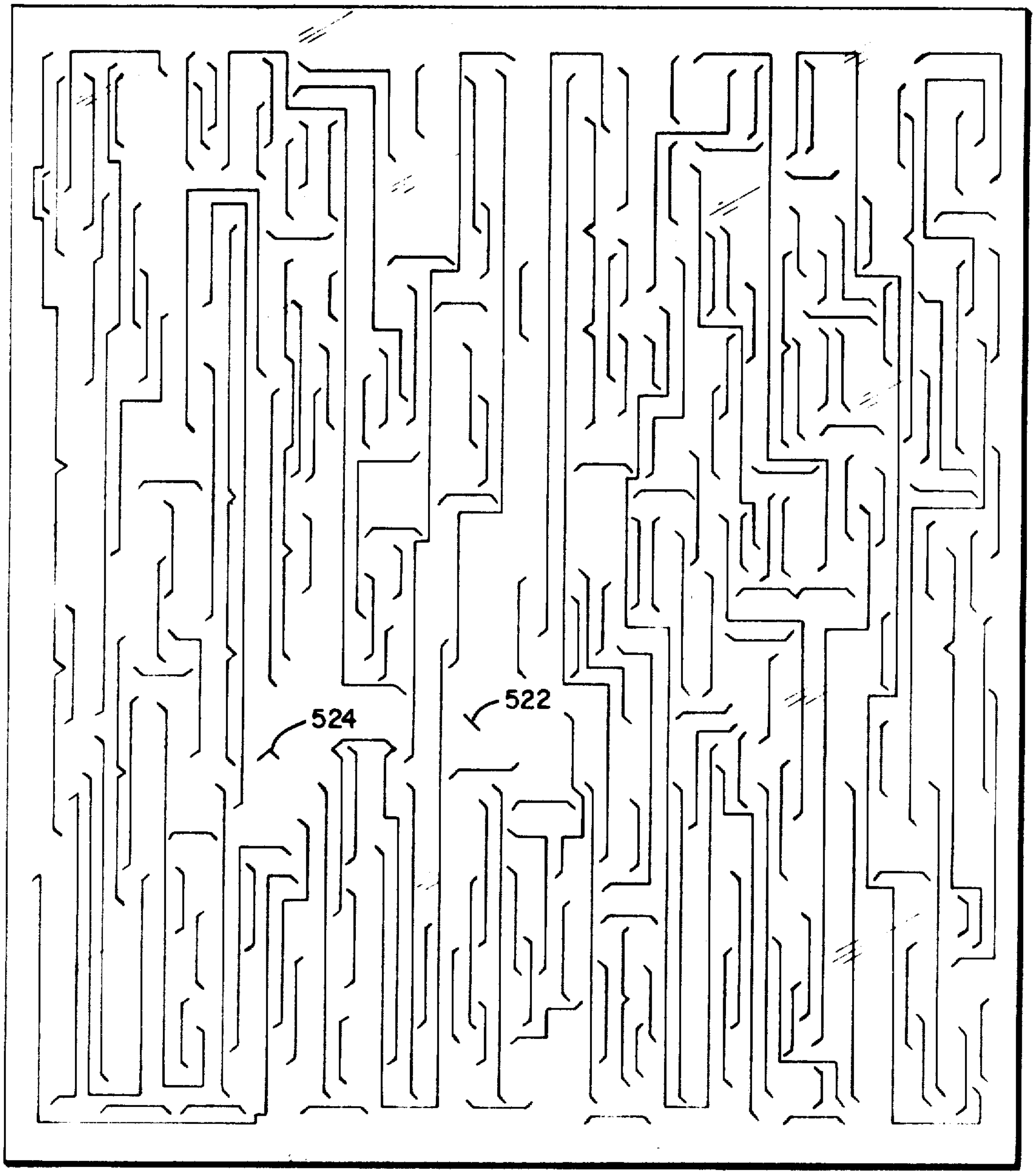
Figure 15:
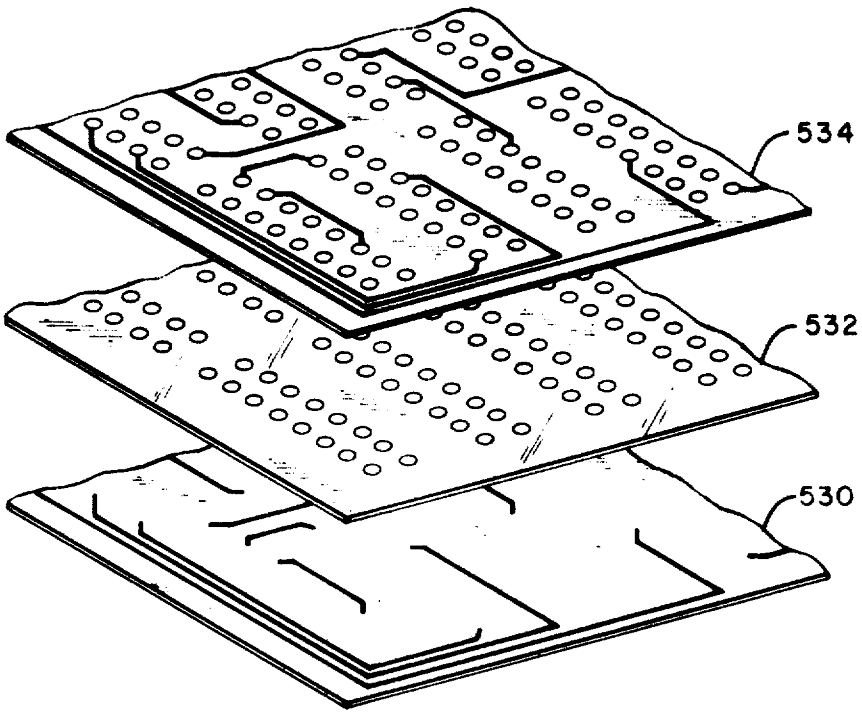
Figures 16, 17:
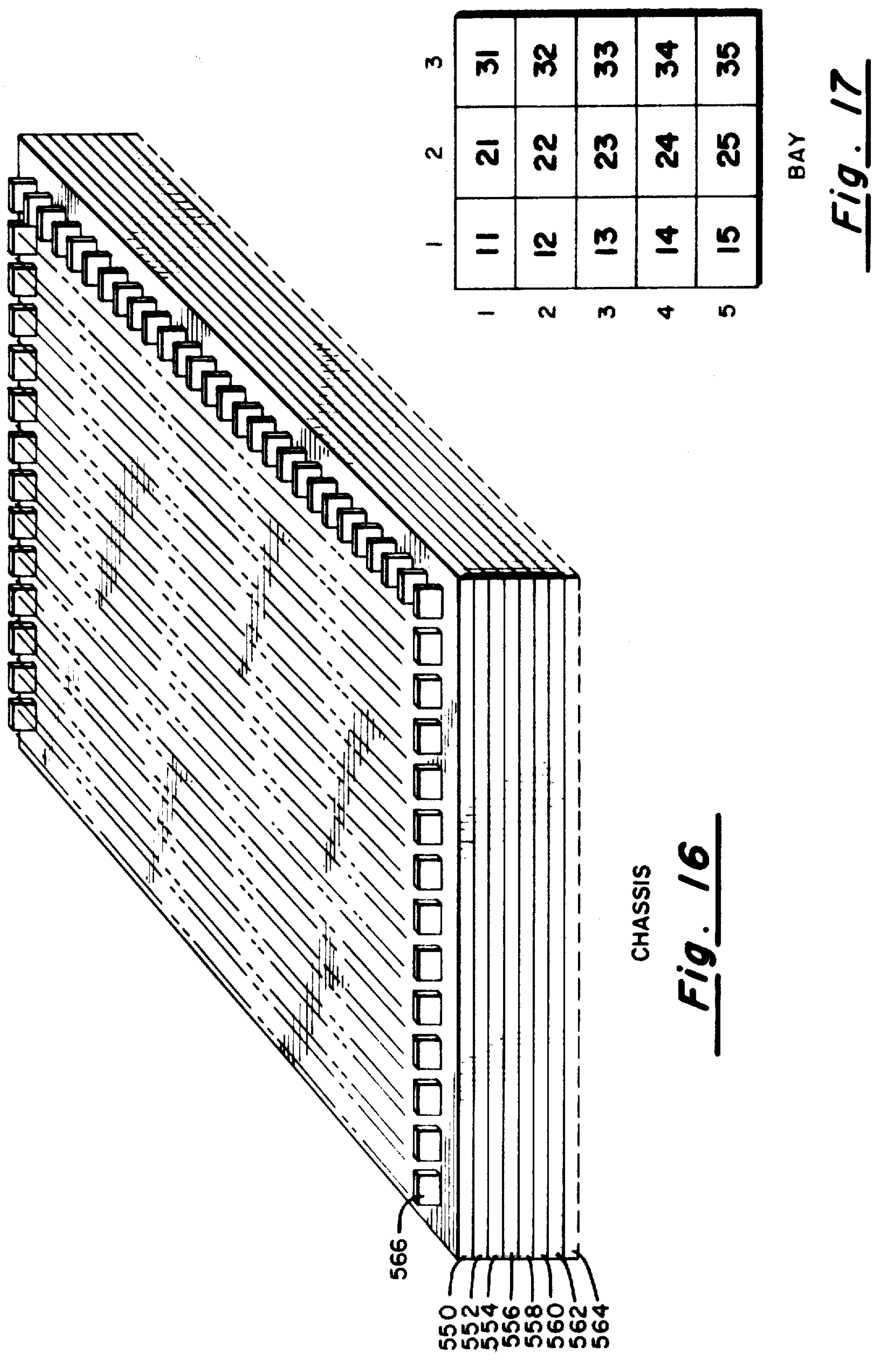
Figure 18:
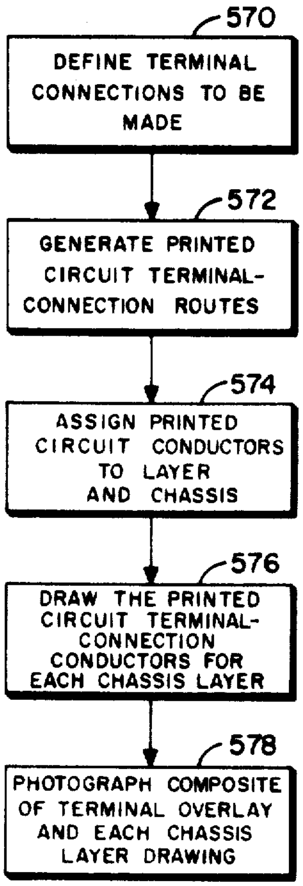
Figure 19:
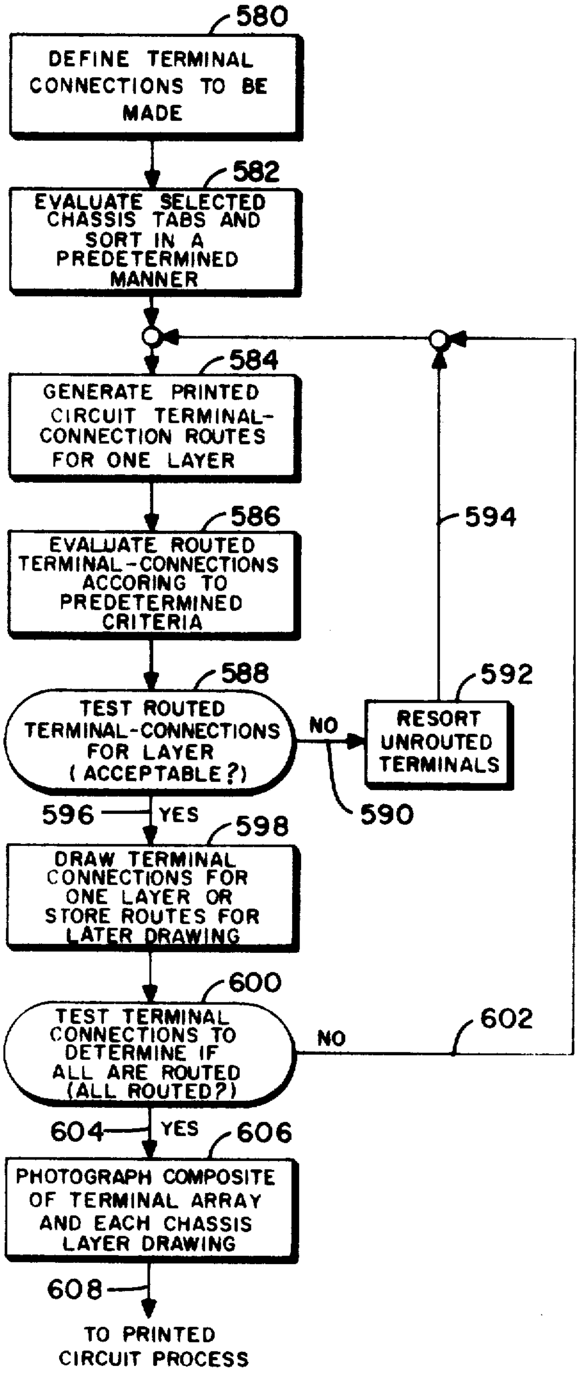
Figures 20, 29:
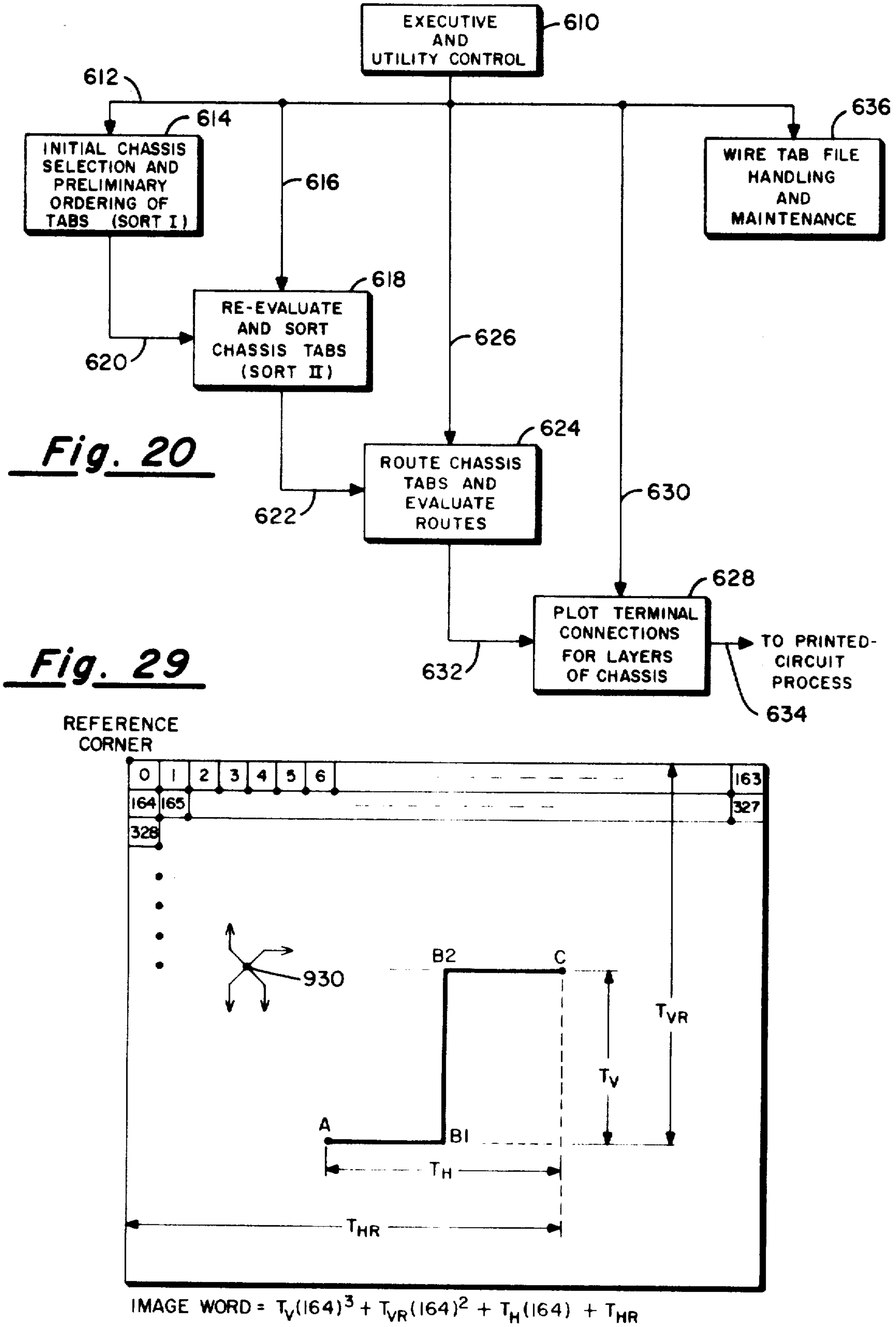
Figure 21:
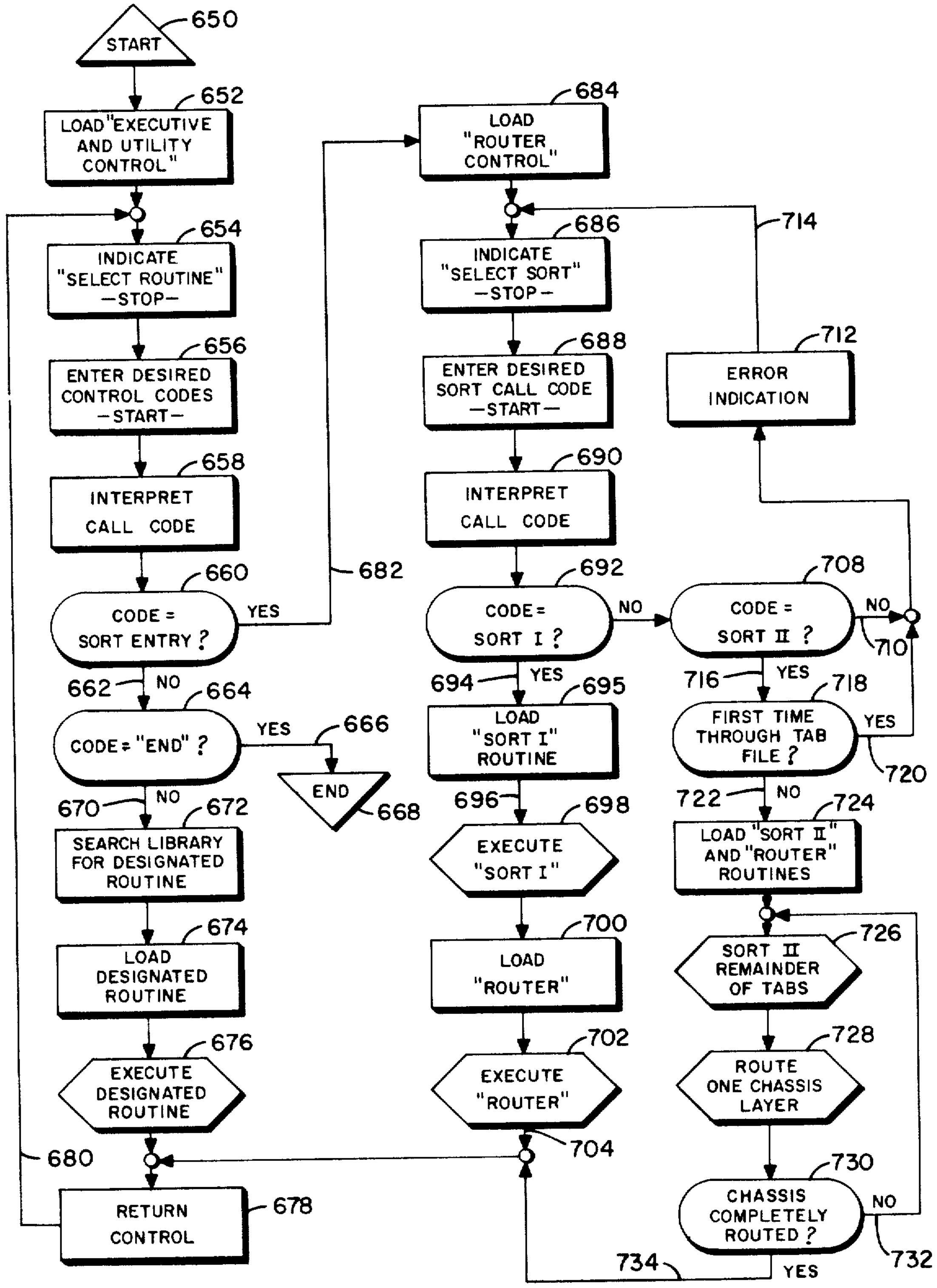
Figure 22:
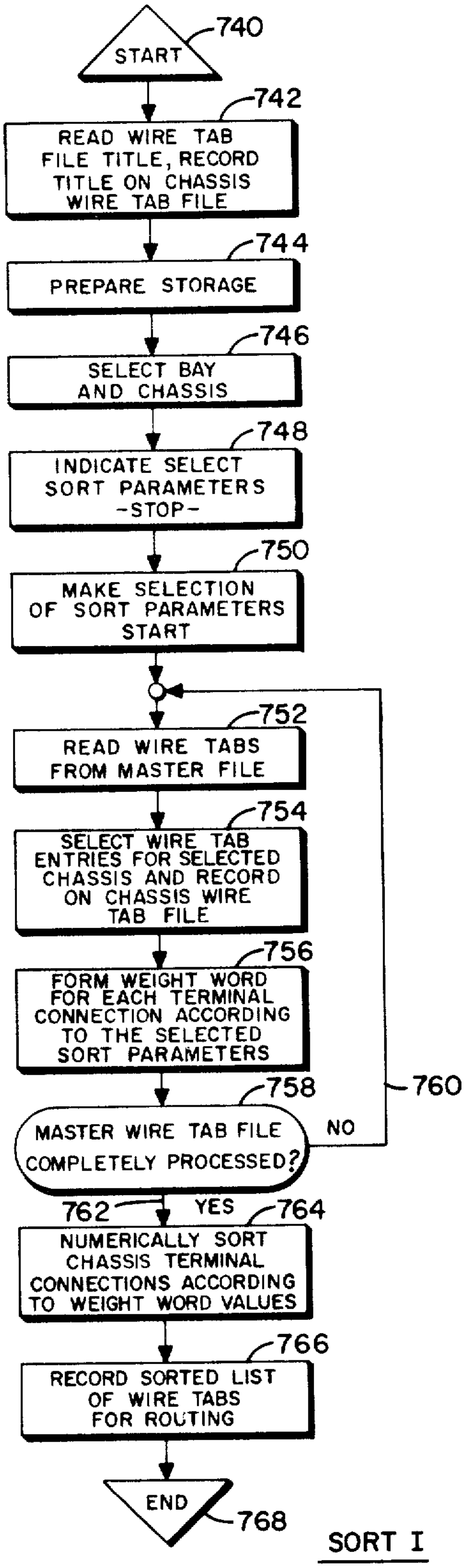
Figure 24:
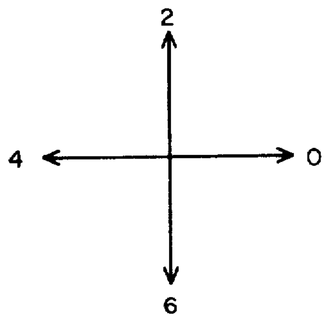
Figure 25:
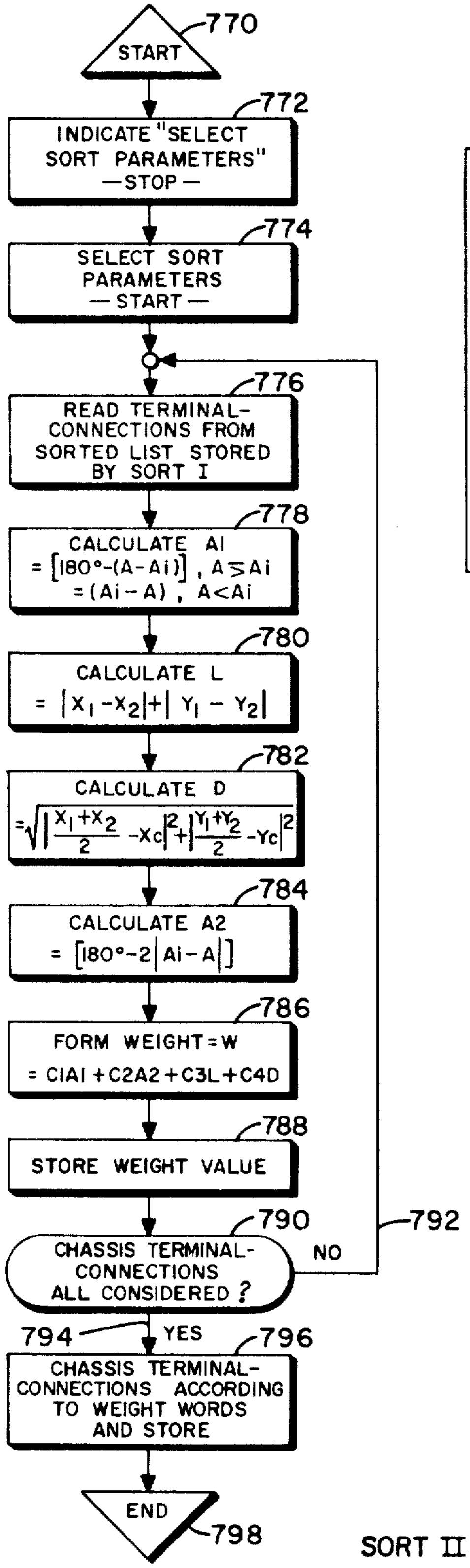
Figure 26:
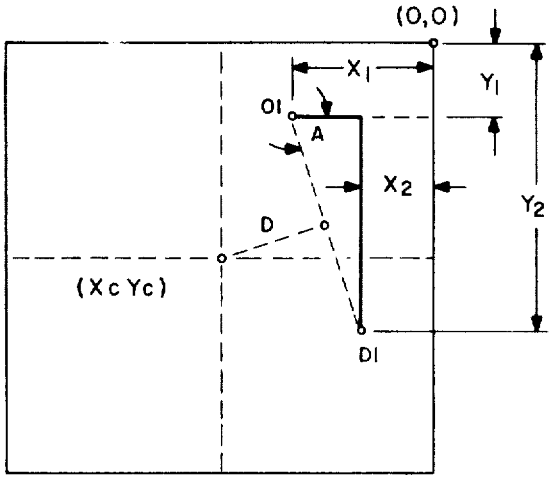
Figures 27, 27B, 28, 30:
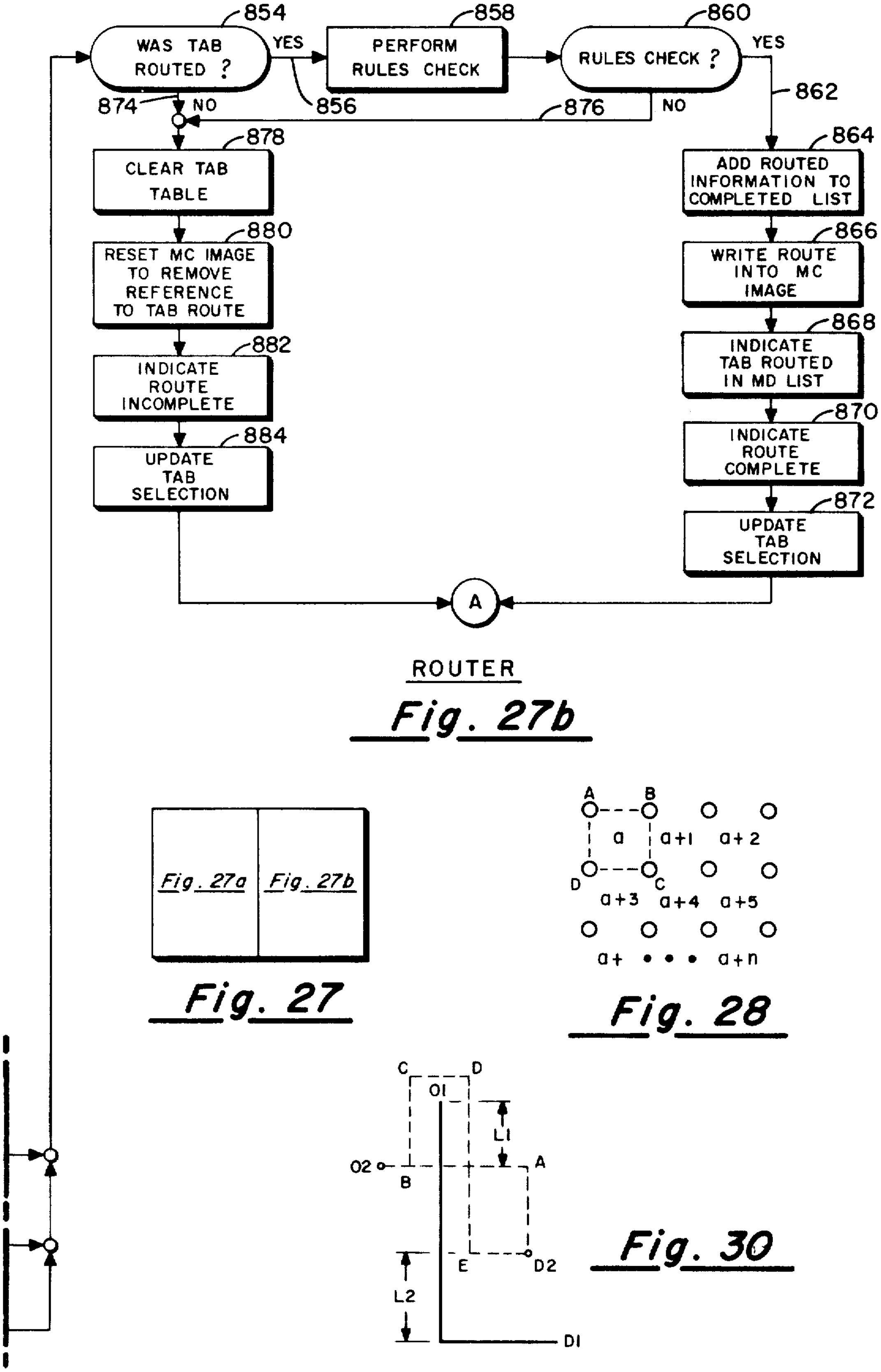
Figure 27A:
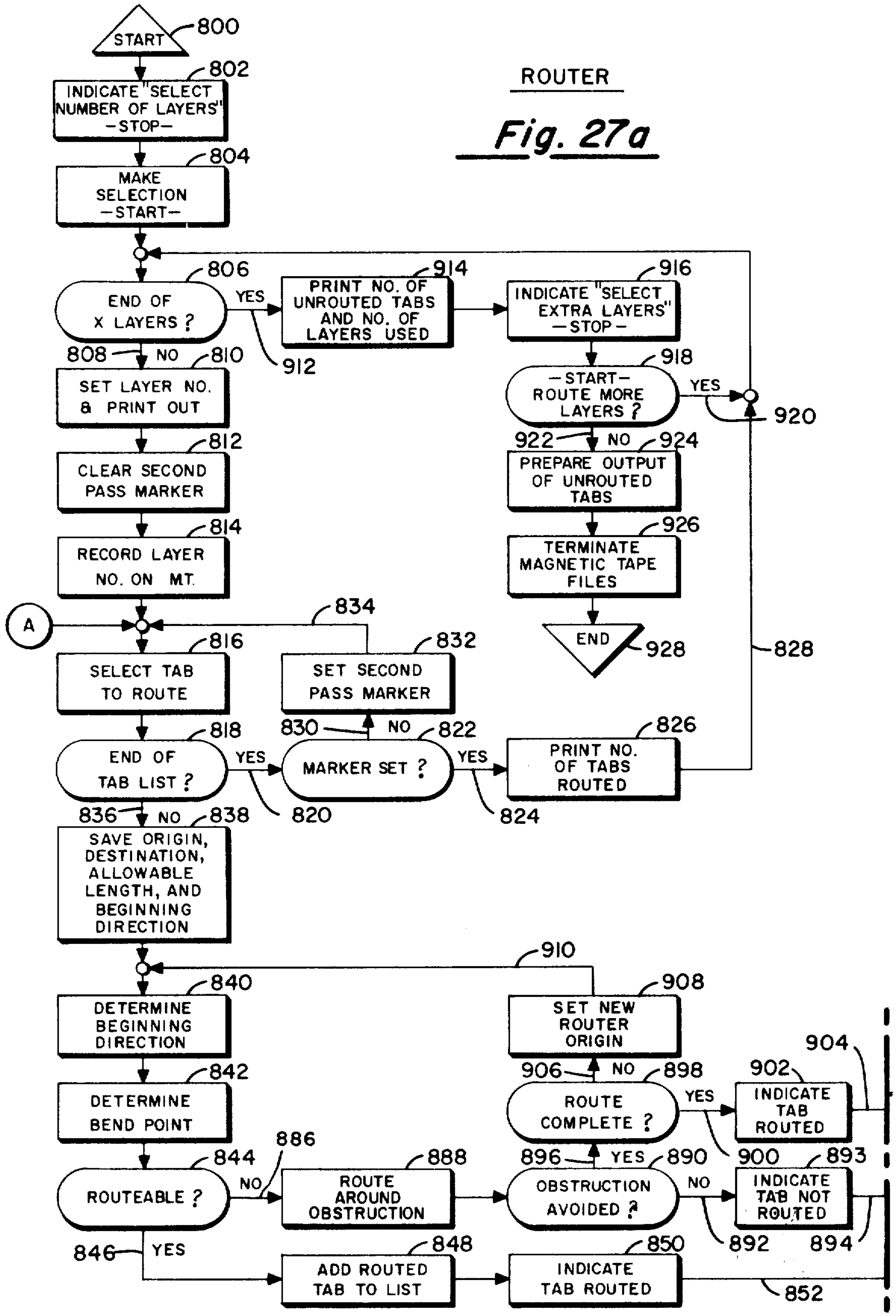

FIG. 2*a* and FIG. 2*b* together are a simplified block diagram of a general purpose computer;

FIG. 3*a*—FIG. 3*c* illustrate the various types of instruction formats utilized by the general purpose computer;

FIG. 4*a* —FIG. 4*f* illustrate the various flow diagram symbols utilized in the specification;

FIG. 5 is a logic flow diagram which illustrates a solution of a sample problem;

FIG. 6*a* is a schematic diagram of a plan view of an illustrative terminal array of apertures which can have selected ones thereof interconnected by printed circuit wiring paths according to the inventive process;

FIG. 6*b* is an enlarged schematic view of a hole-grouping broken out of terminal array of apertures shown in FIG. 6*a*, and represents the terminal array for a single circuit module which is to be utilized;

FIG. 6*c* is a cross-sectional view taken along line 6–6 in FIG. 6*b*, and illustrates the plated-through material in the hole array;

FIG. 7 is a perspective view of an interplane coupling conductor pin;

FIG. 8 is a perspective view of a portion of a multilayer stack of printed circuit interconnection planes, shown in a spaced apart manner for illustrative purposes;

FIG. 9 is a schematic illustration of a section of the hole 5 array described in FIG. 6*a*, and illustrates permissible wiring spacing;

FIG. 10 is a block and schematic diagram of the apparatus utilized to draw the printed circuit conductor paths;

FIG. 11 illustrates the physical arrangement of the magnetized spots on a conventional magnetic tape;

FIG. 12 schematically illustrates the format of recorded data on a characteristic magnetic tape;

FIG. 13 is an illustration of some of the characteristic types of printed circuit wiring paths that can be generated with this invention;

FIG. 14 is an illustration of a characteristic array of printed wiring paths for one layer in a multilayer system for interconnecting terminals;

FIG. 15 illustrates how the hole array and the printed wiring paths are combined to form a completed layout;

FIG. 16 is a schematic perspective view of an assembly of layers of printed circuit terminal interconnections;

FIG. 17 illustrates the arrangement of chassis to form the next larger segment of equipment configuration;

FIG. 18 is a process diagram illustrating the operations to be performed in the manufacturing process;

FIG. 19 is a process diagram illustrating in more detail the steps described in conjunction with FIG. 18;

FIG. 20 is a block diagram which illustrates the relationship of the executive and utility control to the process steps;

FIG. 21 is a logic flow diagram of the executive control;

FIG. 22 is a logical flow diagram of the steps and the process which perform the sorting of terminal connections according to a predetermined plan;

FIGS. 23*a* through 23*i* illustrate the various parameter combinations utilized in ordering the terminal-connection information;

FIG. 24 illustrates the numerical designations provided for each wire run direction;

FIG. 25 is a logic flow diagram of the steps in the manufacturing process which permits each layer in the multilayer array to be further manipulated to optimize printed circuit wiring layout;

FIG. 26 illustrates the parameters utilized in the layer manipulation illustrated in FIG. 25 and designates the reference points;

FIG. 27 illustrates the relationship of FIG. 27*a* and FIG. 27*b;*

Figure 32:
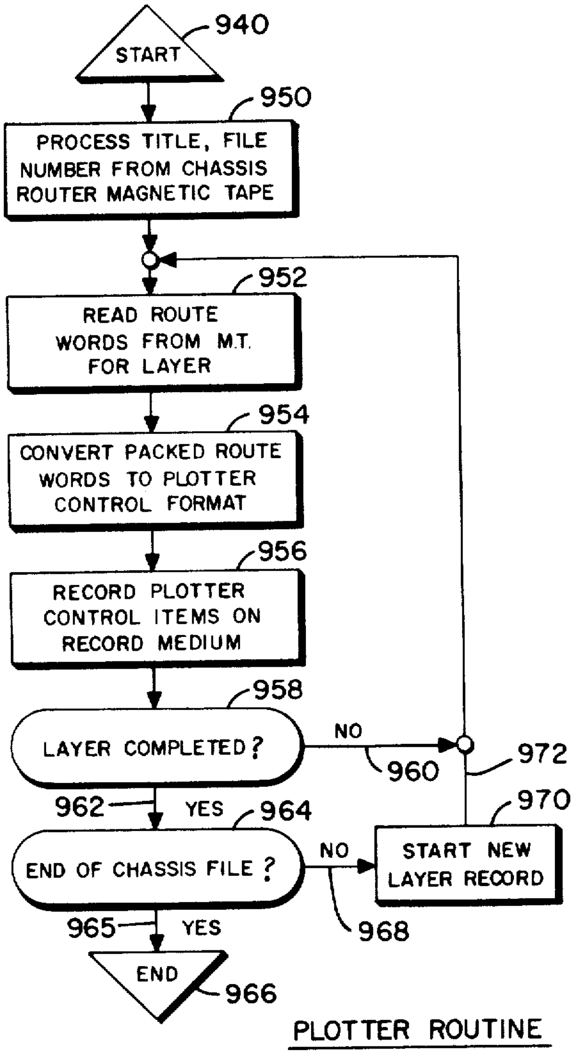
Figure 31:
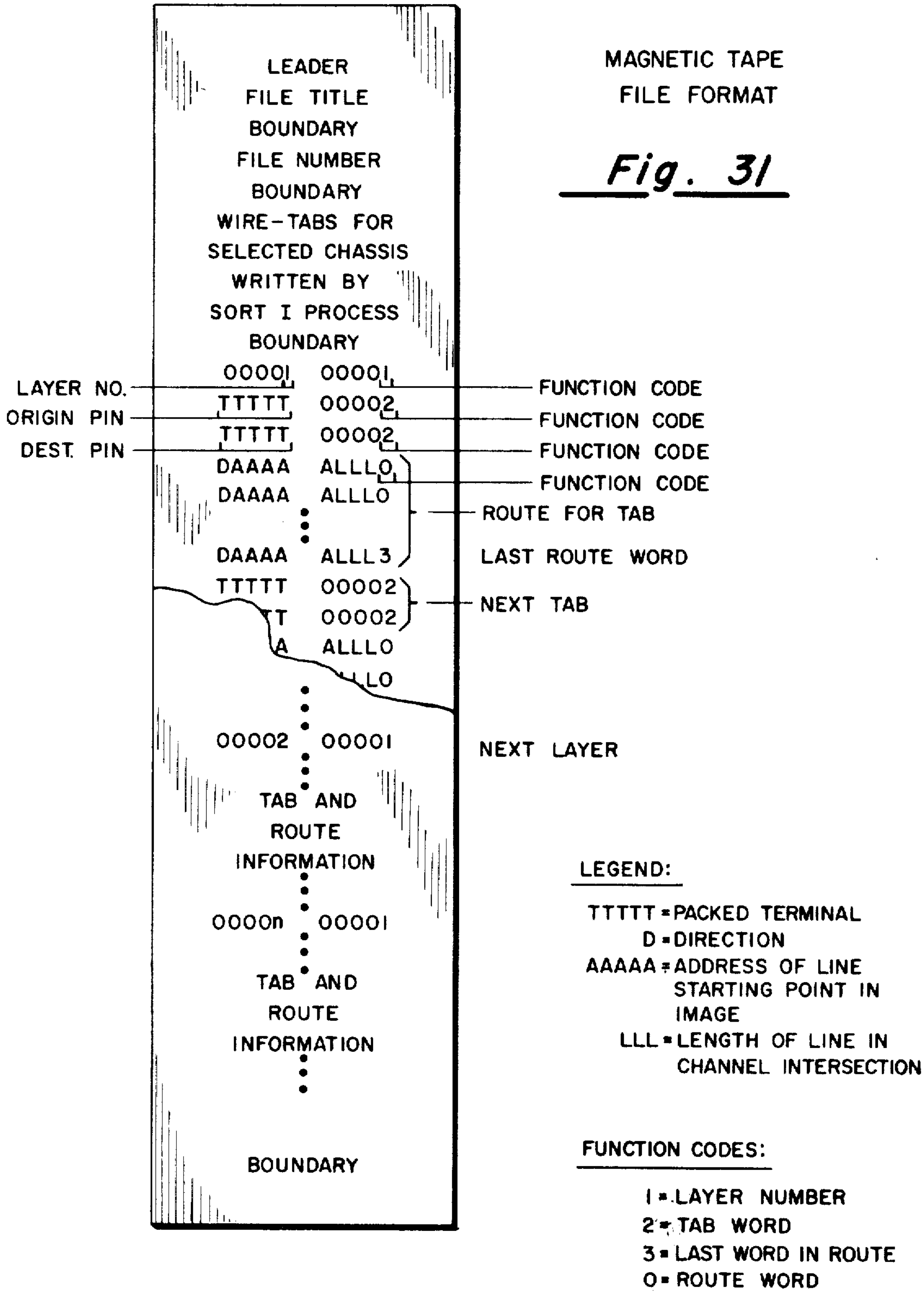

FIGS. 27*a* and 27*b* together are a logic flow diagram of the steps utilized in the manufacturing process to automatically route the printed circuit wiring for each terminal connection;

FIG. 28 illustrates the routable channels and their means of designation for this illustrative embodiment;

FIG. 29 is an illustration of the channel intersection areas and illustrates a sample printed circuit wire path and its formation in an image word;

FIG. 30 illustrates the method of routing which permits the avoidance of obstacle printed circuit wire paths to complete the terminal connection;

FIG. 31 illustrates schematically the format of the magnetic tape file that is formed as a consequence of the sorting of the terminal-connections and includes the routed terminal-connection information; and FIG. 32 is a logic flow diagram of the process steps utilized to plot the resultant routed terminal-connections.

MANUFACTURING SYSTEM

Figure 1:
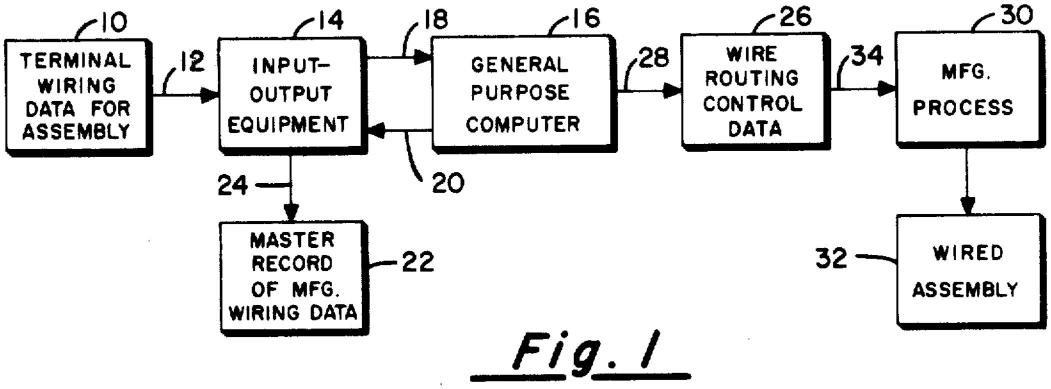
FIG. 1 is an information flow and block diagram of an improved manufacturing system for preparing multiplanar printed circuit terminal interconnection assemblies.

FIG. 1 is an diagram which illustrates the manufacturing system in which the subject invention may be utilized. It illustrates an approach wherein equipment designers can utilize computing apparatus in conjunction with automated manufacturing apparatus to arrive at a completed product, while reducing the amount of tedious handwork that would otherwise be necessary. At the outset the equ pment designers generate the logic equations which define a particular equipment. This file of logic equations is transformed onto a record medium, which may be a magnetic tape, punched cards, or punched paper tape. The nature of the logic equations which defined the equipment is such that by appropriate limitations to the building-block circuits being employed, the interterminal wiring of the circuits is defined. The logic designers having generated the logic equations and transformed them onto a record member, have in effect generated the terminal wiring data for the assemblies within the computer. In FIG. 1, this terminal wiring data is illustrated as block 10 and is fed via information path 12 to the input-output equipment 14 of a general purpose computer 16. The characteristics of the general purpose computer 16, with its associated input-output equipment 14, will be described in more detail below. It is the function of the input-output equipment to translate the information read, which represents the terminal wiring data, into signals which may be utilized by the computer 16. These signals are transmitted over information path 18 from the input-output equipment to the computer. It is the function of the computer to generate numerical control instructions to be utilized in forming the routed printed circuits for interconnecting the logic circuits. The computer accomplishes this function by operating on the terminal wiring data, as supplied via information path 18, to form the individual wiring patterns for each terminal connection and to assign each interconnecting conductor path to a selected level in the stack according to predetermined criteria which will cause optimum circuit and manufacturing efficiency. The nature of this routing and assigning will be described in more detail below. Having accomplished the route generation, the computer 16 supplies the resultant data via transmission path 20 through the input-output equipment 14 to a master record medium of manufacturing wiring data 22 by way of information path 24. This master record of manufacturing data is maintained to facilitate changes in the design as they may occur during early design stages by permitting new wiring data to be merged with the master record to form a new master record. It operates also to provide a continuous history of the manufacturing wiring data for each equipment. The computer 16 also operates to generate the ordered wire routing numerical control manufacturing data 26 on appropriate record mediums from information signals supplied via path 28. The ordered numerical wire routing control manufacturing data is supplied on a record medium such as printed pages, punched cards, magnetic tapes, or punched paper tape for this embodiment. The illustrative example utilized herein will be limited to the printed page variety.

The Manufacturing Process 30 is utilized to generate printed circuit panels and to automatically wire an unwired assembly of terminal 32. The nature of the assembly terminals and the wiring will be described individually in more detail in the following paragraphs. The Wire Routing Control signals data is fed via information path 34 to the Manufacturing Process 30 to wire individually each connection which is to couple the various terminals in the manner specified by the terminal wiring data 10. This wiring continues until all of the terminals have been wired as ordered, and results in a final wired assembly 36 which is ready for inclusion in the desired equipment. The foregoing discussion has proceeded generally, and each step will be elaborated on and defined more fully in the following paragraphs.

COMPUTER CHARACTERISTICS

An embodiment of this invention utilizes a general purpose digital computing system which incorporates a UNIVAC Scientific, Model 1103A, Computer. This computer will be referred to hereinafter as the 1103A, and is of a stored program type. That is, once the program of instructions is written and coded in a form acceptable to the 1103A, it is entered into the storage section via one of the pieces of peripheral equipment. From this point on, the computer, upon proper initiation, will execute a series of instructions which make up the program to thereby perform its intended function. The computer performs 41 different arithmetic and logical operations, and to attain high computing speed, it operates in the parallel mode, i.e., all digits of a number are operated upon simultaneously. Internal arithmetic operations are in the binary number system.

A system of "two-address" logic is employed. The basic word size is 36 binary digits (bits) and is the arbitrary size of the respective memory registers. An instruction word consists of a 6-bit operation code (OP) and two 15-bit execution addresses. The OP code specifies which of the 41 possible operations is to be performed. The operation of the execution addresses are different for the various types of instructions; but, in general, they specify registers in the memory section from which operands are obtained or in which results are stored.

The 1103A computer employs a one's complement system of notation for the performance of arithmetic operations. The leftmost bit of a number is the sign bit of that number, and the binary point is considered to be to the right of the lowest-order bit. Thus, if the leftmost bit of a number is 0, the number is said to be positive, while if it is a 1, the number is said to be negative. In the one's complement number system, a negative number can be obtained by complementing all bits, and including the sign bit of the corresponding positive number. The complementation is accomplished by altering all 0 values to 1 and altering all 1 values to 0. In the 36-bit register, integers from $1-2^{35}$ up to $2^{35}-1$ may be represented; while in the accumulator, which is a 72-bit register, integers from $1-2^{71}$ up to $2^{71}-1$ may be represented. In one's complement notation, each of the integers having unique representation with the exception of a 0 value. 0 has both a negative and positive notation; however, because of the nature of the arithmetic operations in the 1103A computer, a negative 0 cannot be generated as a result of an arithmetic operation. Integers not lying in the above ranges as well as fractional quantities that may occur in certain problems can also be handled by suitably scaling such quantities so that the resulting quantity can be represented by machine numbers. The scaling can either be accomplished by using the scale factor instruction, or by appropriate subroutine programs.

A simplified block diagram of the 1103A computer appears in FIG. 2*a* and FIG. 2*b*, and for explanatory purposes may be described in four major sections; Input/Output, Storage, Control, and Arithmetic. Abbreviations 30 of the diagram are explained as the various sections are discussed. These four sections may be described briefly as follows:

1. Input/Output Section-effects insertion of information into the storage section and delivers the results of a computation to external devices;
2. Storage Section-store information and program instructions in coded binary manifestations within the computer;
3. Arithmetic Section-performs digital manipulations on binary manifestations to accomplish arithmetic and logical operations; and
4. Control Section-interprets the stored program of instructions and directs its execution.

The general features of each of the above and the manner in which each functions with respect to the others in the execution of a program will be discussed in the following paragraphs in conjunction with the block diagram of FIG. 2*a* and FIG. 2*b*. The discussion is maintained at a block diagram level due to the fact that other general purpose computers of equal or greater capacity could be used.

Each of the registers are comprised of a plurality of bistable flip-flop circuits. These flip-flops can be any one of the type well known in the art.

Before considering individually the respective sections of the 1103A computer, three of the multipurpose registers will be considered briefly. These consist of the X-register 40, the Q-register 42, and the A-register 44.

The X-register 40 is a 36-bit flip-flop register which is capable of having its contents complemented. The X-register is nonaddressable and operates primarily as an exchange register through which data words are transmitted, and in some instances temporarily held, for the handling of operands and their transfer from one location in the computer to another. An auxiliary function of the X-register during arithmetic sequences is to hold the addend, subtrahend, multiplicand, or divisor in the corresponding arithmetic operation.

The Q-register 42 is a 36-bit flip-flop register which is capable of shifting the data manifestations stored therein. The Q-register is an addressable storage register; that is, operands may be programmably obtained from the Q-register or may be stored therein at the end of a computer operation. As an arithmetic register, the Q-register holds the multiplier, quotient, or the logical multiplier in the respective corresponding arithmetic operations.

The A-register 44 (Accumulator) is a 72-bit flip-flop register with shifting properties. This register is subtractive in nature. The A-register is logically divided into two halves termed A Right ($A_R$) and A Left ($A_L$). The higher-ordered 36 stages provide the A-register with double precision properties. In the normal arithmetic operations, the algebraic sign is carried by $A_L$. It should be noted that the transmissive connection is made to X from both $A_R$ and $A_L$, thereby yielding the capability of handling the respective paths independently. As a storage register, the accumulator provides storage for either the single-extension (36 bits), or double-extension (72-bits) of a single computer word. The extension refers to the characteristic of the sign condition of the operand being considered. In a single-extension operation, the operand is entered in $A_R$ and $A_L$ is cleared to 0 irrespective of the sign of the operand. In a double-extension operation, the operand is entered in $A_R$ and $A_L$ is conditioned to store all one's if the leftmost digit of $A_R$ is 1 (thereby indicating a negative value), or $A_L$ is set to 0 if the leftmost digit of A R is 0. The A-register is individually addressable, and either $A_R$ or $A_L$ is directly accessible. As an arithmetic register, the A-register holds the sum, difference, product, and dividend (and remainder) for the respective corresponding arithmetic operations. For addition and multiplication, the sums and products may be accumulated up to the full 72-bit capacity.

INPUT/OUTPUT SECTION

The Input/Output Section shown enclosed in dashed block 46 consists primarily of the Input/Output Register A hereinafter referred to as IOA, labeled 48; Input/Output Register B hereinafter referred to as IOB, labeled 50; and lock out circuits for both IOA and IOB. IOA is an 8-bit register and is coupled to eight inputs to the lower-ordered 8 digit positions of the X-register 40 via cable 52, and to receive inputs from the lower-ordered eight digit positions of the X-register via cable 54. IOB is a 36-bit flip-flop register and provides signals to the X-register via cable 56, and receives signals from the X-register on Cable 58. Both IOA and IOB serve as buffer storage registers to receive data from and supply data to the associated external equipment. In addition, IOB supplied select enable signals used to control the operation of the external equipment.

A functional part of each of the input/output registers is a flip-flop interlock 60. During transmissions from storage to external equipment via IOA or IOB, this interlock holds up execution of a second external write instruction until the external equipment has obtained the previous word from the selected input/output register. In the event that the external equipment calls for the next word from IOA or IOB, before the selected register has been loaded by an external write instruction (to be described in more detail later) a fault will occur. During transmissions from the external equipment to internal storage, this lockout 60 holds up execution of an external read instruction (to be described later) until IOA or IOB has been loaded by the External equipment. If the external equipment attempts to transmit a word to IOA or IOB, before the previous word has been read by the program, a fault will occur. In general it can be said that the interlock system achieves a mode of operation wherein if the computer is proceeding at a rate faster than the peripheral equipment, the computer waits at each input of output for the peripheral equipment; whereas, if the computer does not keep up with the peripheral equipment, a fault will occur.

The external peripheral equipment will be discussed individually below, and is graphically represented by block 62. These various pieces of external input/output equipment are respectively coupled to appropriate one's of the input/output register IOA and/or IOB. Cables 64, 66 respectively represent input and output information from IOA to the various external peripheral equipments, while cables 68, 70 represent respectively, paths of transmission of data signals into and out of IOB. The magnetic tape storage units labeled collectively 72 are coupled to provide an input via cable 74 to IOA and to provide an input to IOB via cable 76. Outputs from IOB to be handled by the tape units 72 are provided on cable 78.

The High-Speed Punch Register (HPR) 61 is a 7-bit register. During the execution of a Punch Instruction (See Instruction Repertoire), all 1 signals from the six lower-ordered bit positions of the address specified by *v* of the punch instruction are transmitted via the X-register 40 over cable 63 to HPR stages $HPR_5$—$HPR_0$. Depending upon the *j* selection, a 1 will automatically be set in $HPR_6$ when *j* is equal 1 and $HPR_6$ will be 0 when *j* is selected equal 0. The signals are then transmitted via cable 65 to enable the punching of one frame by the Paper Tape Punch 67. The combination of 1 and 0's in HPR determines where holes are to be punched, i.e., a hole is punched for each 1 in HPR.

The Typewriter Register (TWR) 69 functions as a O-bit buffer storage register. The execution of a Print Instruction (see Instruction Repertoire) sends 1's from the six lower-ordered digit positions specified by *v* via the X-register 40 and cable 71 to TWR. The particular combination transmitted is a 6-bit code which is transmitted via cable 73 to the electric typewriter 75 to specify the selected operation. TWR retains the code until the Typewriter 75 has initiated action, and is subsequently cleared by the Typewriter.

STORAGE SECTION

The programmably accessible storage register, i.e., addressable registers, employed by the 1103A computer are a major portion of the Storage Section, which is shown enclosed in dashed block 80. The principle functions of the Storage Section, or computer memory is to provide the Arithmetic and Control Sections (to be discussed later) with the operands and instructions required during the execution of a program, and to provide temporary storage for the intermediate and final results of computations. As used herein "operand" is used to mean any one of the quantities entering into or arising from a computer operation. In this regard an operand may be a predetermined argument, a result of a computer operation, a parameter to be used in a computation, or an indication of the location of an instruction. It should be noted that while a distinction normally exists between an instruction word and an operand that an instruction may be subject to computation or alteration such that in a given instance it too may be referred to as an operand.

The Storage Section 80 is composed of four classes of uniquely addressed storage locations. These consist of the Magnetic Core memory registers hereinafter referred to as mc. labeled 82; a Magnetic Drum memory hereinafter referred to as MD, labeled 84; the Q-register 42; and the A-register 44. Additionally, the magnetic tapes 72 may be used for bulk storage of information, but it should be noted that they are not directly addressable, hence are a form of serial access memory. Individual memory registers are addressable, i.e., uniquely identified by an arrangement of binary digits, and the addresses are assigned as illustrated in the table below.

| Storage class: | Addresses in octal notation |
|---|---|
| MC: | |
| Bank 1 of 4,096 words | 00000–07777 |
| Bank 2 of 4,096 words | 10, 000–17, 777 |
| Bank 3 of 4,096 words | 20, 000–27, 777 |
| Q-register | 31, 000–31, 777 |
| A-register | 32, 000–37, 777 |
| MD (group 4) | 40, 000–47, 777 |
| MD (group 5) | 50, 000–57, 777 |
| MD (group 6) | 60, 000–67, 777 |
| MD (group 7) | 70, 000–77, 777 |

mc. storage 82 is comprised of registers of magnetic elements of a type well known in the art which are capable of exhibiting two stable states of magnetization. It is referred to as an arbitrary access memory. This type of memory is often referred to as a so-called "random" access memory, but the accessibility of a specific register is in no way random, nor is the selection of a particular register for storage random. Instead, access to mc. storage is of a nature such that the next memory register from which information is to be obtained or in which information is to be stored is in no way dependent on the previously accessed memory register. Since magnetic core storage provides rapid access storage, the instruction words which are ready for execution plus the associated operands are usually located in mc. storage. The automatic acquisition of instructions from consecutive addresses in mc. storage proceeds from one core bank to another where more than one core bank is provided. This is continued until the execution of the instruction at the last storage address of the available mc. storage. The, unless the last instruction specifies a jump, the next instruction to be executed is acquired from the first address of mc. storage.

Each mc. matrix consists of 4,096 cores wired in a 64 × 64 array so that the wires all lay in the same plane. The magnetic cores are held in position by wires which are terminated on a square printed circuit frame. Each core is a small toroid of material exhibiting a nearly rectangular hysteresis loop. Five wires pass through each core: a horizontal X wire, a vertical Y wire, a diagonal S wire, a horizontal $I_1$, and a vertical $I_2$ wire. Each core wired in this manner forms a bistable device, which can store a logical 1 or a logical 0 depending upon the direction of magnetization. The 1 state is written in a core when the resultant sum of the magnetizing forces of coincident currents in the X and Y wires is sufficient to magnetize the core to the opposite polarity from that remaining after a read operation. The 0 state is obtained by not altering the polarity after a read operation. The core is ready by introducing coincident current simultaneously in the X and Y wires in the opposite direction from the current used in the write operation. If before reading, the core was in the 1 state, the resultant changes in flux produced by the read current induces a current in the diagonal S wire, which after amplification, indicates the presence of a 1. If, before reading, the core was in the 0 state, no change in flux is produced, and no signal is induced in the S wire.

Included in the mc. storage system 82 are the circuits used in address selection. These circuits consist of the address register, the read/write pulse generators and the read/write enable generators. These circuits select a particular pair of X and Y wires so that reading or writing is executed at a particular coordinate location. In addition to this circuitry, and 36-stage magnetic core input register acts as both an input register and a restoration register. During a writing operation, a 36-bit word from the X-register 40 is transmitted to the input register via cable 86 from which the word is entered into the mc. storage at the address specified by a Storage Address Register (to be described later). During a reading operation, the word being transferred from mc. storage to the X-register is carried via cable 88, and is held temporarily in the input register (not shown) so that the information at the reference address can be rewritten. Rewriting is necessary since the reading operation destroys the stored values by driving all 36 cores of the referenced mc. register to the 0 state.

The Magnetic Core Access Control circuitry 90 receives initiate read mc. or initiate write mc. signals from the Control Section of the computer via conductor 92. Upon receipt of such a signal, the Access Control generates a sequence of operations to effect the incoming command. These sequences of signals are applied via conductors 94 to control the reading, writing and restoration operations within the mc. storage 82.

mc. storage has an average access time which is the minimum available in the 1103A computer. Words in mc. storage can be extracted or recorded in as few as 8 microseconds. "Access time" for these purposes defined as the time interval characteristic of a memory or storage device, between the instant at which information is: (a) called for from storage and the instant at which delivery is completed, e.g., the read time; or (b) ready for storage and the instant at which storage is completed; e.g., the write time.

The Magnetic Drum Storage System 84, hereinafter referred to as MD storage, is a medium access speed storage medium consisting of a magnetic drum, a locating circuit (not shown), and reading and writing circuits (not shown). The system is capable of storing in parallel 16,384 words in four groups of 4,096 words each. The maximum access time is approximately 34 milliseconds, the time taken in one drum revolution.

The magnetic drum is a precision aluminum cylinder 17 inches in diameter and 12 inches long with its surface coating with a magnetizable iron oxide. The housing in which the magnetic heads are mounted covers the surface of the drum. The magnetic heads which read and write on this drum surface have their gaps about 0.002 inches from the surface and provide noncontact recording of digital data. At one end of the drum a soft steel band containing the milled timing track and mark track is affixed. The timing notches are spaced 80 to the linear inch and the mark notch (only one) corresponds to one of the timing notches. The mark notch denotes the electrical beginning of the timing track. The data heads are arranged in a spiral fashion to permit an axial spacing 16 to the inch.

As illustrated in the table above, a magnetic drum is divided into four groups. These groups are situated axially along the drum. Each group has associated therewith read/write heads capable of recording and reading 36-bit machine words.

Associated with the Magnetic Drum memory System 84 is the MD locating circuit, which is composed of the group detector and group selector, and the angular index counter, the angular coincidence detector, and the location control unit (not shown). The functions of these circuits are to identify the referenced group (one of the four described above) and then to select the proper angular address (one of 4,096) to thereby permit accessing of desired memory registers as they appear on the surface on the rotating drum.

The MD Access Control 96 provides 125 kilocycle timing pulses to the location control circuitry of the MD Memory and Control System 84 via conductor 98, and determines whether a reading or writing operation is ordered. The angular coincidence detector (not shown) supplies a coincidence pulse via conductor 100 to the MD Access Control 96, whereby a resume signal is propagated via conductor 102 to the Control Section. This signals the completion of a storage reference.

Once the Control Section has selected the mode of operation for the Magnetic Drum Memory System 84, by application of select signals on conductor 104 to the MD Access Control 96, the read and write operations will proceed when the drum rotates to the appropriate coincidence of the physical location on the surface and the selected read/write heads. If data is to be read from the drum, it is passed in parallel via cable 106 to the X-register 40. If a write mode is selected, the content of the X-register is transmitted via cable 108 to the selected memory register in the selected MD group.

CONTROL SECTION

The Control Section shown enclosed in dashed block 110 exerts the directing influence over the activities of the computer by controlling the timing of the various operations. The Control Section receives the instructions which the computer is to carry out, interprets them, and directs their execution upon the operands specified. The computer must be manually started, but can stop automatically or manually. Besides being automatically controlled by a program of instructions, it can be controlled from the supervisory control panel (not shown) which contains all the necessary controls and indicators for manually operating the equipment.

All of the activities and operations which take place within the 1103A, except for certain ones in the output section, are synchronized by a central timing system broadly denominated a master clock. During normal computer operation, this clocking circuitry generates 500 kilocycle clock pulses based on timing pulses received from the magnetic drum storage system via conductor 112. An auxiliary timing pulse generator is available in the 500 kilocycle Oscillator 114 which may be utilized instead of the timing track from the drum as the basic source of timing pulses during testing operations. This oscillator generates a continuous series of timing pulses and supplies them via conductor 116 to the clock source selector 118. The function of the Clock Source Selector is to determine which of the two timing pulse sources will be operative to control the operation of the computer. Selection is made depending upon a manual choice made by an operator which switches between the Oscillator timing pulses supplied on cable 116 and the magnetic drum timing track pulses supplied on conductor 112. The Clock Source Selector provides a chain of timing pulses on conductor 120 which is supplied to the Clock Rate Control (CRC) 122. The function of the CRC is to control the rate at which pulses leave the clocking network. The CRC permits the operator to select any of six different pulse rates, but during normal operation the 500 kc. pulse rate is utilized with the other rates being utilized only during debugging and computer maintenance operations. The timing signals flowing from the Clock Rate Control are applied via conductor 124 to the Pulse Distributor Control (PDC) 126. The function of PDC is to start and stop the flow of clock pulses from the CRC on conductor 128 in response to signals received from other sections of the computer.

The Main Pulse Distributor (MPD) 130 receives clock pulses from the Pulse Distributor Control 126 and distributes them, in successive cycles of from four to eight pulses, via conductor 132 to the Command Timing Circuits (CTC) 134. The distributor supplies each of the pulses cyclically on its 8 output lines. In an eight pulse cycle, all of the output lines are used and the pulses are designated, in order of their generation, $MP_0$ through $MP_7$. The selection of a particular cycle is made on the basis of the operation code held in the Main Control Register (to be described below). Each code selects the cycle which will permit its performance in the least possible time.

The Program Address Counter (PAK) 136 is a 15-stage additive counter which is used to generate successive addresses at which the instructions of the stored program can be found. During computation, PAK is referred to each time an instruction word is to be obtained from the computer memory. In this regard, PAK can be thought of as guiding the computer through the instructions which comprise the program. The desired starting address of a program to execute a computation may be manually inserted into PAK before starting the operation of the computer. If this is done, computation will begin by selecting the instruction stored at the designated address. If PAK is not manually preset, it will be automatically set to MD address 40000 by the execution of a master clear which would normally precede the start operation. Once computation is started, PAK generates consecutive addresses at which succeeding instructions in the program can be found. This is accomplished by adding one to PAK each time its contents are transmitted to SAR. In the event a jump instruction appears in the program thereby indicating a program branching condition, its execution calls for the following events:

1. The jump address (i.e., the address to which the Control Section must now refer in extracting the next instruction) is inserted into PAK;
2. The Control Section 110 selects the next instruction from the jump address specified by PAK and advances PAK by a count of 1; and
3. Thereafter, PAK continues to generate the consecutive addresses, starting from the newly inserted jump address. The sequence of events continues until another jump condition occurs or until a stop instruction is issued.

The Program Control Register (PCR) 138 receives each instruction to be executed via cable 140 from the X-register and temporarily stores it during its execution. PCR is in reality a combination of three separate registers which consists of the main control register (MCR) 142, the U-address counter (UAK) 144, and the V-address counter (VAK) 146. Each instruction sent to PCR consists of a 6-bit operation code which is stored in MCR; a 15-bit U-address portion, which is stored in UAK; and the 15-bit V-address portion, which is stored in VAK. Each of the instructions is obtained from a 36-bit storage register as specified by the address of the Program Address Counter 136.

The Storage Address Register (SAR) 148 holds the 15-bit storage address during any storage reference. SAR receives addresses from Program Address Counter 136 via cable 150. SAR communicates with the Storage Class Control (SCC) 156, MD memory system 84, mc. memory system 82, the X-register 40 and PAK 136.

The U-address counter 144 directs a 15-bit address to PAK via cable 152, and the v-address counter 146 directs a 15-bit address to PAK via cable 154. These paths are selectively operated for various instructions which will be described in more detail below.

The Storage Class Control (SCC) 156, and its included translator (SCT) 158, determine the class of storage which is to be referenced. This is accomplished by translating the higher-ordered six of the Storage Address Register 148. By reference to the octal addresses set forth in the summary above, it can be seen that the MD, mc. A or Q storage registers are uniquely designated by these bits.

The Main Control Translator (MCT) 160, is composed of a principle and an auxiliary translator. The principle translator receives the 6-bit operation code via cable 162 from MCR and produces a single prime operation code enable on one of 41 output lines designated by cable 164. The auxiliary translator receives enables from the principle translator, from MCR, and from various other circuits in the computer and produces a composite or conditional enable. Output enables from both translators in a MCT are utilized throughout the control section, but mainly in the Command Timing Circuits 134, and the Main Pulse Distributor 130. In the Command Timing Circuits, the MCT enables are used in the selection of the sequence of commands which are needed to execute the instruction currently designated by the bit arrangement in the main control register 142. In the Main Pulse Distributor 130, the MCT enables are used in the selection of the appropriate main pulse cycle required for operation.

The Command Timing Circuits 134 combine each operation enable from the Main Control Translator 160 with the corresponding main pulse cycle from the Main Pulse Distributor 130 to produce a discrete sequence of commands which executes the specified operation. The Command Timing Circuits receive two or more of the pulses $MP_0$ through $MP_5$ and $MP_6$ and $MP_7$ along with the appropriate operation enable. It distributes the pulses $MP_0$ through $MP_5$ as the commands which execute the operation. It reads the succeeding instructions from the storage into the X-register 40 on $MP_6$, and then transfers the instruction from the X-register into the Program Control Register 138 via cable 140 on $MP_7$.

ARITHMETIC SECTION

The Arithmetic Section is shown enclosed in dashed black 170 and performs the arithmetic operations of addition, subtraction, multiplication, and division as well as some strictly logical operations such as shifting, logical addition (bit-by-bit addition without carry), and logical multiplication (bit-by-bit multiplication). The section contains the X-register 40, the Q-register 42, the Accumulator 44, the Arithmetic Sequence Control 172, and for shift operations includes the Shift Counter which is an auxiliary function of the Storage Address Register (SAR) 148.

As an arithmetic register, the X-register 40 holds the addend, subtrahend, multiplicand, and divisor in the corresponding arithmetic operations. Additionally, during a logical multiplication the X-register may be considered as holding the multiplier; the actual bit-by-bit multiplication is carried out by a transmission of Q.

As an arithmetic register, the Q-register 42 holds the multiplier and the quotient in the corresponding arithmetic operations. During a logical multiplication, the Q-register may be considered as holding the multiplicand during a transmission Q' X'. The shifting property of Q is utilized in both multiplication and division.

As an arithmetic register, the A-register 44 holds the sum, difference, and product in the corresponding arithmetic operation. In the division operation, the A-register initially holds the dividend, and at the completion of the division operation it holds the nonnegative remainder. The shifting property of the A-register is utilized in multiplication, division, and in the scale factor operation. The accumulator is basically subtractive such that an operand in being transferred from the X-register 40 to the A-register 44 via cable 174 is automatically complemented and subtracted. During the transfer from the X-register to the A-register, the modulus is converted from $2^{36}-1$ to $2^{72}-1$ except in split operations The shift counter, designated SK, is used to keep track of the number of shifts in an arithmetic operation. Physically SK is the 7 lower-order stages of the Storage Address Counter (SAR) 148. This dual operation of SAR is possible since SAR is not used as an address register during an arithmetic sequence, thereby leaving it free to perform the second function of counting. Associated with the SK operation of SAR is the shift counter control 176 which governs the sequence via a cable 178.

The Arithmetic Sequence Control (ASC) 172 controls the operation of the arithmetic section 170 upon command from the Control Section via cable 180. The Arithmetic Sequence Control generates control pulses of subcommands where such subsequence is dependent upon the command received from the Control Section 110. At the end of the subsequence, control is returned to the Control Section

REPERTOIRE OF INSTRUCTIONS

FIGS. 3*a*, 3*b*, and 3*c* illustrate the various instruction word formats. This will be discussed in conjunction with the appropriate instructions below. The complete list of instructions which the computer performs is presented below. The instructions are arranged in 11 groups according to their basic characteristics. In each listing a mnemonic code representing the instruction is enclosed in parenthesis after the name of the instruction. The operation code portion is designated by a two-character combination and the execution addresses by the letters *u* and *v*. In some cases *u* is replaced by the conditioning factors *j*, *n*, or *k*, as in the Repeat instruction or the Left Transmit instruction. In other cases *v* is replaced either by the repeat termination address, *w*, or in some shifting operations by the factor *k*. The repertoire of instructions is summarized in Table 1. The meanings of symbols used to describe the instructions are presented in the following glossary of terms and abbreviations.

Word—A combination of 36 bits capable of being represented and stored in a memory register.

Instruction—A word, represented by $i_{35}, i_{34}, \ldots, i_0$, which causes the computer to perform one or more of its operations. The instruction consists of an operation code and, usually two execution addresses.

Operation Code (OP Code)—That six-bit part of an instruction, represented by $i_{35}, i_{34}, \ldots, i_{30}$, designating the operation to be performed.

u—The first execution address of an instruction represented by $i_{29}, i_{28}, \ldots, i_{15}$.

v—The second execution address of an instruction, represented by $i_{14}, i_{13}, \ldots, i_0$.

operand—A word on which an operation is performed, e.g., predetermined arguments, results of computations, parameters used in computations, addresses, etc.

( )—Parenthesis, denoting 'the contents of'.

A—The 72-bit Accumulator, $A_{71}, A_{70}, \ldots, A_0$.

$A_L$—The left-hand (most significant) 36 bits of A.

$A_R$—The right-hand (least significant) 36 bits of A.

Q—A 36-bit shifting register, $Q_{35}, Q_{34}, \ldots, Q_0$.

X—A 36-bit exhange register, $X_{35}, X_{34}, \ldots, X_0$.

$( )_i$—The initial contents of a register before an operation has taken place.

$( )_F$—The final contents of a register after an operation has taken place.

D(u)—A 72-bit word whose right-hand 36 bits are (u) and whose left-hand 36 bits are all alike and equal to the left-most bit of (u).

S(u)—A 72-bit word whose right-hand 36 bits are (u) and whose left-hand 36 bits are all zero.

L(Q)(u)—A 72-bit word whose left-hand 36 bits are zeros and each of whose right-hand 36 bits is given by the product of the corresponding bits of (u) and (Q).

L(Q)′(v)—A 72-bit word whose left-hand 36 bits are zeroes and each of whose right-hand 36 bits is given by the product of the corresponding bits of (v) and the complement of (Q).

j—A one-digit octal number, represented by $u_{14}, u_{13}, u_{12}$.

n—A four-digit octal number, represented by $u_{11}, u_{10}, \ldots, u_0$.

k—The shift count, usually represented by $V_6, V_5, \ldots, V_0$, but in the Left Transmit Instruction, represented by $u_6, u_5, \ldots, u_0$.

$F_1$—Fixed octal address 00000 (or address 40001 if so manually selected in the TEST mode).

$F_2$—Fixed octal address 00001.

$F_3$—Fixed octal address 00002.

TWR—A typewriter register of six bits.

HPR—The high-speed punch register of seven bits.

CI—The current instructions.

NI—The next instruction.

TABLE I.—A SUMMARY OF THE REPERTOIRE OF INSTRUCTIONS

| | |
|---|---|
| 11 TRANSMIT POSITIVE (TPuv) | (u)—→v. |
| 12 TRANSMIT MAGNITUDE (TMuv) | \|(u)\|—→v. |
| 13 TRANSMIT NEGATIVE (TNuv) | (u)′—→v. |
| 14 INTERPRET (Pxx) | y+1—→F., take ($F_2$). |
| 15 TRANSMIT U-ADDRESS (TUuv) | ($u_{15-29}$)—→($v_{15-29}$). |
| 16 TRANSMIT V-ADDRESS (TVuv) | ($u_{0-14}$)—→($v_{0-14}$). |
| 17 EXTERNAL FUNCTION (EF-v) | Select ext. equipment and perform (v). |
| 21 REPLACE ADD (RAuv) | (u)+(v)—→u. |
| 22 LEFT TRANSMIT (LTjkv) | Shift (A) by k; j=0, $(A_L)_f$—→v; j=1, $(A_R)_f$—→v. |
| 23 REPLACE SUBTRACT (RSuv) | (u)−(v)—→u. |
| 27 CONTROLLED COMPLEMENT (CCuv) | (u)+(v)—→u. |
| 31 SPLIT POSITIVE ENTRY (SPuk) | S(u)—→A, shift (a) by k. |
| 32 SPLIT ADD (SAuk) | (A)+S(u), shift (A) by k. |
| 33 SPLIT NEGATIVE ENTRY (SNuk) | S(u)′—→A, shift (a) by k. |
| 34 SPLIT SUBTRACT (SSuk) | (A)−S(u), shift (A) by k. |
| 35 ADD AND TRANSMIT (ATuv) | (A)+D(u)—→v. |
| 36 SUBTRACT AND TRANSMIT (STuv) | (A)−D(u)—→v. |
| 37 RETURN JUMP (RJuv) | y+1—→u, take (v). |
| 41 INDEX JUMP (IJuv) | D(u)-1—→A; $(A)_f+_f$ (A)—→u take (v). |
| 42 THRESHOLD JUMP (TJuv) | (u)—→(A), take (v)′. |
| 43 EQUALITY JUMP (EJuv) | (u)=(A), take (v). |
| 44 Q-JUMP (QJuv) | (Q)−, take (u); (Q)+, take (v); (Q) left 1. |
| 45 MANUALLY SELECTIVE JUMP (MJjv) | j=0, or 1, 2, 3, & MJS=, take (v). |
| 46 SIGN JUMP (SJuv) | (A)−, take (u); (A)+, take (v). |
| 47 ZERO JUMP (ZJuv) | (A)=0, take (u); (A)=0, take (v). |
| 51 Q-CONTROLLED TRANSMIT (QTuv) | L(Q) (u)—→v.. |
| 52 Q-CONTROLLED ADD (QAuv) | (A)+L(Q) (u)—→v. |
| 53 Q-CONTROLLED SUBSTITUTE (QSuv) | L(Q) (u)+L(Q)′ (v)—→v. |
| 53 LEFT SHIFT IN A (LAuk) | D(u)—→A, shift (A) by k, $(A)_f$—→u. |
| 55 LEFT SHIFT IN Q (LQuk) | (u)—→Q, shift (Q) by k, $(Q)_f$—→u. |
| 56 MANUALLY SELECTIVE STOP (MSjv) | j=0, stop; j=1, 2, 3, & MSS=, stop. |
| 57 PROGRAM STOP (PS−) | Stop and Indicate. |
| 61 PRINT (PR-v) | Typewriter performs code in $v_{0-5}$. |
| 63 PUNCH (PUjv) | Punch ($v_{0-5}$); j=1, 7th level. |
| 71 MULTIPLY (MPuv) | (u) (v)=(A). |
| 72 MULTIPLY ADD (MAuv) | $(A)_i$+(u) (v)=$(A)_f$. |
| 73 DIVIDE (DVuv) | $(A)_i$+(u)=(Q)+$(A)_f$, (Q)—→v; $(A)_f$=+R. |
| 74 SCALE FACTOR (SFuv) | Shift D(u) in A until $A_{34} \neq A_{35}$, (SK)—→v. |
| 75 REPEAT (RPjnw) | Execute NI 'n' times, jump to $F_1$. |
| 76 EXTERNAL READ (ERjv) | j=0, (IOA)—→v; j=1, (IOB)—→v. |
| 77 EXTERNAL WRITE (EWjv) | j=0, (v)—→IOA; j=1, (v)—→IOB. |

SEQUENCED INSTRUCTIONS

71 MULTIPLY ($MPuv$) Form in A the 72-bit product of ($u$) and ($v$), leaving in the Q multiplier ($u$). Uses format of FIG. 3a.

72 MULTIPLY ADD ($MAuv$). Add to ($a$) the 72-bit product of ($u$) and ($v$) leaving in Q the multiplier ($u$). Uses format of FIG. 3a.

72 DIVIDE ($DVuv$): Divide the 72-bit number (A) by ($u$), putting the quotient in Q, and leaving in A nonnegative remainder R. Then replace ($v$) by (Q). The quotient and remainder are defined by: $(A)_i = (u)\ (Q){+}R$, where $0 \leq R \leq (u)/$. Here $(A)_i$ denotes the initial contents of A. Uses format of FIG. 3a.

74 SCALE FACTOR ($SFuv$): Replace (A) with D($u$). The left circular shift (A) by 36 places. Then continue to shift (A) until $A_{34}$ $A_{35}$. Then replace the right-hand 15 bits of ($v$) with the number of left circular shifts, $k$, which would be necessary to return (A) to its original position. If (A) is all ones or zeros, $k$=37. If $u$ is the address of the Accumulator, (A) is left unchanged in the first step, instead of being replaced by $D(A_R)$. Uses format of FIG. 3a.

75 REPEAT ($RPjnw$): This instruction is used in the format of FIG. 3c and calls for the next instruction, which will be called $NIuv$, to be executed $n$ times, its $u$ and $v$ addresses being modified or not according to the value of $j$. Normally $n$ executions are made and the program is continued by the execution of the instruction stored at a fixed address $F_1$. The steps carried out are:

($a$) Replace the right-hand 15 bits of ($F_1$) with the address $w$.

*($b$) Execute $NIuv$, the next instruction in the program, $n$ times.

($c$) If $j$=0, do not change $u$ and $v$.
If $j$=1, add one to $v$ after each execution.
If $j$=2, add one to $u$ after each execution.
If $j$=3, add one to $u$ and $v$ after each execution.

*($d$) On completing $n$ executions, take($F_1$) as the next instruction.

*($e$) If the repeated instruction is a jump or stop instruction, the occurrence of a jump or stop terminates the repetition. In addition, if $NIuv$ is a Threshold jump or an Equality jump, and the jump to address $v$ occurs, (Q) is replaced by the quantity $j$, ($n$-$r$), where $r$ is the number of executions that have taken place.

*See Repeat Sequence Control below.

*REPEAT SEQUENCE CONTROL—When a Repeat Instruction ($75jnw$) is executed, a repeat sequence is set up in the Repeat Sequence Control, RSC. The controlling functions of this repeat sequence depend on the values of $n$ and $j$ in the Repeat Instruction and the nature of the instruction following the Repeat. In general, the RSC sequence (1) notifies Control that a repeat operation is in progress; (2) causes additional commands to be generated on $MP_5$ during the execution of the repeated instruction (these commands determine whether another execution of the repeated instruction should be carried out and therefore, the usual $MP_6$ omitted, or they determine that the repeat operation should be terminated), and (3) initiates the Repeat Terminations routines. (RSC may be rendered inoperative by certain jump and stop instructions.) The nature of the repeat operation and the specific functioning of RSC is outlined in the following paragraph.

During the execution of the Repeat Instruction, the right-hand 15-bits of ($F_1$) are replaced by $w$; the instruction to be repeated is transmitted to PCR (and its operation code held there until the repeat operation is terminated); the factor $jn$ is stored in the PAK; PAK is then complemented; and a repeat sequence installed in RSC. The RSC sequence then tests to see if the $n$ of the Repeat Instruction is zero or not. If $n$=0, the RSC sequence is immediately terminated, and no execution of the instruction in PCR is carried out; instead, the next instruction is taken from $F_1$. If $n \neq 0$, the RSC sequence advanced MPD to 7, SAR is cleared, MPD advanced and the instruction in PCR is executed. Whether it is then repeated or not depends on the value of $n$ and the nature of the instruction itself. If the execution of an instruction does not create a condition which can terminate the repeat sequence (as a jump or stop), RSC advances PAK and tests the new value of $n$. If $n$ 0, RSC advances the execution addresses of the instruction as specified by the initial value of $j$ in the $75jnw$ instruction:

If $j$= 0, RSC does not advance the $u$ or $v$ address,
If $j$=1, RSC advances the $v$ address by one,
If $j$=2, RSC advances the $u$ address by one,
If $j$=3, RSC advances both the $v$ and $u$ addresses by one.

RSC also sets MPD to 7 (omits $MP_6$, thereby retaining the instruction to be repeated in PCR). On $MP_7$, SAR is cleared; MPD then advances, and another execution of the instruction is carried out. This procedure continues until $n$ executions have been made, or until some condition arises in the execution of the instruction which terminates the repeat sequence.

TRANSMISSIVE INSTRUCTIONS

11 TRANSMIT POSITIVE ($TPuv$): Replace ($v$) with ($u$). Uses format of FIG. 3a.

13 TRANSMIT NEGATIVE ($TNuv$): Replace ($v$) with the complement of ($u$). Uses format of FIG. 3a.

12 TRANSMIT MAGNITUDE ($TMuv$): Replace ($v$) with the absolute magnitude of ($u$). Uses format of FIG. 3a.

15 TRANSMIT U-ADDRESS ($TUuv$): Replace the 15 bits of ($v$), designated by $v_{15}$ through $v_{29}$, with the corresponding bits of ($u$), leaving the remaining 21 bits of ($v$) undisturbed. Uses format of FIG. 3a.

16 TRANSMIT V-ADDRESS ($TVuv$): Replace the right-hand 15 bits of ($v$) designated by $v_0$ through $v_{14}$, with the corresponding bits of ($u$) leaving the remaining 21 bits of ($v$) undisturbed. USes format of FIG. 3a.

22 LEFT TRANSMIT ($LTjkv$): Left circular shift ($a$) by $k$ places. Then replace ($v$) with ($A_L$) if $j$=0 or replace ($v$) with ($A_R$) if $j$=1. Uses format of FIG. 3b.

35 ADD AND TRANSMIT ($ATuv$): Add D($u$) to (A). Then replace ($v$) with($A_R$). Uses format of FIG. 3a.

36 SUBTRACT AND TRANSMIT ($STuv$): Subtract D($u$) from (A). Then replace ($v$) with ($A_R$). Uses format of FIG. 3a.

Q-CONTROLLED INSTRUCTIONS

All Instructions in this group use format of FIG. 3a.

51 Q-CONTROLLED TRANSMIT ($QTuv$): Form in A the number D(Q)($u$). Then replace ($v$) by ($A_R$).

52 Q-CONTROLLED ADD ($QAuv$): Add to the (A) the number L(Q) ($u$). Then replace ($v$) by ($A_R$).

53 Q-CONTROLLED SUBSTITUTE ($QSuv$): Form in A the quantity L(Q) ($u$) plus L(Q)' ($v$). Then replace ($v$) with ($A_R$). The effect is to replace selected bits of ($v$) with the corresponding bits of ($u$) in those places corresponding to 1's in Q.

REPLACE INSTRUCTIONS

21 REPLACE ADD ($RAuv$): Form in A the sum of D($u$) and D($v$). Then replace ($u$) with ($A_R$). Uses format of FIG. 3c.

23 REPLACE SUBTRACT ($RSuv$): Form in A the difference D($u$) minus D($v$). Then replace ($u$) with ($A_R$). Uses format of FIG. 3a.

27 CONTOROLLED COMPLEMENT ($CCuv$): Replace ($A_R$) with ($u$) leaving ($A_L$) undisturbed. Then complement those bits of ($A_R$) that correspond to ones in ($V$). Then replace ($u$) with ($A_R$). Uses format of FIG. 3a.

54 LEFT SHIFT IN A ($LAuk$): Replace (A) with D($u$). Then left circular shift (A) by $k$ places. Then replace ($u$) with ($A_R$). If $u$ is the address of the Accumulator, the first step is omitted, so that the initial content of A is shifted. (The value of $k$ must not exceed seven bits if the result is to be replaced in $u$). Uses format of FIG. 3b.

55 LEFT SHIFT IN Q ($LQuk$): Replace (Q) with ($u$). Then left circular shift (Q) by $k$ places. Then replace ($u$) with (Q). (The value of $k$ must not exceed seven bits if the result is to be replaced in $u$Uses format of FIG. 3b.

SPLIT INSTRUCTIONS

All instruction in this group use format of FIG. 3*b*.
31 SPLIT POSITIVE ENTRY (SP*uk*) Form S(*u*in A. Then left circular shift (A) by *k* places.
33 SPLIT NEGATIVE ENTRY (SN*uk*): Form in A the complement of S(*u*) Then left circular shift (A) by *k* places.
32 SPLIT ADD (SA*uk*): Add S(*u*) to (A). Then left circular shift (A) by *k* places.
34 SPLIT SUBTRACT (SS*uk*): Subtract S(*u*) from (A). The left circular shift (A) by *k* places.

TWO-WAY CONDITIONAL JUMP INSTRUCTIONS

All instructions in this group use format of FIG. 3*a*.
46 SIGN JUMP (S*juv*): If $A_{71}=1$, take (*u*) as NI. If $A_{71}=0$, (*v*) as NI.
47 ZERO JUMP (Z*juv*): If (A) is not zero, take (*u*) as NI. If (A) is zero, take (*v*) as NI.
44 Q-JUMP (Q*juv*): If $Q_{35}=1$, take (*u*) as NI. Then, in either case, left circular shift (Q) by one place.

ONE-WAY CONDITIONAL JUMP INSTRUCTIONS

All instructions in this group use format of FIG. 3*a*.
41 INDEX JUMP (IJ*uv*): Form in A the difference D(*u*) minus 1. Then if $A_{71}=1$, continue the present sequence of instructions; if $A_{71}=0$, replace (*u*) with $A(A_R)$ and take (*v*) as NI.
42 THRESHOLD JUMP (TJ*uv*): If D(*u*) is greater than (A), take (*v*) as NI; if not, continue the present sequence. In either case, leave (A) in its initial state.
43 EQUALITY JUMP (EJ*uv*): equals (A), take (*v*) as NI; if not, continue the present sequence. In either case leave (A) in its initial state.

ONE-WAY UNCONDITIONAL JUMP INSTRUCTIONS

45 MANUALLY SELECTIVE JUMP (MJ*jv*): If the number *j* is zero, take (*v*) as NI. If *j* is 1, 2 or 3, and the corresponding numbered MJ selecting switch is set to 'jump', take (*v*) as NI; if this switch is not set to 'jump', continue the present sequence. Uses format of FIG. 3*c*.
37 RETURN JUMP (RJ*uv*): Let *y* represent the address from which CI was obtained. Replace the right-hand 15 bits of (*u*) with the quantity *y* plus 1. Then take (*v*) as NI. Uses format of FIG. 3*a*.
14 INTERPRET (IP–): Let *y* represent the address from which CI was obtained. Replace the right-hand 15 bits of ($F_1$) with the quantity *y* plus 1. Then take ($F_2$) as NI.

STOP INSTRUCTIONS

56 MANUALLY SELECTIVE STOP (MS*jv*): If *j*=0, stop computer operation. If *j*=1, 2, or 3 and the correspondingly numbered MS selecting switch is set to 'stop', stop computer operation. Whether or not a stop occurs, (*v*) is NI. Uses format of FIG. 3*c*.
57 PROGRAM STOP (PS–): Stop computer operation.

EXTERNAL EQUIPMENT INSTRUCTIONS

All instructions in this group use format of FIG. 3*c*.
17 EXTERNAL FUNCTIONS (EF–*v*): As designated by (*v*) select a unit of external equipment and cause it to perform a function.
76 EXTERNAL READ (ER*jv*): If *j*=0, replace the right-hand eight bits of (*v*) with (IOA); *j*=1, replace (*v*) with (IOB).
77 EXTERNAL WRITE (EW*jv*): If *j*320, replace (IOA) with the right-hand eight bits of (*v*); if *j*=1, replace (IOB) with (*v*). Cause the previously selected unit to respond to the information in IOA or IOB.
61 PRINT (PR–*v*): Replace (TWR) with the right-hand six bits of (*v*). Cause the typewriter to perform the operation specified by the 6-bit code.
63 PUNCH (PU*jv*): Replace (HPR) with the right-hand six bits of (*v*). Cause the punch to respond to (HPR). If *j*=0, omit seventh level hole; If *j*=1, include seventh level hole.

LOGIC DIAGRAM SYMBOL DESCRIPTION

As was mentioned above, the 1103A computer is a stored program device. A program may be defined generally as the plans for the solution of a specified problem. A complete program includes plans for the transcription of data, coding of instructions for the computer, and plans for the utilization of the results by the system which is to be responsive to the results. The primary object of programming is the achievement of an acceptable plan or process for the solution of the specified problem. Another subsidiary object of programming is to arrive at a listing of coded instructions which direct each step that the computer is to perform in the solution of the specified problem. Such a list of coded instructions is referred to as a "-program" or a "routine." In other words, it can be said that programming consists of the planning and design for the solution of a problem which includes ultimately the coding of individual computer instructions in a predetermined order such that the solution of the problem as planned can be implemented. The overall planning includes analysis of the data to be supplied, a system analysis, specification of various data output formats, the relationship of the computer to the connected external equipment, and planning for the integration of the computer operation into an overall system.

In programming, as in other forms of designs, it is desirable to have a distinct symbology whereby the steps and the solution of a problem may be shown pictorially. The flow diagram symbols utilized in the specification are illustrated in FIGS. **4*a* through 4*f***, and will be described individually below. It should be understood that the flow diagrams generated in the course of a problem solution will vary from a very high level statement of desired result type of diagram, down to flow diagrams which illustrate the various steps to be performed in their logical order in the implementation of the solution.

The flow diagram symbol illustrated in FIG. **4*a* is utilized to describe one step in the solution of the problem. Box 200 normally will contain a brief statement of the function to be accomplished, and illustratively may be a statement of a single computer instruction, or a statement of a higher ordered function. Each of these function operation boxes will normally contain an input 202 and an output line 204** which will respectfully indicate the steps preceding the operation of the function and the step to follow the operation of the function. The amount of detail of the descriptive matter contained in the function operation box will depend on the level of the solution of the problem which the particular flow diagram is intended to represent.

The flow diagram symbol illustrated in FIG. **4*b*, labeled 206, is utilized to designate a subroutine in the process of solution of the problem. A subroutine normally is generated when the situation arises where the same sequence of instructions may be utilized several times at various points within the routine. A situation such as this makes it an inefficient use of the computer memory to relist the entire set of instructions each time it occurs. The solution to the problem is to list a set of instructions once, provide various points of entrance to the subroutine from the points in the main routine where the particular function solution is necessary. The subroutine flow diagram symbol will normally have one illustrated line of input 208 and one illustrated line of output 210**. This indicates the common entrance and the common exit for all portions of the routine that utilize the subroutine.

Figure 4A:
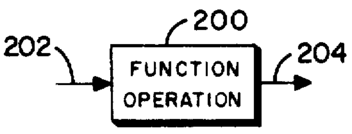
Figure 4B:
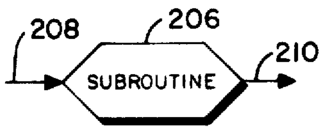
Figure 4C:
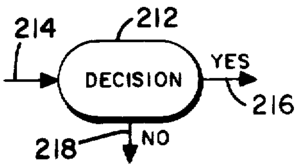
Figure 4D:
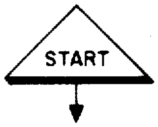

The flow diagram symbol illustrated in FIG. **4*c* is utilized to indicate when a decision must be made. The decision symbol 212 will normally have one line of input 214, but will have two lines of output 216 and 218**, to represent respectively the alternatives in the decision. Within the symbol will be stated the question to be answered by the decision element, and this question normally is stated such that it can receive a "Yes" or a "No" answer to correspond to the alternative paths of output. The statement of the question to be answered can be of a type illustrating a single computer instruction, or it may be a higher level system decision, the choice depending upon the nature of the particular flow diagram under consideration Examples of these will be illustrated in later sections The flow diagram symbol illustrated in FIG. 4*d* is utilized to indicate the starting point of a particular sequence of flow diagram operations.

Figure 4E:
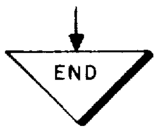

The flow diagram symbol illustrated in FIG. 4*e* is utilized to designate the end of a particular sequence of flow diagram operations.

Figure 4F:
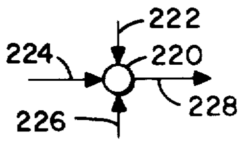

The flow diagram symbol illustrated in FIg. 4*f*, consists of the method of illustrating the junction 220 of several input lines which are illustratively shown as 222, 224, 226 A single resultant line 228 is utilized as an input to the particular flow diagram symbol which would normally follow in the problem solution, and would be one of the type described above. This method of joining input lines alleviates the problem of having several lines coming together at a symbol boundary. The number of input lines shown is intended to be illustrative only and it will usually be found that any number of entries to a flow diagram element may be made.

SAMPLE OF PROGRAMMING

To more fully understand the utilization of the instructions available for this solution of problems in the 1103A′ computer, it is believed advantageous to consider at this time a solution of a very elementary sample problem. Such a consideration, coupled with the description of the various instructions in the section entitled "Instruction Repertoire," should provide the necessary insight into the various program solution problems.

For the illustrative example, assume that a known valued operand is stored at address *a;* that an unknown valued operand is located in the A register; and that a modified operand is to be stored at address a according to the following criteria;

1. If the unknown operand is equal 0, leaves the initial contents of address a unaltered;
2. If the unknown operand is a negative quantity, add the unknown quantity to the known operand and restore the sum at address *a;* and
3. If the unknown operand is a positive value, form the difference of the known operand minus the unknown operand and store the difference at address *a*.

It can be seen that the foregoing statements would normally be the subject of a planning operation which would specify these operations, and that the resulting routine which will execute these functions would flow subsequent to the completion of this planning.

With the foregoing assumptions and problems in mind, reference to FIG. 5 will show at least one way of solving the specified sample problem. As in other areas of design, such as logic or circuit design, the programmed design which may evolve solves the problem, but which is not the exclusive solution to the problem. In other words, given a particular problem, individual program designers may well arrive at different specific solutions in the coding sequences which will yield the desired results.

In the diagram illustrated in FIG. 5, the number shown within the small circle at the upper left of each of the flow diagram blocks represents the absolute numerical representation (machine code) of the particular instruction illustrated by the block. For a full description of each of these instructions, reference may be had to the foregoing section entitled "Repertoire Instruction." The designation appearing at the upper right of each of the flow diagram blocks is utilized to represent a memory address wherein the instruction would be stored. Absolute instruction addresses, i.e., numerical, could be substituted for the alpha-numeric designations such that the routine could be placed anywhere within the above specified allowable addresses of the Magnetic Core memory 82 or the Magnetic Drum memory 84.

Following the logic of a solution of a problem through from beginning to end, it can be seen that at the start 240 the computer operates to test the contents of the A-register for equality to zero, as illustrated by decision element 242. It will be recalled that the unknown operand is initially stored in the A-register The result of this test yields either a "Yes" 244 or a "-No" 246 answer to the question asked Considering first the "Yes" alternative, it will be recalled that when the test operand equals 0, it is desired that the known valued operand stored at address a be unmodified, thus when it is determined that the unknown valued operand is equal to zero, the solution of the problem may be terminated. This is exemplified by the final stop instruction designated by block 248, and indicated as being stored at some address *c*+1

Considering now the situation where the result of the test made by block 242 results in a "No" answer, it is then necessary to carry on further examination of the unknown operand. This is illustrated by indication of the line 246 entering the following decision element, labeled 250, wherein the unknown valued operand is tested to determine whether it is positive or negative. In the event that the answer to the query of whether the unknown operand is negative results in an answer of "No" (the operand is positive), and as indicated by line 252, the path is taken wherein the difference between the known operand and the unknown operand is formed. The formation of this difference is illustrated in function block 254, and indicates that following the formation of the difference the resultant difference-operand is stored at address *a*. When this function has been completed, the operation may be terminated as indicated by line 256 which terminates at the final stop 248.

If the test made by decision element 250 indicates that the unknown operand is of a negative value, the "yes" path labeled 258 will be followed. It will be recalled from above that in the event the unknown operand is negative, it is desired to add the known valued operand and the unknown valued operand and restore the sum to address *a*. This function is illustrated by block 260. Having completed the formation of the sum and the restoring of the resultant value, the operation is complete and the termination can follow. This is accomplished by executing a jump, as designated by block 262, to a point in the program which enters the final stop 248 instruction. This is illustrated by line 264 entering the junction 266 which feeds the final stop. This, then, is one logical solution to the problem as set forth in the assumptions above.

The coding set out in the table below entitled "Sample Routine" corresponds in an item-by-item manner to the blocks illustrated in FIG. 5, and indicates the absolute coding which would yield a machine solution to the specified problem.

SAMPLE ROUTINE

| Address | OP Code | u | v | Remarks |
|---|---|---|---|---|
| b | 47 | b+1 | c+1 | Unknown=0? |
| b+1 | 46 | b+2 | c | Jump if unknown is negative. |
| b+2 | 35 | a | a | Known+Unknown→storage. |
| b+3 | 45 | 00000 | c+1 | Jump to stop. |
| c | 36 | a | a | Known→Unknown storage. |
| c+1 | 57 | 00000 | 00000 | Final stop. |

Having considered the operation on a step-by-step basis of the solution of the problem, as illustrated by FIG. 6, it is of interest to trace the operation of the sample routine through the block diagram of the 1103A computer as shown in FIG. 2*a* and FIG. 2*b*. It will be assumed that the sample routine is prestored at a specified location in the Magnetic core memory 82, and that the machine is stopped with the address *b* stored in the program address counter (PAK) 136.

At the start of the machine, the address *b* will be transmitted in an unmodified manner to the Storage Address Register (SAR) 148 via cable 150. From that point it is transmitted to the Storage Class Control (SCC) 156 which references the address *b* in the mc. memory 82. This reference causes the contents of address *b* to be transmitted to the X-register 40 which in turn transmits the instruction so read via cable 140 to the programmed control register (PCR) 138. The OP Code, as stored in the Main Control Register (MCR) 142 is fed via cable 162 to the Main Control Translator (MCT) 160 for translation to determine the function which is to be performed. Upon determining that a Zero-jump (OP Code 47) is to be accomplished, appropriate signals are sent to the Main Pulse Distributor (MPD) 130 and to the Command Timing Circuits (CTC) 134 to execute this function. The function consists of examining the A-register 44 to determine whether or not all of the flip-flops are in the 0 condition. In the event the operand is determined to be of a zero value, the $v$-address portion of the instruction stored in PCR as designated by the 15 bits stored in the $v$-address counter (VAK) 146 is transmitted via cable 154 to SAR. This specifies the source of the next instruction, which in this instance would be address $c$+1 (see Sample Routine). Upon completion of this transfer, a signal would issue indicating that the next instruction can be executed, thereby causing the address $c$+1 to be transmitted to SCC to provide the appropriate access to mc. memory. Having accessed address $c$+1, the instruction is transmitted via cable 88 to the X-register which in turn enters the instruction in PCR via cable 140. A translation of the OP Code by the Main Control Translator indicates that a final stop is to be executed. This causes computation to be brought to a halt.

Returning now to the consideration of the situation where the operand has been determined to be of a value other than zero, the performance of the zero jump would cause the value stored in the $u$-address counter (UAK) portion of PCR to be transmitted via cable 152 to PAK. This would subsequently enter the value $b$+1 in SAR which in turn would be translated by SCC to reference that address in mc. memory. The instruction stored at address $b$+1 would be transmitted via the X-register to PCR for execution. In this instance the OP Code would be transmitted from MCR to the Main Control Translator and would indicate that a sign jump on the A-register is to be performed. This test results in selectively transmitting a new address to PAK. If $A_{71}$ is zero, thereby indicating a positive value, the address stored in VAK is transmitted via cable 154 to PAK, whereas if $A_{71}$ is equal 1, the address configuration stored in UAK is transmitted via cable 152 to PAK. Whichever of these addresses are entered in PAK will be transmitted via cable 150 to SAR and in turn will be translated by SCC to provide the memory access instruction for reading the next instruction into the X-register. The selected instruction is then transmitted from the X-register via cable 140 to PCR for execution. Taking the instruction stored at $b$±2 as illustrative, which is to be executed when the unknown operand is the negative, it can be seen that the OP Code will be transmitted from MCR to the Main Control Translator. This instruction code indicates that the initial contents of A-register 44 are to be added to $(a)_i$ and the sum restored at address $a$. This is accomplished by causing the contents of VAK, i.e., address $a$, to be transmitted via PAK into SAR. SCC causes the known operand to be read from mc. memory into the X-register. The translation of the OP Code by MCT causes the command timing circuits to perform the operation of adding the double-length extension of the contents of the X-register to $(A_1)$. Following this operation, $(A_R)$ is transmitted to the X-register, and then via cable 86 into mc. memory at the address specified by SAR, i.e., address $a$.

It will be recalled from the previous consideration of FIG. 2$a$ and FIG. 2$b$ that PAK is automatically advanced by one by the transmission of its contents to SAR. This operation occurs in the absence of modification of PAK in response to signals received from PCR.

Each of these instructions is more fully defined in the preceding section headed "Repertoire of Instructions."

it can be seen from this very simple example the care that must be taken in coding instructions necessary to solve the problem as indicated by a flow chart of the desired solution of the problem. It is also evident that one skilled in the art could utilize these instructions, or other instructions available in the 1103A computer to arrive at various sequences of instructions which would perform the solution of the problem as set forth in the assumptions. The degree of sophistication, the computer operational time, utilization of the registers, and the utilization of the memory might vary from one routine design to another; however, it should be noted that this does not forestall arriving at a solution to the problem which yields the desired result. In light of this, the remainder of the specification which discusses processes, and the programmed techniques for the solution of the processes will deal primarily with flow charts rather than the detailed instructions coding. This follows since it is the solution illustrated in the flow chart as it is found to define the inventive processes which comprise the main source of interest rather than the detail coding which is merely an implementation of these processes.

WIRING TERMINAL ARRAY

FIG. 6$a$ is a schematic view of a characteristic terminal array which may be wired pursuant to the processes of the subject invention. The array is comprised of hole groupings arranged in a coordinate arrangement. The horizontal coordinate is termed rows; and, for this embodiment there are 14 rows labeled alphabetically A through N. The vertical coordinate is termed columns labeled numerically 1 through 28. The hole array is situated such that the Circuit modules, which utilize 16 terminal connections per module, are oriented in parallel columns. The individual module terminal arrays, illustratively enclosed within dashed block labeled 300 in row A column 1, are comprised of a parallel arrangement of two holes in the row direction and eight holes in the column direction. The channels between columns, as between column 27 and 28 labeled 302; and the channels between rows, as between row A and row B labeled 304, are utilized lay in printed circuit wire paths between designated terminal points. These channels are three-tenths of 1 inch wide from center to center of adjacent holes.

FIG. 6$b$ is a much enlarge schematic illustration of the hole array utilized in this embodiment. As described above, the circuit modules which are to be interconnected by the printed circuit paths are designed to utilize 16 terminals per module, hence require a configuration of 16 holes in the array. In this array holes, such as 306, are bored in a predetermined pattern in an array, as described above, in an insulating base material 308. The horizontal distance $d_1$ between holes 310 and 312 is one-tenth of an inch, and the vertical distance $d_2$ between holes 310 and 314 is also one-tenth of an inch, measured from the center of the holes respectively. The arrangement of these individual arrays illustrated in FIG. 6$b$ in the row and column manner described in conjunction with FIG. 6$a$, with the channel spacing therebetween, results in the permissible paths that printed wiring may take and defines the area available for such paths.

After the hole array is put in the base material 308, they are plated through with a conductive material in a manner well-known in the art. The plating through of the holes does not form a part of this inventive concept, hence will not be described in any detail. It is only necessary to point out that the plating through results in a circular portion of conductive material visible in the top view, which is so oriented that when printed circuit conductor paths are led up to the particular hole, a contact can be made with the conductive material that covers the entire inside periphery of the hole. Such a contact allows signals carried on the conductor to be coupled to a conductive pin which can be placed in contact with the plated through conductive material, thereby allowing the signal to be transmitted through the layer of the base material. The pin and layer arrangement will be described in more detail below.

FIG. 6$c$ is a cross-sectional view taken along line 6–6 in FIG. 6$b$, and illustrates the plated through material in the hole arrangement. The base material 316 is normally a nonconductive material, as described above, in which holes are drilled in a predetermined array. These holes are then plated through with a conductive metal, thereby providing a smooth interior surface, such as shown at 318 and 320, of conductive material, and having a predetermined thickness such as shown at 322 and 324. It will be noted that the plated through conductive material extends throughout the full limits of the hole in base member 316.

FIG. 7 is a perspective view of a conductor pin, labeled 326, which can be utilized to form the three-dimensional coupling of the printed circuit layers. For this embodiment a tubular pin is utilized. It should be noted that limitation thereto is not intended, and that a solid pin could equally as well be used. The pin 326 is so constructed to have an outside diameter $d_3$ which is the same as the inside diameter after the plating through process, as the holes in the array. This allows for a firm contact when the pin is inserted in through the holes. Such a friction-type contact is normally adequate to make the requisite electrical coupling, and to provide the needed structural support; but for applications subject to high degrees os shock and vibration, it is desirable to solder the entire assembly, as by a wick-soldering process. Again, the does not form a part of the invention and will not be described in any further detail.

FIG. 8 is a perspective view of a portion of a stack of printed circuit interconnection planes, shown in a spaced apart manner for illustrative purposes. The planes, labeled 328, 330 and 332, are of the type discussed above, as are pins 334 and 336, which extend through holes in each of the planes. It will be recalled that the holes are plated through with a conductive material. A printed circuit conductor 338 is shown on plane 328, conductor 344 is shown coupling holes 346 and 348 together. On plane 330 conductor 350 is utilized to couple hole 358 to hole 360. When, as in this embodiment, the printed circuit planes are utilized to couple signals between logic circuits, to supply power, and to establish ground potentials, it is necessary various points together form circuit continuity. For purposes of illustration, assume that a circuit terminal is coupled to hole 340 and that an output signal is available there to be directed to other circuits to be utilized as an input signal. This yields the situation where the signal is propagated through printed conductor 338 to hole 342. At that point, the signal is directed into the conductive material that is plated on the interior of hole 342, and thereafter along pin 334 which is also made of a conductive material. Normally another circuit terminal (not shown) will be coupled to one of the pin ends, and will receive the signal as an input signal. In addition, the signal is propagated along pin 334 until it reaches the plated interior surface of hole 352. It will be noted that coupling of pin 334 to the conductive material inside of hole 362 does not lead to any printed conductive material, therefore the signal is not propagated any farther in the lower directions. On the other hand, conductor 352 is coupled to the conductive material on the interior of hole 352, and carries the signal to hole 354 where it in turn is coupled to the conductive material on the interior of hole 354. With conductive pin 336 being in conductive relationship with the interior surface of hole 354, the signal is propagated along the pin. In a manner similar to that just described for pin 334, there would be a circuit terminal (not shown) coupled to one of the ends of pin 336 which will receive the propagated signal as in input thereto. In addition, the signal is coupled up pin 336 to the interior surface of hole 346 where it is coupled into printed conductor 344 and directed to hole 348. No pin is illustrated in hole 348, but in practice such would be the case, and the signal would thereby be provided as an input signal to another circuit. The same signal propagates down pin 336 to the interior surface of hole 358, where it is coupled into conductor 356 and directed to hole 360. Again no pin is shown in hole 360, but such would not normally be the case.

The foregoing illustrates the additional versatility of the three-dimensional wiring, in that connections can be made by printed circuit methods by using multiple planes where they could not be made if only a single plane was used. This follows from the fact that the concentration of terminal connections required is high, and the situation where connections between the various holes cannot physically cross one another on a single plane. This illustration has shown three wiring planes, but limitation thereto is not intended, since many more than three can be accommodated by this invention.

FIG. 9 is a schematic illustration of a section of the hole array described in FIG 6a. The numerals 01 through 16 appearing adjacent the holes on the right-hand portion of this diagram illustrate the terminal numbering designation of the circuit module which can be coupled thereto. The row and column coordinate designation plus the pin number designation identifies any particular hole in the array.

The arrows in the X and Y coordinate directions illustrated on the left half of the diagram illustrate the allowable conductor paths that can be traced to form the interhole coupling paths. In the X direction the vertical paths X01, X02, X03, X04, X05, and X06 described the possible paths for conductors to be placed. This allows one conductor X01 to be inserted between the parallel columns of holes, and five conductor paths to be placed in the spacing between columns.

Along the Y axis it can be seen that the horizontal paths run between adjacent holes, as shown by lines Y01, Y02, Y03, Y04, Y05, Y06, and Y07. As in the column spacing, the spacing between adjacent rows can receive five conductor lines, as illustrated by lines Y08, Y09, Y10, Y11, and Y12. It should be noted that, though the terms horizontal and vertical are utilized, limitation to such a configuration is not intended. These terms are intended merely to be illustrative of the position of the conductor paths with relation to each other on the plane and with relation to the orientation on the drawing.

PRINTED CIRCUIT DRAWING SYSTEM

FIG. 10 is a block and schematic diagram of the apparatus utilized to draw the printed circuit conductor paths that are generated in a predetermined manner according to the terminals that are to be coupled together. At the outset the terminal data is stored on a record medium which can be read by the Input Data Signal Equipment 400. These data are stored in the form of discrete signal groupings which will be defined in more detail below. These signals are transmitted to General Purpose Computer 402 via data transmission path 404 under the control of the Executive Program (to be described below) and operated on to determine the most desirable wiring paths for the combination of terminals to be coupled together in a given array. The storage media can be punched paper tape, punched cards, magnetic tape, or any of the other well-known storage devices which are capable of being read by a computer system. For this embodiment, the storage system is primarily comprised of magnetic tape handling equipment.

The system for assigning wire paths on the appropriate level in conjunction with evaluating the resultant wiring system for configurations which will violate a predetermined set of design requirements is accomplished within computer 402, and will be described in greater detail below. Once this control information is generated, two options are available. The output signal configurations which represent the printed circuit wiring information can be provided to an output signal storage media, such as a Magnetic Tape Unit 406, via transmission path 408, for future use. Under this option the desired printed circuit conductor paths are not drawn immediately; but, instead, are prepared off-line at a later time, thereby conserving the computer time. To utilize these stored signals at a later time, they are read from the storage unit and transmitted via path 410 to a Signal Adapter 412. The alternative to the procedure just described is to operate the drawing equipment online that is while the computer is operating directly without intermediate storage, by transmitting the signals via path 414 directly to the Signal Adapter. The format of the signals which are generated by computer 402 will be described in detail below, but stated generally, these signals are coded into a predetermined system and are representative of the wiring paths which are to be drawn.

It is the function of the Signal Adapter 412 to receive the coded output signals, and to convert such signal groupings to control signals for controlling the incremental recording apparatus, shown enclosed in dashed block 416. A web of paper is provided in roll 418, the paper having sprocket holes, such as hole 420, along each edge thereof. This web of paper is fed over an incrementally controlled drum 422. This drum is axially mounted, and is driven and controlled by circuitry represented within block 424. The drawing pen 426 is mounted on a pair of rails 428 and 430, and can be moved, either in contact with the surface of the paper or in a raised position, across the width of the drum. The movement of pen 426 is controlled by the pen drive and control circuitry 432. The drum drive 424 and the pen drive 432 can each be initially positioned via Manual Adjustment 434 and 436 respectively. Thereafter, the movement of the pen and of the drum can be controlled by signals transmitted by the Signal Adapter 412 over control lines 438 and 440. As the leading end 442 of the paper is fed out, the paper is restrained between the drum 442 and a cutting bar 444. When a drawing has been completed, the paper upon which it is drawn extends beyond the cutting bar, and can be separated from the remainder of the paper.

The principle of operation of the incremental recording equipment is such that all recording is accomplished by the incremental stepping action of the drum and pen carriage. Bidirectional rotary step motors are employed in the drum drive and control 424 and in the pen drive and control 432, thereby incrementally controlling operation for both the X and Y axes. The recording is produced by movement of the pen 426 relative to the surface of the paper, with each input pulse causing an incremental step of one two-hundredths inch. X-axis deflection is produced by motion of the drum 422 in either the clockwise or counterclockwise direction, and Y-axis deflection by motion of the pen carriage 426. Electrical signals are used to raise and lower the pen from the surface of the paper, thereby permitting positioning of the pen over a point of the paper without marking on the paper when raised, and marking on the paper when lowered. Each incremental step can be in any one of eight directions through appropriate combinations of the X and Y axis input signals. The step operations can be performed in the X direction at a rate of 300 steps per second and in the Y direction at 300 steps per second. The pen can be operated at a rate of 10 operations per second. The circuitry of the incremental recording equipment is not shown in detail since it does not form a part of this invention. A commercially available recorder capable of performing the functions herein set forth is the Model 564, Incremental Recorder, available from California Computer Products, Inc. This unit, or one having similar capabilities, can be utilized to achieve the inventive concepts herein described.

MAGNETIC TAPE SYSTEM

The primary medium of input into the 1103A computer and for storing the drawing control information, as described above, for this improved manufacturing process is a magnetic tape system. Magnetic tape systems are well-known in the art, hence the following discussion will be handled summarily. The recording tape is a thin continuous web of material of about 0.002 inch thickness and approximately one-half inch in width. The flexible web may be either metallic or of a synthetic plastic composition, and is normally coated with a nickel-cobalt film that is capable of being magnetized. Information is stored on the magnetic tape by magnetizing tiny spots on this film surface such that areas on the tape have either one of two polarities, thereby representing either a logical 1 or a logical 0.

FIG. 11 illustrates the physical arrangement of spots on the magnetic tape, and also a conventional representation of the arrangement which differs from the actual case. In this FIG., the darkened rectangular spots represent 1's and the remaining area is representative of polarization of the magnetic material to the 0 state. On the magnetic tape a "line" or "-frame" is indicative of the 8 bit-positions across the width of the tape in which 1's and 0's can be represented. This is shown illustratively at the left end of FIG. 11. Each of the 8 bit-positions are supplied with transducers capable of reading and recording data magnetically on their respective channels as designated by arrows 450. It will be noted that the physical arrangement is such that the channels are staggered longitudinally along the magnetic tape such that four channels appear across the width of the tape and then the remaining four channels appear. Though the physical arrangement is staggered as just described, the conventional line representation is that shown at the right hand portion of FIG. 11, wherein all eight channels for the specified lines are shown vertically on the page in a straight line.

The position of each line or frame along the length of the magnetic tape is defined by its sprocket bit. The sprocket bit channel is labeled 452, and is recorded automatically with the recording of each line of data. Sprocket bits are also recorded as 1's such that when a magnetic tape is being read, the sprocket bits indicate that data, and not blank tape, is being sensed. The sprocket bits also provide the basic timing for reading and most positioning operations of the magnetic tape units.

A parity bit, designated as channel 454, is also recorded automatically with recording of each line of data. Parity bits enable the equipment which reads the magnetic tape to check the accuracy with which it reads each line. The arrangement is such that the parity bit is set to 1 if the six data bits are comprised of an even number of 1's, thus yielding an "odd" parity system. The six data bits, as designated by channels 456, 458, 460, 462, 464, and 466 are referred to as hexabit characters, and the combination of the parity bit and the hexabit character is generally referred to as a "pulse code," with the number of 1's in each pulse code always being odd. For example, referring to line 1, it can be seen that the data bits appearing in channels 458, 462, and 464 results in a count of three (odd), therefore resulting in the parity bit for line 1 in channel 454 being of 0 value. Line 2 is illustrative of the situation where the data in channel 456 and 462 results in a count of two (even) such that the value of the bit stored in channel 454 must be a 1 to yield the odd parity.

FIG. 12 illustrates schematically the format of a characteristic magnetic tape, and is programmably alterable, (see Repertoire of Instructions) to accommodate various operation characteristics. The magnetic tape is divided into blocks of 720 consecutive lines, and is subdivided into blockettes labeled 470, 472, 474, 476, 478, and 480 respectively, and each is comprised of 120 lines. Each block is bounded by a blank space at its leading end 482, and a blank space at its trailing end 484. This block spacing may be selectively determined to be 1 inch or 2.4 inches. The spacing between blockettes is programmably selectable, and may be 0.0 inch, 0.1 inch, or 1.0 inch depending upon the operation for which the tape is to be utilized. The various programming and system considerations is set forth more fully in the section entitled Repertoire of Instructions.

AUTOMATED PRINTED WIRING LAYOUT PROCESS

FIG. 13 illustrates some of the characteristic types of printed circuit wiring paths that can be generated with this invention. It will be recalled that the permissible paths for this embodiment were described in conjunction with FIG. 9, and that diagonal paths on the terminal array are not utilized. In this regard, diagonal paths are only utilized to make the coupling from either a horizontal or vertical wire run to the platted through portion in the hole array.

The printed wiring patterns illustrated within dashed block 500 can be made by starting at either end of the particular pattern. Taking path 502 as illustrative and starting with the pen at 504, the length from end-point 504 to bend-point 506 is made by moving the drum so that the paper moves in the A direction while simultaneously moving the pen in the D direction, thereby tracing a line on a 45° angle. The portion of the path from point 506 to 508 is made by holding the pen stationary; and moving the drum so that the paper moves the appropriate distance in the A direction. To complete the wiring run for this pattern, the paper is moved farther in the A direction while simultaneously moving the pen in the C direction, thereby drawing in line segment terminating at point 510. The process could be performed in reverse order starting at point 510 equally as well, and would only require reversing the specified directions of movement for the paper and the pen.

Another example can be considered assuming the pen to be located at point 512 in contact with the paper. By moving the paper in the B direction while moving the pen in the D direction, line segment 512—514 can be traced. The segment from point 514 to point 516 is then traced by moving the pen only in the D direction. The segment starting at point 516 and ending at point 518 is then drawn by holding the pen stationary and moving the paper in the A direction. It is then only necessary to complete the segment from point 518 to point 520 by moving the paper further in the A direction while moving the pen in the C direction.

From the foregoing discussion of the two examples it can be seen that any of the characteristic patterns illustrated can be drawn from either end by controlling the direction of movement of the paper and of the pen.

FIG. 14 is an illustration of a characteristic array of printed wiring paths for one of the layers in a multilayer system for interconnecting terminals. From the density of the wiring paths here illustrated, it can readily be seen that a hand-layout in accordance with the practice in the prior art would be most tedious and error-prone. It will be recalled that it was stated above that diagonal paths would not be permitted. There is one exception to this general statement, and that is in the case of coupling a pair of pins that are in adjacent vertical positions, but are displaced by one hole position horizontally. This situation is illustrated at wire 522, and it will be seen that for this one limited situation a diagonal wire path is generated. Another situation of unique interest is the coupling of immediately adjacent holes. This is illustrated by wire path 524, where it can be seen that the path is not directly between the holes in a straight line; but, instead, is formed in an inverted *v* shape. This comes from the limitation in this embodiment of permitting the wire paths to be coupled into the holes on a 45° angle. This will be described in more detail below.

FIG. 15 illustrates how the hole array and the printed wiring paths generated in accordance with these inventive concepts are combined to make a completed layout which can be prepared by printed circuit techniques. The printed wiring drawings are made on a white opaque paper, and the lines are drawn in black ink. Such a layout 530 is shown in FIG. 15. In conjunction with the wiring drawing, a layout of the hole array 532 is provided on a transparent material. The hole array 532 is then superimposed on the wiring drawing 530, restrained alignment therewith, and photographed. The resultant is a combination print 534 having both the wiring paths and the hole array illustrated. This combination print then becomes the master for the layer and is processed in the printed circuit process in a manner well-known in the art. It can be seen, then, that the various layers of printed circuit interconnecting wire paths can be generated and prepared without the tedious hand layout and drawing or taping of the prior art.

FIG. 16 is a schematic perspective view of an assembly of layers of printed circuit terminal interconnections. In this embodiment, the characteristic number of layers is seven, and are shown labeled 550, 552, 554, 556, 558, 560, and 562. When it occurs that all of the terminal interconnections cannot be made on the basic seven layers, additional layers, such as layer 564, are added until all connections can be made. This assembly of printed circuit layers is termed a "Chassis." The logic circuits which are to be interconnected by the printed circuit wiring paths are arranged on the modules illustratively labeled 566.

FIG. 17 illustrates the arrangement of chassis to form the next larger segment of an equipment which is to be manufactured in accordance with the concepts herein disclosed. This arrangement is termed a "Bay," and is comprised of 15 chassis for this embodiment. It can be seen that the chassis designation, shown within each chassis rectangle, is in the form of a coordinate designation. For this embodiment, a total of five bays can be handled, but limitation thereto is in no way intended, since these concepts can be followed for larger numbers.

WIRE TAB FILE

The terminal interconnections must be provided as an input to this process. For this embodiment, a magnetic tape is utilized as the record medium. The way in which the terminal interconnections, also known as wire tabs, are formed do not come within the purview of this invention; hence, will not be discussed. The wire tab file specifies every terminal interconnection that is required. It will be noted that several terminals are often electrically coupled together as a common electrical connection, and such an arrangement is termed a "wiring net." The format of the wire tab file for this embodiment is as follows:

Title of File-Recorded in Flexcodes (see above)
Boundary-Marker which indicates end of title
File Number-File uniqueness designation
Boundary-
Sequential Listing of Wiring Nets
Boundary-Marks end of file The format of the Wire Nets is such that the uniqueness symbol which designates the circuit module that provides the output terminal is followed by a listing of all of the terminals which are to be coupled to the designated output terminal. The symbol is carried in flexcodes, and is comprised of a circuit letter designation followed by four uniqueness numerals. The arrangement is such that every circuit module in the system is provided with a unique symbol. It will be recalled from above that a flexcode requires six binary digit positions. The following, then, is the format of these symbols, with each letter indicating three binary digits:

LL NN NN NN NN where
LL = Flexcode for symbol letter
NN = Flexcodes for uniqueness numerals The terminals which form the network (Wire Net) which must be coupled together are set down in the following format, with each letter indicating three bits:

E V B SS TTTTT where
E = 0 for all but the last terminal in the net, which then has a value of 4
V = Inversion count (Not material for this application)
B = Bay number (1 to 5 for this embodiment)
SS = Chassis number 00 to $\mathbf{16_8}$ (related sequentially to coordinate chassis numbers-see FIG. 17)
TTTTT = packed chassis terminal number ($\mathbf{20_8}$ to $\mathbf{13141_8}$)

For this discussion it will be noted that numerical designations made with the subscript "8" following, indicate that the number is in the octal notation rather than decimal. This follows from the close relationship of the octal (base 8) number system to the binary (base 2) number system, wherein three binary digit positions can be directly converted to a single octal digit.

In the computing art "packing" of data is well known, and is often utilized to permit various types of data signals to be combined in a predetermined manner to permit the manipulation of the combined (packed) value as a unit without having to handle separately each of the included items. This technique is utilized in this embodiment for the handling of the chassis terminal designation. It will be recalled in the consideration of FIG. 6*a*, which illustrates the terminal layout for each chassis, that rows A through N were provided. This gives $\mathbf{14_{10}}$ or the equivalent $\mathbf{16_8}$ rows. Also there were $\mathbf{28_{10}}$ columns provided, or the equivalent $\mathbf{34_8}$. Finally, each module connection permits $16_{10}$ terminals, with an equivalent octal number of $20_8$. To define a specific terminal on any chassis it is necessary to indicate the row and column in which it is located, and the terminal number. These values can be combined (packed) in a predetermined manner to facilitate the manipulation of the terminal identification data. The following packing system results in a unique numerical designation for each terminal on a chassis:

TTTTT = [Column Number + $34_8$ (Row Number)]$21_8$ + Terminal Number. To extract the Column, Row, and Terminal information from the packed number, it is necessary only to reverse this operation.

MANUFACTURING PROCESS

FIG. 18 is a process diagram illustrating the operations necessary in the performance of the manufacturing process. The initial step is to define the terminal-to-terminal connections that are to be made by the printed circuit paths. This step is shown in block 570. Having defined the terminal-connections to be made, the next step in the process is to generate the printed circuit conductor paths for each terminal-to-terminal connection, as shown by block 572. Having generated the printed circuit routes, the next step in the process is to assign the respective printed circuit conductors to designated layers for each of the chassis. This step is shown at block 574. With the routes generated and assigned to their respective levels, the next step in the manufacturing process is to draw the printed circuit terminal-connection conductors for each of the chassis layers, as shown in block 576. Finally, having drawn the printed circuit wire routes on the various layers, the step of photographing a composite of the master terminal overlay and each of the chassis layer drawings can be done. This step is shown in block 578. Having made the composite photographs, the manufacturing process can proceed into a printed circuit process of a type well-known in the art. The foregoing has been general in nature, and each step will be explained in more detail below.

FIG. 19 is a process diagram illustrating in more detail the steps described in conjunction with FIG. 18. Again, the initial step in the process is to define the terminal-connections which are to be made, and it is shown in block 580. Having determined which terminals are to be coupled together by the printed circuit paths, it is desirable to evaluate one chassis at a time and to sort the terminal-connections in a predetermined manner, as shown in block 582. The nature of the sorting, which can be thought of as ordering the terminal-connections in preparation for routing, will be described in more detail below. The purpose of the sorting is to put the terminal-connections in a condition such that when each one is considered in the routing process and placed on a particular layer, that the number of layers will be minimized. Once the terminal-connections have been sorted in a desired manner, the next step is to generate printed circuit terminal-connection routes for one layer of the selected chassis, as shown by block 584. The next step in the manufacturing process is to evaluate the routes according to specified criteria to determine if the routed terminal-connections are acceptable. This step is shown in block 586. Having made the evaluation of the routes for the layer, it is necessary to test the routed terminal-connection evaluation to decide whether the routed layer is acceptable. This decision is shown at decision element 588, and, should it be determined that the routes are unacceptable, the No path, labeled 590, will be taken, thereby leading to step in the process of resorting the remaining unrouted terminals to cause these terminals to be considered in a different order. The resort is shown in block 592. The resorting is accomplished after having selected a different sort parameter. These sort parameters will be discussed in detail below. Once the unrouted terminal-connections are resorted, the process continues via path 594 to the step in the process which generates the printed circuit terminal-connection routes for one layer. In this case the layer found to be unacceptable will be reconsidered and the terminal-connections rerouted. When a layer is found to be acceptable after having been evaluated, Yes path 596 is taken, and the process can continue to draw the terminal-connections for the layer just routed, or to store the routed terminal-connections for the just completed layer for later drawing, as shown by step 598. When the consideration of each layer is completed, it is necessary to determine if all of the terminal-connections have been routed and placed on a layer for the selected chassis, as indicated by decision element 600. If there are more terminal-connections on the chassis which have not yet been routed, the No path 602 is taken and the process returns to the pint where terminal-connection routes for one layer 584 are generated. When all of the terminal-connections for the selected chassis have been acceptably routed, the Yes path 604 is taken and the manufacturing process can proceed to photograph the composite of the terminal array and each of the chassis layer drawings, as shown by step 606, and may then proceed into the printed circuit process, via path 608. The foregoing, then, are the steps in the manufacturing process which provides for multilayered printed circuit interconnections of a large array of terminals. Each of these steps, and the necessary control of the process will be discussed in more detail in the following sections.

PROCESS CONTROL

FIG. 20 is a block diagram which illustrates the relationship of the Executive and Utility Control routine, labeled 610, to the process routines which operate to perform the operations described in conjunction with the process steps shown in FIG. 18 and FIG. 19. The primary function of the Executive and Utility Control routine is to provide a means for controlling the order of operation of the various processing routines. The details of its operation will be discussed in detail below. It should be noted that the various steps in the process, as described above, are performed individually. It will further be noticed that the results of the various steps in the process are utilized by the next sequential steps in the process.

The Executive and Utility Control routine is subject to manual selection of the process steps to be performed. This operator manual selection is limited; however, due to the fact that certain of the process steps rely on the results of previously executed steps.

Once a wire tab file has been prepared, the first step in the process of providing the multilayered printed circuit terminal-connections is selected via control line 612. This first step is shown in block 614, and consists of selecting the chassis to be processed, and performing an initial sort according to predetermined parameters. The next operation is selected via control line 616, and is shown in block 618. This step evaluates the ordered tabs received on data line 620 from the initial sort for the selected chassis, and operates to perform additional ordering to optimize the wire tabs that are presented for routing on data path 622. The process step of routing the terminal-connections for each layer of the chassis is shown as block 624, and is selected via control line 626. Finally, the Executive and Utility Control selects the step of plotting the terminal-connections for each layer of the chassis, as shown in block 628, via control path 630. This step takes the routed terminal-connections provided on path 632, and plots out the layer drawings. These drawings are then taken via process path 634 to the printed circuit process where the composites described above are made. The Executive and Utility Control also is utilized to select and control auxiliary operations such as adding, subtracting, or changing terminal-connections on the wire tab file, and maintaining the wire tab file, as shown by block 636. The latter operations do not form a part of this invention, hence will not be described.

EXECUTIVE CONTROL ROUTINE

FIG. 21 is a logic flow diagram of the Executive Control Routine shown in FIG. 20. For this embodiment, the Executive Control Routine is actually in two separate segments, each serving a distinct function, yet both being interrelated The first of these segments can be considered as the Initial Control and the other of the segments can be considered as the Router Control.

For this embodiment, the computer programs which perform the above-described steps in the manufacturing process are stored on a magnetic tape library for use by the general purpose computer. Such storage permits the selection and access to the various programs without having to provide operator assistance in the loading of decks of punched cards or rolls of paper tape for each of the programs. The programs, as stored on the magnetic tape, are marked for identification, and can be read by the general purpose computer when located. One of the functions of the Initial Control segment of the Executive Control Routine is to locate the programs as they are specified for execution, and to load the selected program into the general purpose computer.

Since the Executive Control Routine is itself a computer program which is stored on the library tape, the magnetic tape unit which is utilized to handle the program library tape is prepositioned to the location of the Executive Control Routine. The general purpose computer is provided with an internally stored boot-strap control which provides for the reading of the Executive Control Routine into a predetermined area of computer storage, where it remains and operates throughout the performance of this manufacturing process. During this process the storage locations which are utilized to store and perform the Executive Control Routine are unavailable for storage for any other purposes.

At the Start 650 of the Executive Control Routine, the general purpose computer utilizes its boot-strap control, a technique well known in the art, to load the Executive and Utility Control Routine, as specified by block 652, into the designated computer storage locations. At this time it is also assumed that a Wire Tab File of the type described above has been mounted on another magnetic tape unit attached as peripheral equipment to the general purpose computer, and that a blank magnetic tape has been mounted on a third peripheral magnetic tape unit for storing the results of the respective process operations.

Having loaded the Executive and Utility Control Routine, control is immediately turned over from the boot-strap to the Executive Control Routine. When the control has been accepted by the Executive Control Routine, an indication is made to the operator to "Select Routine," and the operation of the computer is stopped, as shown in block 654. For this embodiment, the indication is provided as a note on an online monitor typewriter. It should be noted, that the sequence of desired computer programs can equally as well be predetermined, and provided on a selected input equipment, such as another magnetic tape, punched paper tape, or punched cards. The operator selection allows versatility, however, and allows for continued observation and control of the process as it proceeds along.

The available process routines, and the auxiliary routines, are listed below along with the five character identification codes:

| Routine Name | Call Codes |
|---|---|
| Route Sort I | JPRS*. |
| Route Sort II | WSRS*. |
| Evaluate | PEVAL. |
| Router | ROUTE. |
| Plot Plane I | JPPLT. |
| Plotter | JLPLT. |
| Augment Wire Tabs | ASAUG. |
| Augment Plotter Tabs | EVAUG. |
| Reduce Plotter Tabs | EVRED. |
| Print Chassis Tabs | WSPRT. |
| Maintain Chassis Tab File | MAINT. |
| End of Run | END**. |

Note-(*) indicates a space.

Selection of the desired routine is made by typing the corresponding Call Code on the online monitor typewriter. It will be noted that each Call Code is comprised of five characters followed by a period. If an error is detected when the Call Code is being typed, the selection of a carriage return will clear the previous selection and allow a correct selection to be made. Once a desired Call Code has been correctly typed on the monitor typewriter, the computer can be started, as indicated by block 656, and Executive Control Routine operates to Interpret the Call Code, as indicated by block 658. Having interpreted the Call Code, it is tested to determine if it is one of the sort selections, as indicated by decision element 660. If not, the "Not" path 662 is taken and the Call Code is tested to determine if the End of the run has been indicated, as shown by decision element 664. If the "End" is indicated, the "Yes" path 666 is taken and the process is stopped 668. If the Call Codes is something other than the "End," the "No" path 670 is taken, and the specified routine is located on the magnetic tape routine library tape, as shown in block 672. Once the designated routine is located, it is loaded into a predetermined portion of the computer storage, as indicated by block 674, for performance. At this time the Executive Control Routine transfers operation control to the designated routine and it is executed, as indicated by subroutine element 676. Once the designated routine is performed, control is returned to the Executive Control Routine, as shown by block 678, which takes the operation via control path 680 to the point where the monitor indication to "Select Routine" is made and the computer operation is stopped to permit selection of the next desired routine. To this point the segment of the Executive Control Routine previously referred to as the Initial Control has been described, and it is this portion of the Executive Control Routine which controls the performance of all of the permissible routines except the sorting and routing.

Returning now to the decision element 660 which tests the Call Code to determine if a sort selection has been made, when it is determined that such is the case, the "Yes" path 682 is taken, and the Router Control segment of the Executive Control Routine is loaded from the magnetic library tape into its designated portion of the computer memory, as indicated by block 684. Once loaded, the Router Control indicates it has taken control, by providing an indication on the online monitor to "Select Sort" followed by stopping the operation of the computer, as indicated by block 686. At this time the operator again types the specified sort Call Code on the online typewriter and starts the computer, as indicated by block 688. The Router Control then interprets the Call Code 690 by reading it into storage from the input lines of the online typewriter, and presents it for evaluation. The Call Code is then tested by decision 692 to determine if it is a Sort I selection. In the event that it is, the "Yes" path 694 is taken, and the Sort I routine is loaded, as indicated by block 695, from the magnetic tape library. The process then continues along path 696, and causes Sort I to be performed as indicated by subroutine 698. The details of Sort I will be presented in detail below. Having completed the operation of Sort I, Router Control proceeds load the Router 700, and to execute the Router routine, as indicated by subroutine element 702. Once this is completed, and the routed information stored for plotting, path 704 is followed to return control of the operation of the process to the Initial Control portion of the Executive Control. The details of the operation of the Router in conjunction with Sort I will be described in detail below.

Returning to decision 692 where the Call Code is tested to determine whether Sort I was selected, when it is determined that it was not, the "No" path 706 is taken and the Call Code is tested to determine if Sort II was selected, as indicated by decision element 708. If it is determined that Sort II was not selected, the "No" path 710 is taken, and an error indication 712 is given on the monitor online typewriter. Control is then returned via path 714 to a point in the Router Control routine where the indication "Select Sort" is given and the computer stopped. When decision element 708 indicates that Sort II was selected, the "Yes" path 716 is taken, and the determination must be made as to whether this is the first time through the wire tab file or not, as indicated by decision element 718. This is necessary since Sort II requires the preparation of the wire tab information by Sort I before it can operate. An indication here of the first time through the file indicates that Sort I has not yet been performed, and results in the "Yes" path 720 being taken to the error indication 712. When the sort routines are performed in their proper order, the "No" path 722 will be taken, and the Router Control will load the Sort II and the Router routines into the computer storage from the magnetic routine library tape, as indicated by block 724. The Sort II routine is then performed, as indicated by subroutine element 726, on the wire tab information as prepared by Sort I. This will be described in more detail below. The Router routine is then called upon to route one chassis layer, as indicated by subroutine element 728. If acceptable the layer is recorded and if not acceptable the layer is rejected for further manipulation. A test is made by decision element 730 to determine if the chassis has been completely routed, and if not, the "No" path 732 is taken to a point where Sort II is called upon to resort the remainder of the wire tabs in an attempt to optimize the routing for the chassis. When it is determined that the chassis has been completely routed, the "Yes" path 734 is taken and control is returned to the Initial Control segment of the Executive Control Routine. The nature of the sorts and the operation of the Router will be described in detail below.

SORT I

FIG. 22 is a logic flow diagram of the computer program which performs the sorting of the terminal-connections in preparation for laying out the printed circuit wiring paths. It will be recalled that the format of the wire tab file is that of a net arrangement, with all common connections listed sequentially. The operation of the Router routine is such that terminal-connections are handled sequentially as they are encountered for the selected chassis. It has been determined that such a random consideration of the routing for the terminal-connections does not lead to an optimum wiring layout, nor does it tend to minimize the number of layers required for each chassis. To alleviate this condition, the terminal-connections are considered individually, and put in an order for consideration by the Router routine which tends to optimize the number of terminal-connections that can be placed on each layer. The terminal-connections are not kept in the net arrangement described above from this point on.

At the Start 740 of the Sort I routine, the first operation is to read the title from the wire tab file and record it on magnetic tape unit which has been provided to record all of the terminal-connections that are to be made for the selected chassis. This operation is shown in block 742. A great deal of storage is required to perform the ordering operation for the entire chassis. The magnetic core storage of the computer is utilized for the manipulation of the terminal-connections, for the assembly of the weight words, and for the ordering of the terminal-connections; and the magnetic drum is utilized to store the resultant arrangement of terminal-connections for consideration by the next steps in the process. The preparation of the storage consists primarily of clearing all locations in the designated parts of the storage of the computer, as indicated by block 744.

It will be recalled that the bay and chassis designation for each terminal-connection is specified in the wire tab file. For this embodiment only one chassis can be processed at a time. At this time it is necessary for the operator to specify the bay and chassis selection for processing, as indicated in block 746. These selections are retained to direct the handling of the terminal-connections as they are read from the wire tab file.

Having made the bay and chassis selection, an indication is put on the monitor typewriter to "Select Sort Parameters" and computation is stopped to allow the operator to make the designated selection, as indicated by block 748. There are three parameters which are considered in this ordering of the terminal-connections. The first of these parameters is referred to as "quadrant" and will be understood to means one of four possible quadrants for the chassis. Referring briefly to FIG. 23c it will be seen that the quadrant numbering progresses in a clockwise fashion. The determination when considering quadrant relates to which quadrant the origin and destination terminals are located in for each terminal-connection to be made. The second of the parameters is referred to as "angle," and will be understood to refer to the angle formed by the leg of the printed circuit path connecting to the origin terminal and the hypotenuse leg connecting the origin to the destination terminal. The third of the parameters will be referred to as "distance," and will be understood to be the distance between the center of the chassis and the bend point for any given terminal-connection, for this embodiment. It will be noted that distance can also be determined to be that distance from the edge of the plane to the bend point. In this latter situation, the operation will be the same, but the order of the terminal-connection will be altered. When taken as a single parameter, taking this measurement of distance will result in the order of the resultant sorted terminal-connections being inverted; and, when taken in conjunction with one of the other parameters, it will result in the terminal-connections being ordered differently within each grouping of the sorted wires. Depending on the application a selection of one of these two distance parameters will aid in optimizing the layout of the routing for the layers of the printed circuit wiring. For this embodiment either one or any two of these three parameters can be selected as the basis for the sort. It will be noted that this concept could be carried farther to allow all three parameters in any order priority to be handled. The selection of the sort parameters is made by entering a control code in a control register of the computer by the operator. One octal digit (the equivalent of three binary digits) is used to specify the rank and priority to be accorded each of the sort parameters. The following listing of the control codes and the various sort arrangements are permissible:

| Control Code | Type of Sort |
|---|---|
| **000** | No sort |
| **001** | Distance of bend point from center of plane |
| **010** | Angle from vertical of origin to destination |
| **100** | Quadrant of origin and destination |
| **421** | Quadrant and Angle |
| **412** | Quadrant and Distance |
| **241** | Angle and Quadrant |
| **214** | Distance and Quadrant |
| **142** | Angle and Distance |
| **124** | Distance and Angle |

Each of these combinations of parameters will be discussed in detail in the consideration of the formation of the weight words for each terminal-connection.

Once the operator has made the parameter selection, operation can again be started 750, and the process continues to read the wire tab file one terminal-connection at a time, as shown by block 752. The portion of the terminal-connection designation which relates to bay and chassis is compared to the selection. When a terminal-connection is located that compares to the bay and chassis selection, it is recorded on the chassis wire tab file directly, as shown by block 754. All other terminal-connections are ignored during this step of the process. The terminal-connections on the selected chassis are also stored in the magnetic core of the computer, and the weight word is calculated according to the selected parameters, as shown by block 756. The weight word is stored in one memory location when completed. The memory word is considered as two halves during the assembly of the weight word, but as a complete entity when being sorted. The parameter selected to be most significant in the sort is stored in the higher ordered digit locations of the weight word, and the less significant parameter is stored in the lower ordered half of the word. In the foregoing listing of the types of sort parameters which are permissible, the first-named parameter for each selection is the most significant and appears in the upper ordered digits of the weight word The following diagram of the weight word, with the notation of the binary digit positions points up the nature of the weight word.

Most significant parameter . . Least significant parameter $i_{29}$ . . . . . . $i_{15}$ $i_{14}$ . . . . . . $i_0$ Once calculated the weight word is inserted in the magnetic core section along with the other definitive information concerning the terminal-connection yielding a three-word combination in the following format:

| | | |
|---|---|---|
| Weight. . . . . | Most significant parameter. . | Least significant parameter. |
| Length. . . . . | Rules length. . . | L length. |
| Terminal. . . | Origin terminal. | Destination terminal. |

The nature of these calculations need only be considered briefly, since each by itself is relatively simple. The determination for quadrant is simply a determination of which quadrant the origin terminal is in and which quadrant the destination terminal is in. This yields the following possible designations for the quadrant parameter:

| Origin | Destination |
|---|---|
| 1 | 1 |
| 2 | 2 |
| 3 | 3 |
| 4 | 4 |
| 1 | 2 |
| 1 | 3 |
| 1 | 4 |
| 2 | 3 |
| 2 | 4 |
| 3 | 4 |

The angle determination is in binary angular measurement, and calculated by knowing the coordinate locations of the origin and destination terminals in a fixed coordinate system and performing the arctan calculation by numerical techniques well known in the art. This results in a numerical value for the angle between the vertical of the origin pin and the destination pin.

The distance parameter is calculated by knowing the coordinate position of bend point with respect to the center of layer. This gives an $x$ and $y$ distance, each of which can be squared, the results totaled, with the square root of the resultant giving the slant distance to the bend point.

The Rules Length is an arbitrary permissible length for the particular terminal-connection, and provided by the designer of the circuitry which is to be coupled together. A consideration for setting this value is the number of terminals that are to be coupled together as a common electrical point. This length is independently determined, but is utilized as a limitation in the process of routing. The L Length is the total of the $x$ and $y$ distances that the origin is displaced from the destination pin.

Finally, the origin and destination information is maintained in the same format as described for the wire tab file and consists of the packed information which uniquely defines every terminal location on the layer.

Having completed the handling of one of the terminal-connections, it is necessary to determine if the wire tab file has been completely processed, as indicated by decision element 758. If it is not, the "No" path 760 is taken and the reading of the wire tab file is continued. When it is determined that the entire wire tab file has been processed, the "Yes" path 762 is taken, all of the terminal-connections found to exist on the selected chassis are sorted in ascending order on the weight words. This operation is shown in block 764, and results in the terminal-connections being placed in an order which relates to the selected sort parameters. When the ordering is completed, the ordered list of three-word terminal-connection designations is stored on the magnetic drum for handling by the Router directly, or for further evaluation and sorting prior to routing, as shown by block 766. When this operation has been completed, the Sort I routine is caused to Stop 768, and control is returned to the Executive Control.

FIG. 23a through FIG. 23i illustrate the various parameter combinations, and will be considered to illustrate specific examples of how the terminal-connections shown would be ordered according to the parameters selected.

Figure 23A:
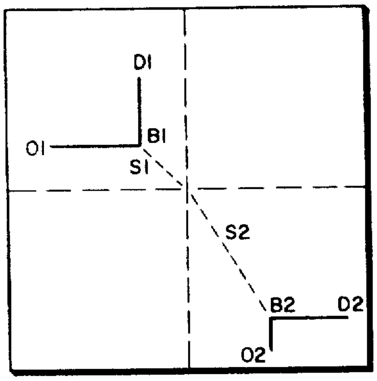

FIG. 23a illustrates the Distance from center to bend point parameter (001) and, since S1 is smaller than S2, would find the terminals listed as follows:

01—D1
02—D2

Figure 23B:
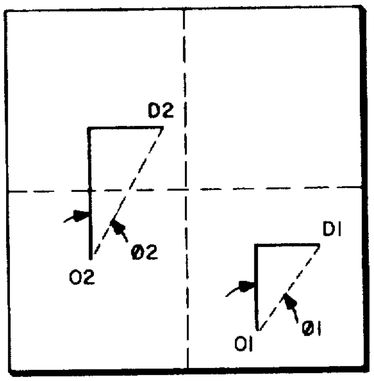
Figure 23C:
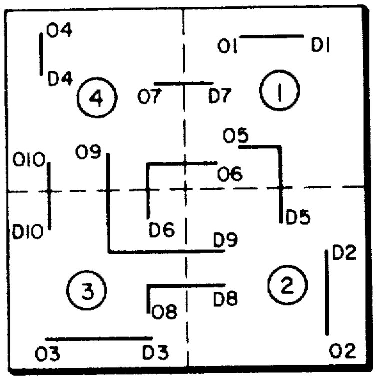

FIG. 23b illustrates the Angle parameter (010), and, since Φ1 is smaller than Φ2, would find the terminals listed as follows:

01—D1
02—D2

FIG. 23c illustrates the Quadrant parameter (100), and would find the terminals listed as follows:

| | |
|---|---|
| 01—D1 | (11) |
| 02—D2 | (22) |
| 03—D3 | (33) |
| 04—D4 | (44) |
| 05—D5 | (12) |
| 06—D6 | (13) |
| 07—D7 | (14) |
| 08—D8 | (23) |
| 09—D9 | (24) |
| 010—D10 | (34) |

Figure 23D:
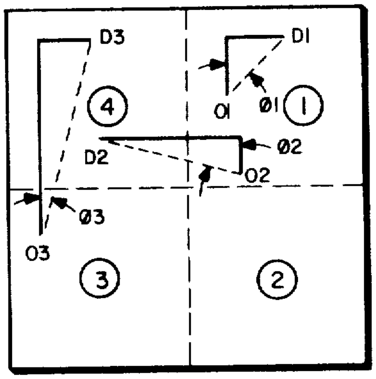

FIG. 23d illustrates the Quadrant-predominant parameter and the Angle parameter (421). For this selection each quadrant selection is listed and each terminal-connection is listed in order of increasing angle for the corresponding quadrant. The sample terminal-connections would be listed as follows:

| | |
|---|---|
| 01—D1 | (11Φ1) |
| 02—D2 | (14Φ2) |
| 03—D3 | (34Φ3) |

Figure 23E:
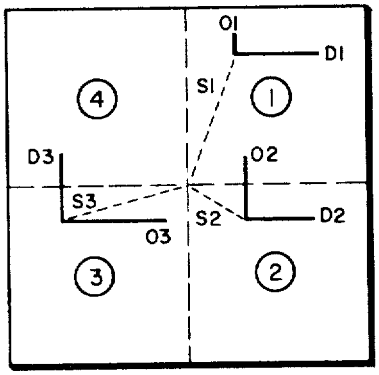

FIG. 23e illustrates the Quadrant-predominant parameter and the Distance parameter (412). For this selection each quadrant is listed and each terminal-connection is listed in order of increasing distance of the bend point from the center of the plane for the corresponding quadrant indication. The sample terminal-connections would be listed as follows:

| | |
|---|---|
| 01—D1 | (11 S1) |
| 02—D2 | (12 S2) |
| 03—D3 | (34 S3) Note that S1 is a longer distance than S2, but that it is listed first since the Quadrant **11** would come before Quadrant **12**. |

Figure 23F:
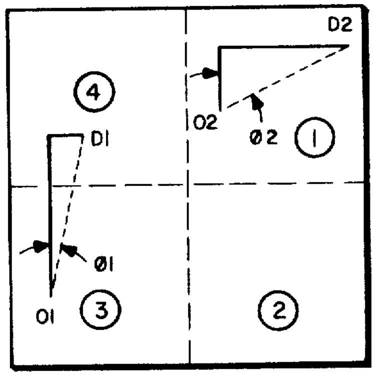

FIG. 23f illustrates the Angle-predominant parameter and the Quadrant parameter (241). For this selection each angle value is listed, and for each angle the terminal-connections are listed in order according to the quadrant parameter. The sample terminal-connections would be listed as follows:

| | |
|---|---|
| 01—D1 | (Φ1 34) |
| 02—D2 | (Φ2 11) |

The listing here is order of ascending values of the Angle parameter.

Figure 23G:
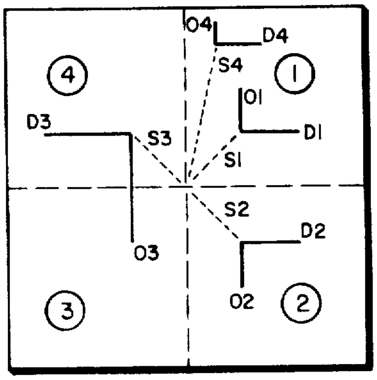

FIG. 23g illustrates the Distance-predominant parameter and the Quadrant parameter (214). For this selection the distance of the bend points for the respective terminal-connections takes precedence, and is further weighted by the Quadrant parameter. The sample terminal-connections would be listed as follows:

| | |
|---|---|
| 01—D1 | (S1 11) |
| 02—D2 | (S2 22) |
| 03—D3 | (S3 34) |
| 04—D4 | (S4 11) |

Figure 23H:
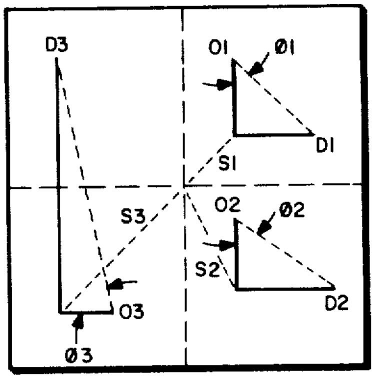

FIG. 23h illustrates the Angle-predominant parameter and the Distance parameter (142). This system of ordering lists each Angle value and the full range of Distances therefore in ascending order. The sample terminal-connections would be listed as follows:

| | |
|---|---|
| 01—D1 | (Φ1 S1) |
| 02—D2 | (Φ2 S2) Note Φ1 = Φ2 |
| 03—D3 | (Φ3 S3) |

Figure 23I:
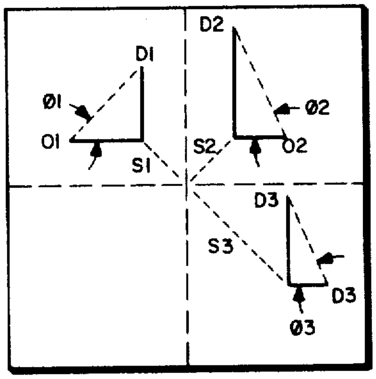

FIG. 23*i* illustrates the Distance-predominant parameter and the Angle parameter (124). This system of ordering lists the Distance parameter and further weights it by combining it with the Angle value for each of the terminal-connections. The sample terminal-connections would be listed as follows:

01—D1 (S1 Φ1)
02—D2 (S2 Φ2) Note S1 = S2, but Φ1 Φ2
03—D3 (S3 Φ3)

FIG. 24 illustrates the numerical designation provided for each wire direction. The origin terminal is the controlling point, and when the wire path proceeds to the right, a value 0 is assigned to it; when the wire path proceeds upward, a value of 2 is assigned to it; when the wire path proceeds to the left, a value 4 is assigned to it; and when the wire path proceeds downward a value 6 is assigned to it.

SORT II

FIG. 25 is a logic flow diagram of the portion of the manufacturing process which permits each layer to be further manipulated to optimize the resultant printed circuit wiring layout. It will be recalled from the discussion of the Router Control portion of the Executive Control Routine, that the Sort II portion of the process requires that the Sort I process have been completed prior to utilizing the Resort properties of the Sort II routine. As in the Sort I process, the operation of the Sort II process is dependent upon the selection of parameters by the designer-operator, for this embodiment. By recognizing the type of terminal-connections that can be anticipated for the chassis being processed, appropriate parameter selections can be made to accommodate these circumstances. This, too, could be automated by providing for a preliminary evaluation of the terminal-connections in advance of the parameter selection, followed by a selection of parameters based on such an evaluation.

The basic function of the resort process is to calculate a new weight word for each terminal-connection according to the following relationship:

$$\text{Weight} = C1A1 + C2A2 + C3L + C4D \text{where}$$

*C*1 through *C*4 are the parameter values selected by the operator;
Ai is the base angle which determines angle computation;
*A*1 is the Angle formed by terminals decreasing away from the base angle in a clockwise direction;
*A*2 is the Angle formed by terminals decreasing away from the base angle in both directions;
*L* is the length of the X and Y legs of the route between terminals; and
*D* is the distance from the center of the plane to the center of the hypotenuse formed by the terminals.
*Angle determination is based on vertical equal Zero degrees and increase clockwise.

FIG. 26 illustrates the foregoing elements, and it will be noted that the reference corner is at the upper right where it is designated (0,0), and the coordinate position of the center of the plane is designated ($X_c$, $Y_c$). The sample printed wire path shown to couple 01 to *D*1 is a simple *L*-shaped path. It will be recalled that each terminal in the array has a unique number which is the value of the packed up row, column, and pin number. This number has physical significance also, in that these values relate to a particular physical dimension. From this it can be seen that the distance that 01 is displaced in the X direction from the (0,0) axis can be determined by knowing the column and pin location. This distance is referred to as X1. The same situation holds true for the *D*1 terminal, and this value is referred to as the X2 distance. Similarly, it can be determined exactly how far 01 is displaced in the Y direction by knowing the row and pin location therefore. This distance is referred to as Y1. Again, the same holds for *D*1, and this value is referred to as Y2. The hypotenuse formed by the line running from 01 to *D*1 directly has a center point, and the distance of this point to the center of the plane ($X_c$, $Y_c$) is designated as the distance *D*. The angle formed by the hypotenuse and 01 is labeled *A*.

Referring again to FIG. 25, following the Start 770 of the Sort II process, an indication to "Select Sort Parameters" appears on the online typewriter, and the computer is stopped, as indicated by block 772. At this time it is necessary to supply the value of the base angle *Ai*, and the values to be given the constants *C*1 through *C*4. The value given *Ai* will determine the axis of the calculations of *A*1 and *A*2. A value of zero degrees will establish the axis in a vertical position on the plane, and a value of 90° will establish the axis in a horizontal position on the plane. Any values in between will locate the axis accordingly. If it is determined that a majority of the wire paths will be running in the vertical direction, the *A*1 value would normally be selected as zero degrees. Similarly, if a majority of the wire paths would be expected to run horizontally on the plane, a value of 90° would normally be selected for *Ai*. The values to be assigned *C*1 through *C*4 will be determined by an evaluation of the expected nature of the wire paths for the plane, and will be given significance in accordance with this evaluation. The selection of these constants is, in effect, an assignment of the relative importance to be placed on each of the four elements that goes into making up each weight word, and the degree of such importance. When an evaluation has been made of the chassis, and the sort parameters (constants) selected, the operation of the Sort II portion of the process can be started, as indicated by block 774.

When started, a terminal-connection is read from the storage location on the magnetic drum, as placed thereby the Sort I process step, as indicated by block 776. With the information about the terminal-connection available, the value of *A*1 is determined by first comparing the value of *A* determined for the terminal-connection to the value of *Ai*. If the value of *A* is found to be larger than the value of angle *Ai*, the difference between angle *A* and angle *Ai* is formed. The difference value is then subtracted from a constant of 180°. On the other hand, if the value of angle *A* is less than the value of angle *Ai*, angle *A* is subtracted from angle *Ai*, and the difference used directly. This operation is shown in block 778. It will be recalled that the angle values are maintained in a binary format.

The next step is the determination of the *L* value for the terminal-connection under consideration, as shown by block 780. By definition, this is the total length of the *L*-shaped route that will connect the origin and the destination. The length *L* is formed by determining the absolute value of the difference between the X1 and X2 distances and the absolute value of the difference between the Y1 and Y2 distances. The two absolute values so determined are then added together to form *L*, and this value stored for further use.

The determination of *D*, as shown by block 782, requires adding the X1 and X2 distances together and dividing the sum by two. The $X_c$ distance is a constant which defines the X-axis displacement of the center of the plane from the reference corner, and $X_c$ is subtracted from the value just determined. The resultant value is then squared, thereby forming the X component in the determination. Next the value of the Y component in the determination is calculated by first adding together the values of the Y1 and Y2 distances; second, dividing the sum by two; third, subtracting the $Y_c$ distance, a constant which defines the Y-axis displacement of the center of the plane from the reference corner, from the value just formed; and finally, squaring the difference value just formed.

The X and Y components are then added together, and the final step in the determination of $D$ is to take the square root of this final sum. Squaring and square root are techniques well known in the art and do not form a part of the inventive process, hence will not be described. The value of $D$ is then stored.

The next step in the determination of the new weight word for the terminal-connection under consideration is calculating the value for $A2$, as shown by block 784. This involves subtracting the value of angle $A$ from the value of angle $Ai$, and multiplying the absolute value of the difference by two. The resultant product is then subtracted from a constant value of 180° to give the value for $A2$, and the difference stored.

The value of the new weight word for the terminal-connection under consideration is then calculated, as shown by block 786, by multiplying the constant value $C1$ times the value determined for $A1$; multiplying the constant value $C2$ times the value determined for $A2$; multiplying the constant value $C3$ times the value determined for $L$; multiplying the constant value $C4$ times the value determined for $D$; and forming the sum of these four products. The weight value thus determined is then stored in place of the old weight word along with the remainder of the terminal-connection information, as described above, as shown by block 788.

Having completed the redetermination of the weight word, it is necessary to determine whether or not all of the terminal-connections have been reconsidered, as shown by decision element 790. In the event they have not, the "No" path 792 is taken, to a point in the process where the next sequential terminal-connection is selected for evaluation in the same manner as just described. This form of determination continues for each terminal-connection, and, when they have all been reconsidered, the "Yes" path 794 is taken, thereby leading to the step of again sorting all of the terminal-connection information according to the new weight words. This operation is shown in block 796, and results in the terminal-connections being rearranged and stored in their new sequence on the magnetic drum in ascending order of weight word value. When the sort is completed, the operation of Sort II is caused to stop 798, and control is returned to the Router Control segment of the Executive Control routine.

AUTOMATIC ROUTER

FIG. 27 illustrates the relationship of FIG. 27a and FIG. 27b. These FIGS. are a logic flow diagram of the Automatic Router routine. The Automatic Router operates on a single chassis, and requires that the terminal-connection information be prepared by one or both of the sorting routines described above. For this embodiment, the Automatic Router considers a single layer at a time, but is is not limited to such an operation. All of the layers could be handled at once by providing a separate image for each. In order to assure that no two lines cross, an image of the routed lines is maintained for the layer in the magnetic core portion of the computer. For this embodiment the image is of the 28× 14 module array grid board, not including routable area outside the hole pattern, of the type described above. As mentioned there, there are five routable channels between the rows and also between the columns of modules, and one line within each module vertically and seven lines within each module horizontally. Each word of the image defines an area on the plane where two route channels may cross. FIG. 28 illustrates this situation. The dotted lines which couple the terminal points A-B-C-D encloses an area labeled $a$. There are three conditions which can occur in this area, namely, a line in a vertical direction, a line in the horizontal direction, or no line through the area. The image table is set up in the magnetic core section of the computer with a complete addressable memory section word for each of the possible routable areas. This gives a magnetic core table which can be represented as follows:

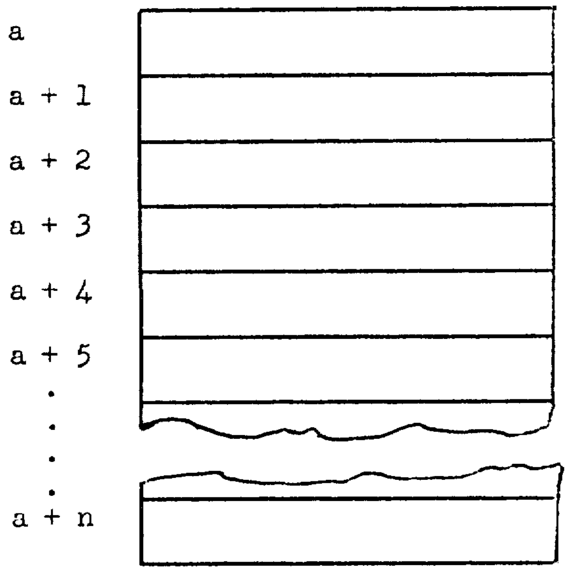

For example, if a line crosses through $r$ channel intersections, $r$ words of the table are used to describe this line. It should be noted that these words will not necessarily be sequential, in that vertical runs will cause jumps in the image addresses. Each word in the image for a particular wire path contains the same information, and the image word is comprised of four separate items of interest to the consideration of the wire path. FIG. 29 is an illustration of the channel intersection areas, and includes a sample wire path for illustrating the makeup of the image word. For these purposes the Reference Corner will be considered to be at the upper left of the layer, and the channel intersection areas are numbered sequentially from that point horizontally across the array terminating at number 163. These numbers do not refer to any dimension, but only to the number of channel intersection areas. The numbering system then returns to the left side of the array and starts over with number 164, and again continues completely across the layer in the horizontal direction to number 327. The numbering then returns to the left edge of the array and starts with channel intersection area 328 and continues across horizontally. This system of numbering is continued on down the array with the last channel intersection area at the lower right corner of the array being the highest number.

Example terminal 930 with the wire paths emanating therefrom at the angles illustrates a limitation imposed on this embodiment, and shows the only allowable paths for connecting a terminal pin to the printed circuit wiring which runs in the wiring channels. This was done for convenience in plotting of the connection paths, since the angle path can be made with fewer commands than requiring a squared off corner. While this is characteristic, no limitation to such a form of connection is necessarily implied.

Also shown in FIG. 29 is the example wiring path $A-B1-B2-C$, where $A$ and $C$ are the origin and destination and $B1$ and $B2$ are the bend points. The horizontal distance from $A$ to $C$ is labeled $T_H$ and the total vertical distance between these points is labeled $T_V$. The total vertical distance from the Reference Corner is labeled $T_{VR}$ and the total horizontal distance from the Reference Corner is labeled $T_{HR}$. These are the four separate items of information which comprise the image words and are stored in the magnetic core image in the appropriate addressed locations for the sample wire path. This information is packed according to the relationship listed below:

Image Word$=T_V(164)^3 + T_{VR}(163)^2 + T_H(164) + T_{HR}$ To extract these various items, the foregoing process of packing is just reversed. Thus, during the routing process, when a wire route encounters an obstacle to the most desirable route, all of the information about the obstacle wire path can be obtained from the image word. With this information, it is possible to make a decision as to which point would be "best" to go to in order to get around the obstacle. This can best be understood by considering the example illustrated in FIG. 30, wherein a sample route 01—D1 has been laid in, and it desired to route a path which will connect 02—D2. The first path to be tried would be 02—A—D2, but it will be noted that when the horizontal path is extended from 02, the already routed line appears as an obstacle. Information of the type described above is available in the image table for the 01—D1 path, and the similar information is known for the terminals under consideration. From this it can be seen that the distance L1 is less than the distance L2, hence the most desirable point to avoid the obstacle is around 01. Accordingly, the horizontal run is projected from 02 to a point as close to the obstacle as possible, and a bend is made at point B. The route is then projected in the upward direction for a distance great enough to clear 01 terminal, such as point C. At this time point C becomes a pseudo origin for the continuation of the routing. The preferred direction is still horizontal, but it is also required that the horizontal path go just far enough to clear the obstacle. This requirement is added to give an optimum condition for the possible routing of wire paths that may follow. It is determined that point D clears the obstacle, hence the path can be directed downward, and is allowed to continue to point E since no further obstacles are encountered. At this time point E becomes a pseudo origin for the continuation of the routing, and it can be seen that the route can be extended in the horizontal direction to make the coupling to D2, and complete the route. When the route is completed, the image words are calculated for the respective portions of the wire path, and are inserted in the appropriate storage locations in the magnetic core image to indicate that these channel intersection areas are now utilized, and are unavailable for further routing therethrough. When all of the tabs for the selected chassis have been tried in accord with the routing procedure just summarized, routing is complete for that layer. The grid image is then cleared and the routing starts again with the remaining tabs in an attempt to put them on the next layer. Routing will continue until either all of the tabs have been routed or the number of layers specified has been completed. In the latter condition, the unrouted tabs are provided on a record medium. The routed tabs and the route information is written on the magnetic tape after each tab is routed and the route is checked to determine that it does not violate any limitations.

Turning now to a consideration of the logic flow diagram of FIG. 27*a* and FIG. 27*b*, at the Start 800 an indication to "Select Number of Layers" is presented on the online typewriter, and computation stopped, as shown by block 802. For this embodiment, automatic selection of seven layers is made in the absence of an externally supplied number of layers. Once the number of layers is selected, the routing operation can be started, as shown by block 804. At this time a test is made to determine if all of the layers have been completed, as indicated by decision element 806. At this time of course the layers will not have been completed, and the "No" path 808 will be taken. This causes the first layer number to be set and also printed out to provide a record of progress which can be observed by the operator, as indicated by block 810. On the first pass through the file, wire runs are started in the designated preferred direction, and are allowed to alter direction as necessary to avoid obstacle wires while always moving in the general direction of the destination terminal. On the first path through the wire tab listing the routing procedure doe not permit routes that become blocked and unroutable around an obstacle to back up and try another available starting preferred direction. As an example if the preferred direction is horizontally from the origin pin to the left on the first pass the routing attempt would be limited to such a starting direction, but could make any adjustments necessary to accomplish an obstacle avoidance. It cannot however, when completely blocked, return to the origin and try the route over again starting in the vertical direction toward the alternate preferred bend point. On the second pass through the sorted wire tabs for the chassis under consideration, such an adjustment is allowed, and may result in the tab being routed, thereby reducing the number of terminal-connections that must be placed on the remaining layers. Prohibiting such an adjustment of the first path is necessary to prevent large segments of the available routing area of the chassis layer from effectively being blocked off. The layer number is then recorded on the magnetic tape file 814.

Having made the preliminary adjustment, the process proceeds to select a tab to be routed 816 by reading it from the magnetic drum. The information read from the drum is examined to determine if the end of the drum file has been reached, thereby indicating that all of the tabs have been processed. This is indicated by decision element 818, and when the end of the file is detected, the "Yes" path 820 is taken, and the second pass marked is tested to determine if it is set 822. When it is set, the "Yes" path 824 is taken and the number of tabs routed on the layer is printed out on the online typewriter for the operator to examine, as indicated by block 826. Operation then proceeds via path 828 to a point where the next layer is to be processed. When the second pass marker is not set, the "No" path 830 is taken and the second pass marker is set 832. The process then proceeds via path 834 to a point where the tabs are again considered, with provision made for altering the direction selection for blocked wires routes, as described above.

At decision 818 when it is determined that the end of the tab list has not been reached, the "No" path 836 is taken. This causes the information relating to the origin pin, the destination pin, the allowable wire length for the terminal-connection, and the beginning direction to be extracted and saved 838. To determine the beginning direction 840, the direction code is examined. FIG. 24 defines the coding of the possible directions. To determine the most desirable bend point 842, the starting direction is utilized to determine the direction of the basic L pattern which will connect the known points. The simplest path is defined by a starting point, bend point and stopping point. This information is coded into two words of the following format:

| direction | | address of starting point | | length of leg | |
|---|---|---|---|---|---|
| 29 | 27 | 26 | 12 | 8 | 0 |

The length of the line is the number of channel intersection blocked by the line, not the length in any dimensions. The Four directions are defined as right zero, up two, left four, and down six.

After the most desirable pattern is thus established, it is necessary to determine if this route is allowable, as indicated by decision element 844. This determination is made for each of the legs, each defined by a word of the above format, by searching the wiring image maintained in the magnetic core. If it is determined that the route is clear, the "Yes" path 846 is taken to add the routed tab to the listing 848. It is then necessary to indicate the tab was routed 850, and proceed via path 852 to make the decision of whether or not the tab was routed 854. In this case the "Yes" path 856 would be taken and the routed tab would be evaluated to determine if it complied with the design rules set down for the routes, as indicated by block 858. The primary check made here is to determine whether or not the resultant length of the terminal-connection path is within the limits supplied for the tab by the designer. The decision 860 results in the "Yes" path 862 being taken when the routed tab is acceptable, whereby the routed information is added to the completed list 864. The next operation requires that the routed information be entered into the appropriate storage locations in the image 866. Then the next step in the process is to set the indicator in the magnetic drum list that indicates the tab has been routed 868. The indication is then made that the route is complete 870, and the tab selection for routing is updated 872. The process can then proceed to point A in the process to handle the next tab.

When it is determined that a tab was not routed 874, or that the route did not satisfy the rules check 876, the tab information is cleared from the tab table 878, and the magnetic core image is reset to remove any references to the partial route that might have been entered therein 880. The indication is made that the route is incomplete 882, and the tab selection is updated 884. The process then proceeds to pint A to handle the next selected tab.

When a simple L path will not be accepted for the route, the decision at element 844, will result in the "No" path 886 is taken and the obstacle is routed around 888. The routing of a complex line is not a continuous process, but rather proceeds as described above in the consideration of FIG. 30. It is, as there described, a series of simple L patterns drawn between end points and the pseudo end points as determined from the nature of the obstacle. Upon establishing a successful L path the test is made as to whether the obstruction was avoided 890. It if was not, the "No" path 892 is taken and the indication is made that the tab was not routed 893, and the process proceeds along path 894 to terminate the consideration of the tab. When the leg is successfully routed, the "Yes" path 896 is taken and the test is made as to whether the route is now complete 898. If it is, the "Yes" path 900 is taken and the indication is made that the tab was routed 902. The process then proceeds along path 904 to complete the bookkeeping necessary for the tab. If the route is not thereby completed, the "No" path 906 is taken, and the pseudo origin is set 908 for further routing. The path 910 is then followed and the attempt is made to complete the route around the obstacle.

Returning now to the pint where it is determined that all of the layers have been completed 806, the "Yes" path 912 is taken, and the total of the remaining unrouted tabs is printed on the online typewriter, as is the number of layers used 914. The indication to "Select Extra Layers" is then typed on the monitor typewriter, and computation is stopped 916. If additional layers are selected, and computation restarted, the decision of whether more layers are to be allowed 918 will result in the "Yes" path 920 being taken and the process continues as described above. When no more layers are selected, the "No" path 922 is taken, and an output summary of the remaining unrouted tabs is provided 924. The magnetic tape file containing the routed information is terminated 926, and computation stopped 928, with control then being returned to the Router Control segment of the Executive Control routine.

MAGNETIC TAPE FILE FORMAT

FIG. 31 illustrates schematically the format of the magnetic tape file that is formed by the operation of the Sort I process step and the Router. It will be recalled that the file title, file number, and the wire tab specification for the selected chassis are written by the Sort I routine as it is read from the master wire tab file.

The wire routing information follows the third Boundary from the top of the page, and is created by the Router. In this portion of the magnetic tape file, Function Codes are utilized to identify the various types of information that are available. The following list of Function Codes are utilized:

Function Code Meaning
1 = Layer Number
2 = Tab Word
3 = Last word in route
0 = Route Word The format is such that the terminal-connection (tab) is listed in the packed format described above. Following these items are the words which define the route to be followed for forming the interconnection of the two points. A defining word is provided for each line segment, and includes the direction of the wire run (D); the address of the starting point in the image (AAAAA); and the length of the line by the number of channel intersections that are blocked by it (LLL).

It should be noted that the format that is physically on the tape is that described above for the arrangement of the magnetization, and the foregoing format description is intended to graphically describe the relative positioning of the types of information that are to be stored on the magnetic tape. It should be noted further that a limitation to a magnetic tape record medium is not intended, but for this embodiment provided the appropriate rates of operation to make it desirable. Other well-known types of peripheral equipment recording apparatus could be utilized.

PLOTTER ROUTINE

FIG. 32 is a logic flow diagram of the operations required to put the routed terminal-connections in a format which can be utilized to control the operation of the plotter, described above. This amounts to a conversion of format, and is done separately as a measure to optimize the speed of the Router. It will be recalled that an adapter is provided for handling the signals provided as input to the plotter, as was described in conjunction with FIG. 10. It should be noted that the type of record medium utilized as the input device for the plotter is a matter of choice based on speed of operation and availability of the various types of peripheral equipment for such use. As stated above, the plotter could be driven online with the computer, or can be operated off-line in conjunction with a magnetic tape input, a paper tape input, or a punched card input.

At the Start 940 the Plotter routine processes the title and file number of the chassis routing magnetic tape. This magnetic tape is the one described in conjunction with the Sort I routine, the Router Routine, and illustrated in FIG. 31. This operation is shown in block 950. The operation then proceeds to read the terminal-connection and route information from the magnetic tape for the layer being processed 952. These items are then converted to the format which can be handled by the Plotter 954. The format of the control information provided for the plotter is such that 11 frames of information are provided for each plotter operation. All of these eleven frames must be present for the control unit of the adapter to check for legal commands given to the plotter. The first of the eleven frames is for referencing the input medium. This is followed by a frame which either commands the pen to be raised or lowered. The next four frames designate the X-coordinate, and the following four frames designate the Y1-coordinate. Finally, the eleventh frame designates the end of the definitive data for the line being drawn. This last frame is utilized as the start signal to the control unit of the adapter. The control unit of the plotter maintains a record of the horizontal and vertical position of the plotter, thus it is necessary to give only distances from the coordinate (0,0), where the initial X and Y points are initially set manually to position the pen before input data is supplied.

Having determined the 11 frames of control information for the line, it is necessary to record these items on the control record medium 956. At this time the test is made to determine whether or not the layer has been completed 958, and if not, the "No" path 960 is taken to read the next line to be handled. When the layer is completed, the "Yes" path 962 is taken and the test is made to determine if the end of the file has been reached 964. At the end of the file the "Yes" path 965 is taken, and the operation of the Plotter routine is stopped 966, with control then being returned to the Executive Control routine. If the file has not been completed, the "No" path 968 is taken, and the record medium is set to start a new layer 970. The operation then continues via path 972 to continue to read and process the lines of control information for the new layer.

It is understood that suitable modification may be made in the structure as disclosed provided such modifications come within the spirit and scope of the appended claims. Having now, therefore, fully illustrated and described the invention, what is claimed to be new and desired to protect by Letters Patent is defined in the appended claims.

We claim:

1. The method of fabricating printed circuit terminal interconnection assemblies including the steps of:

a. reading manifestations from a record medium indicative of predetermined terminal interconnections to be formed between designated terminals in a coordinate array;
b. providing signals ordered according to a predetermined system indicative of ordered terminal interconnections in response to the manifestation so read and storing said signals;
c. reading the stored signals and generating terminal interconnection numerical control parameters defining nonintersecting printed circuit paths to be formed on a predetermined coordinate terminal array; and
d. recording the numerical control parameters on a record medium for use in the control of the operation of a numerically controlled reproduction apparatus.

2. A method of fabricating printed circuit terminal interconnection assemblies including the steps of:

a. reading manifestations indicative of predetermined terminal interconnections to be formed between designated terminals in a coordinate array from a record medium;
b. Providing signals ordered according to a predetermined system indicative of ordered terminal interconnections in response to the manifestations so read and storing said signals;
c. reading the stored signals and generating terminal interconnection numerical control signals defining nonintersecting printed circuit paths to be formed on a predetermined coordinate terminal array;
d. temporarily storing the numerical control signals; and
e. drawing the master layout on a predetermined scale in response to the stored numerical control signals.

3. A method of fabricating printed circuit terminal interconnection assemblies including the steps of:

a. reading manifestations indicative of predetermined terminal interconnections to be formed between designated terminals in a coordinate array from a record medium;
b. providing signals ordered according to a predetermined system indicative of ordered terminal interconnections in response to the manifestations so read storing said signals;
c. reading the stored signals and generating terminal interconnection numerical control signals defining nonintersecting printed circuit paths to be formed on a predetermined coordinate terminal array;
d. temporarily storing the numerical control signals;
e. drawing the master layout on a predetermined scale in response to the stored numerical control signals;
f. forming an overlay layout of the predetermined coordinate terminal array on a transparent backing material to the same scale as said master layout drawing;
g. placing the transparent array over said drawing and aligning the drawing in a predetermined relationship therewith; and
h. making a composite photograph of the aligned combination of the routed path drawing and the overlay for use in the printed circuit fabrication process.

4. In a system for manufacturing multiplanar circuit module terminal-interconnection assemblies for use in a printed circuit fabrication, where each fabricated plane includes at least an insulating substrate member on which nonintersecting routed printed circuit paths are to be formed and having a plurality of holes arranged in a predetermined coordinate array drilled therethrough, with each hole having its surface plated-through with electrically conductive material, the fabricated planes stacked with respective holes aligned with predetermined one arranged for receiving conductive material therethrough in contact with the plated-through conductive material for providing interlayer electrical and physical coupling, a method for generating route-defining signals indicative of master routed printed circuit interterminal connection layouts for each plane, comprising the steps of:

a. reading manifestations from a record medium indicative of predetermined origin-to-destination terminal connections to be formed by printed circuit paths;
b. providing signals ordered according to a predetermined system indicative of respective ones of ordered terminal interconnections in response to the manifestations so read;
c. storing the ordered signals;
d. sequentially reading ones of said ordered signals relating to associated ones of the origin-to-destination terminals;
e. generating route-defining signals for the origin-to-destination terminals so read for one of the planes, said route being nonintersecting with previously generated routes on the plane, and storing said nonintersecting route-defining signals as they are generated for use in controlling the reproduction of the origin-to-destination routed paths;
f. generating obstacle-avoiding route-defining signals for the origin-to-destination terminals found to intersect previously generated routes for the plane being prepared, when such a nonintersecting route can be provided, and storing said obstacle-avoiding route-defining signals as generated for use in controlling the reproduction of the obstacle-avoiding origin-to-destination paths;
g. rejecting origin-to-destination terminals which cannot be provided a nonintersecting route on the plane being prepared;
h. repeating steps *d—g* until all of the stored signals have been considered;
i. advancing the plane level to be prepared and repeating steps *d—h* for the nonrouted origin-to-destination terminals which can be routed thereon; and
j. repeating steps *d—i* until all origin-to-destination terminals have been routed on one of said planes.

5. The method of claim 4 wherein the step of generating route-defining signals for the origin-to-destination terminals includes the steps of:

a. selecting a beginning direction on the coordinate array for the prospective route;
b. determining a bend point indicative of a preferred coordinate route-defining path based on the selected beginning direction and the coordinate position of the origin terminal and the destination terminal; and
c. rejecting the preferred route when it is found to intersect a previously established route.

6. In a system for manufacturing multiplanar circuit module terminal-interconnection assemblies for use in a printed circuit fabrication, where each fabricated plane includes at least an insulating substrate member on which nonintersecting routed printed circuit paths are to be formed and having a plurality of holes arranged in a predetermined coordinate array drilled therethrough, with each hole having its surface plated-through with electrically conductive material, the fabricated planes stacked with respective holes aligned with predetermined ones arranged for receiving conductive material therethrough in contact with the plated-through conductive material for providing interlayer electrical and physical coupling, a method for generating master routed printed circuit interterminal connection layouts for each plane, comprising the steps of:

a. reading manifestations from a record medium indicative of predetermined origin-to-destination terminal connections to be formed by printed circuit paths;

b. providing signals ordered according to a predetermined system indicative of respective ones of ordered terminal interconnections in response to the manifestations so read;

c. storing the ordered signals;

d. sequentially reading ones of said ordered signals relating to associated ones of the origin-to-destination terminals;

e. generating route-defining signals for the origin-to-destination terminals so read for one of the planes, said route being nonintersecting with previously generated routes on the plane, and storing said nonintersecting route-defining signals as they are generated;

f. generating obstacle-avoiding route-defining signals for the origin-to-destination terminals found to intersect previously generated routes for the plane being prepared, when such a nonintersecting route can be provided, and storing said obstacle-avoiding route-defining signals as generated;

g. rejecting origin-to-destination terminals which cannot be provided a nonintersecting route on the plane being prepared;

h. repeating steps *d—g* until all of the stored signals have been considered;

i. advancing the plane level to be prepared and repeating steps *d—h* for the nonrouted origin-to-destination terminals which can be routed thereon;

j. repeating steps *d—i* until all origin-to-destination terminals have been routed on one of said planes; and k. applying the route-defining signals to a numerically controlled plotting apparatus and drawing the master layout on a predetermined scale for each of the planes so prepared in response to the applied route-defining signals.

7. The method of claim 6 wherein the step of generating route-defining signals for the origin-to-destination terminals includes the steps of:

a. selecting a beginning direction on the coordinate array for the prospective route;

b. determining a bend point indicative of a preferred coordinate route-defining path based on the selected beginning direction and the coordinate position of the origin terminal and the destination terminal; and c. rejecting the preferred route when it is found to intersect a previously established route.

8. In a system for manufacturing multiplanar circuit module terminal-interconnection assemblies for use in a printed circuit fabrication, where each fabricated plane includes at least an insulating substrate member on which nonintersecting routed printed circuit paths are to be formed and having a plurality of holes arranged in a predetermined coordinate array drilled therethrough, with each hole having its surface plated-through with electrically conductive material, the fabricated planes stacked with respective holes aligned with predetermined one arranged for receiving conductive material therethrough in contact with the plated-through conductive material for providing interlayer electrical and physical coupling, a method for generating master routed printed circuit interterminal connection layouts composite photographs for each plane for use in the printed circuit fabrication process, comprising the steps of:

a. reading manifestations from a record medium indicative of predetermined origin-to-destination terminal connections to be formed by printed circuit paths;

b. providing signals ordered according to a predetermined system indicative of respective ones of ordered terminal interconnections in response to the manifestations so read;

c. storing the ordered signals;

d. sequentially reading ones of said ordered signals relating to associated ones of the origin-to-destination terminals;

e. generating route-defining signals for the origin-to-destination terminals so read for one of the planes, said route being nonintersecting with previously generated routes on the plane, and storing said nonintersecting route-defining signals as they are generated;

f. generating obstacle-avoiding route-defining signals for the origin-to-destination terminals found to intersect previously generated routes for the plane being prepared, when such a nonintersecting route can be provided, and storing said obstacle-avoiding route-defining signals as generated;

g. rejecting origin-to-destination terminals which cannot be provided a nonintersecting route on the plane being prepared;

h. repeating steps *d—g* until all of the stored signals have been considered;

i. advancing the plane level to be prepared and repeating steps *d—h* for the nonrouted origin-to-destination terminals which can be routed thereon;

j. repeating steps *d—i* until all origin-to-destination terminals have been routed on one of said planes;

k. applying the route-defining signals to a numerically controlled plotting apparatus and drawing the master layout on a predetermined scale for each of the planes so prepared in response to the applied route-defining signals;

l. forming an overlay layout of the predetermined coordinate terminal array on a transparent backing material to the same scale as said master layout drawings;

m. sequentially placing the transparent array over each of said drawings and aligning the respective drawings in a predetermined relationship therewith; and n. photographing the aligned combination of the routed path drawings and the overlay to form the master routed layout for each plane for use in the printed circuit fabrication process.

9. The method of claim 8 wherein the step of generating route-defining signals for the origin-to-destination terminals includes the steps of:

a. selecting a beginning direction on the coordinate array for the prospective route;

b. determining a bend point indicative of a preferred coordinate route-defining path based on the selected beginning direction and the coordinate position of the origin terminal and the destination terminal; and c. rejecting the preferred route when it is found to intersect a previously established route.

10. In a system for manufacturing multiplanar circuit module terminal-interconnection assemblies for use in a printed circuit fabrication, where each fabricated plane includes at least an insulating substrate member on which nonintersecting routed printed circuit paths are to be formed and having a plurality of holes arranged in a predetermined coordinate array drilled therethrough, with each hole having its surface plated-through with electrically conductive material, the fabricated planes stacked with respective holes aligned with predetermined ones arranged for receiving conductive material therethrough in contact with the plated-through conductive material for providing interlayer electrical and physical coupling, a method for generating master routed printed circuit interterminal connection layouts for each plane, for use in the printed circuit fabrication process, including the steps of:

a. reading manifestations from a record medium indicative of predetermined origin-to-destination terminal connections to be formed by printed circuit paths for a selected chassis;

b. providing signals ordered according to a predetermined system indicative of respective ones of ordered terminal interconnections in response to the manifestations so read;

c. storing the ordered signals;

d. selecting a predetermined number of planes for the chassis interconnections;

e. establishing an image storage table with a discrete location for each routable area on the coordinate array for storing signals indicative of the direction of a routed path passing through the locations;

f. sequentially reading ones of said ordered signals relating to associated ones of the origin-to-destination terminals;

g. selecting a beginning direction on the coordinate array for the prospective route;

h. determining a bend point indicative of a preferred coordinate route-defining path based on the selected beginning direction and the coordinate position of the origin terminal and the destination terminal;

i. rejecting a preferred route found to intersect a routable area already utilized by a previously established route, as determined by signals stored in said image table;

j. storing an acceptable route in associated locations in said image table;

k. generating obstacle-avoiding route-defining signals for the origin-to-destination terminals found to intersect previously generated routes for the plane being prepared, when such a nonintersecting route can be provided, and storing said obstacle-avoiding route-defining signals, as generated, in the image table locations associated with said route;

l. rejecting origin-to-destination terminals which cannot be provided a nonintersecting route on the plane being prepared;

m. repeating steps *f—l* until all of the stored signals have been considered;

n. advancing the plane level to be prepared and repeating steps *e—m* for the nonrouted origin-to-destination terminals which can be routed thereon;

o. terminating the routing process where the predetermined number of planes have been processed; and p. indicating the number, if any, of the origin-to-destination terminals remaining unrouted.

11. In a system for manufacturing multiplanar circuit module terminal-interconnection assemblies for use in a printed circuit fabrication, where each fabricated plane includes at least an insulating substrate member on which nonintersecting routed printed circuit paths are to be formed and having a plurality of holes arranged in a predetermined coordinate array drilled therethrough, with each hole having its surface plated-through with electrically conductive material, the fabricated planes stacked with respective holes aligned with predetermined ones arranged for receiving conductive material therethrough in contact with the plated-through conductive material for providing interlayer electrical and physical coupling, a method for generating master routed printed circuit interterminal connection layout drawings for each plane, for use in the printed circuit fabrication process, including the steps of:

a. reading manifestations from a record medium indicative of predetermined origin-to-destination terminal connections to be formed by printed circuit paths for a selected chassis;

b. providing signals ordered according to a predetermined system indicative of respective ones of ordered terminal interconnections in response to the manifestations so read;

c. storing the ordered signals;

d. selecting a predetermined number of planes for the chassis interconnections;

e. establishing an image storage table with a discrete location for each routable area on the coordinate array for storing signals indicative of the direction of a routed path passing through the locations;

f. sequentially reading ones of said ordered signals relating to associated ones of the origin-to-destination terminals;

g. selecting a beginning direction on the coordinate array for the prospective route;

h. determining a bend point indicative of a preferred coordinate route-defining path based on the selected beginning direction and the coordinate position of the origin terminal and the destination terminal; 110 i. rejecting a preferred route found to intersect a routable area already utilized by a previously established route, as determined by signals stored in said image table;

j. storing an acceptable route in associated locations in said image table;

k. generating obstacle-avoiding route-defining signals for the origin-to-destination terminals found to intersect previously generated routes for the plane being prepared, when such a nonintersecting route can be provided, and storing said obstacle-avoiding route-defining signals as generated, in the image table location associated with said route;

1. rejecting origin-to-destination terminals which cannot be provided a nonintersecting route on the plane being prepared;

m. repeating steps *f—l* until all of the stored signals have been considered;

n. advancing the plane level to be prepared and repeating steps *e—m* for the nonrouted origin-to-destination terminals which can be routed thereon;

o. terminating the routing process where the predetermined number of planes have been processed;

p. indicating the number, if any, of the origin-to-destination terminals remaining unrouted; and q. applying the route-defining signals to a numerically controlled plotting apparatus and drawing the master layout on a predetermined scale for each of the planes so prepared in response to the applied route-defining signals for forming the master routed interterminal connection drawings for each plane of the chassis.

12. In a system for manufacturing multiplanar circuit module terminal-interconnection assemblies for use in a printed circuit fabrication, where each fabricated plane includes at least an insulating substrate member on which nonintersecting routed printed circuit paths are to be formed and having a plurality of holes arranged in a predetermined coordinate array drilled therethrough, with each hole having its surface plated-through with electrically conductive material, the fabricated planes stacked with respective holes aligned with predetermined ones arranged for receiving conductive material therethrough in contact with the plated-through conductive material for providing interlayer electrical and physical coupling, a method for generating master routed printed circuit interterminal connection layout composite photographs for each plane, for use in the printed circuit fabrication process, comprising the steps of:

a. reading manifestations from a record medium indicative of predetermined origin-to-destination terminal connections to be formed by printed circuit paths for a selected chassis;

b. providing signals ordered according to a predetermined system indicative of respective ones of ordered terminal interconnections in response to the manifestations so read;

c. storing the ordered signals;

d. selecting a predetermined number of planes for the chassis interconnections;

e. establishing an image storage table with a discrete location for each routable area on the coordinate array for storing signals indicative of the direction of a routed path passing through the locations;

f. sequentially reading ones of said ordered signals relating to associated ones of the origin-to-destination terminals;

g. selecting a beginning direction on the coordinate array for the prospective route;

h. determining a bend point indicative of a preferred coordinate route-defining path based on the selected beginning direction and the coordinate position of the origin terminal and the destination terminal;

i. rejecting a preferred route found to intersect a routable area already utilized by a previously established route, as determined by signals stored in said image table;

j. storing an acceptable route in associated locations in said image table;

k. generating obstacle-avoiding route-defining signals for the origin-to-destination terminals found to intersect previously generated routes for the plane being prepared, when such a nonintersecting route can be provided, and storing said obstacle-avoiding route-defining signals, as generated, in the image table locations associated with said route;

l. rejecting origin-to-destination terminals which cannot be provided a nonintersecting route on the plane being prepared;

m. repeating steps *f*—*l* until all of the stored signals have been considered;

n. advancing the plane level to be prepared and repeating steps *e*—*m* for the nonrouted origin-to-destination terminals which can be routed thereon;

o. terminating the routing process when the predetermined number of planes have been processed;

p. applying the route-defining signals to a numerically controlled plotting apparatus and drawing the master layout on a predetermined scale for each of the planes so prepared in response to the applied route-defining signals;

q. forming an overlay layout of the predetermined coordinate terminal array on a transparent backing material to the same scale as said master layout drawings;

r. sequentially placing the transparent array over each of said drawings and aligning the respective drawings in a predetermined relationship therewith; and s. photographing the aligned combination of the routed path drawings and the overlay to form the master routed layout for each plane for use in the printed circuit fabrication process.